(12) United States Patent
Sridharan et al.

(10) Patent No.: US 10,498,435 B2
(45) Date of Patent: Dec. 3, 2019

(54) NARROWBAND TIME-DIVISION DUPLEX FRAME STRUCTURE FOR NARROWBAND COMMUNICATIONS

(71) Applicant: QUALCOMM Incorporated, San Diego, CA (US)

(72) Inventors: Arvind Sridharan, Bangalore (IN); Kapil Bhattad, Bangalore (IN); Manikandan Chandrasekar, Bangalore (IN); Gowrisankar Somichetty, Bangalore (IN); Alberto Rico Alvarino, San Diego, CA (US); Xiao feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/707,789

(22) Filed: Sep. 18, 2017

(65) Prior Publication Data
US 2018/0234173 A1 Aug. 16, 2018

(30) Foreign Application Priority Data

Feb. 14, 2017 (IN) .............................. 201741005220
Feb. 15, 2017 (IN) .............................. 201741005360

(51) Int. Cl.
*H04J 3/00* (2006.01)
*H04B 7/26* (2006.01)
(Continued)

(52) U.S. Cl.
CPC ......... *H04B 7/2606* (2013.01); *H04B 7/2656* (2013.01); *H04B 7/2668* (2013.01);
(Continued)

(58) Field of Classification Search
CPC .. H04B 7/2606; H04B 7/2656; H04B 7/2668; H04J 3/0682; H04L 1/04; H04L 1/08;
(Continued)

(56) References Cited

U.S. PATENT DOCUMENTS 9,560,635 B2 1/2017 Wei et al.
10,104,651 B2 10/2018 Chen et al.
(Continued)

FOREIGN PATENT DOCUMENTS

EP 3264829 A1 1/2018
EP 3300287 A1 3/2018
(Continued)

OTHER PUBLICATIONS

"3rd Generation Partnership Project; Technical Specification Group Radio Access Network; Evolved Universal Terrestrial Radio Access (EUTRA); Physical Channels and Modulation (Release 14)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V14.1.0, Jan. 2, 2017 (Jan. 2, 2017), XP051230335, pp. 140-175, [retrieved on Jan. 2, 2017].
(Continued)

*Primary Examiner* — Minh Trang T Nguyen
(74) *Attorney, Agent, or Firm* — Nerrie M. Zohn

(57) ABSTRACT

There is a need to support narrowband TDD frame structure for narrowband communications. The present disclosure provides a solution by supporting one or more narrowband TDD frame structure(s) for narrowband communications. In an aspect of the disclosure, a method, a computer-readable medium, and an apparatus are provided. The apparatus may determine a narrowband TDD frame structure for narrowband communications from a group of narrowband TDD frame structures. In one aspect, the narrowband TDD frame (Continued)

US 10,498,435 B2

Page 2 structure may include a set of downlink subframes and more than one special subframe. The apparatus may determine a set of narrowband carriers and a minimum set of subframes on the set of narrowband carriers based at least in part on the set of downlink subframes and more than one special subframe on which a NRS should be transmitted. The apparatus may transmit the NRS using the narrowband TDD frame structure determined for the narrowband communications.

56 Claims, 28 Drawing Sheets

(51) Int. Cl.
H04J 3/06 (2006.01)
H04L 5/14 (2006.01)
H04L 5/02 (2006.01)
H04L 5/24 (2006.01)
H04W 72/04 (2009.01)
H04L 5/00 (2006.01)
H04W 4/70 (2018.01)
H04L 1/04 (2006.01)
H04W 56/00 (2009.01)

(52) U.S. Cl.
CPC .......... H04J 3/0682 (2013.01); H04L 5/005 (2013.01); H04L 5/006 (2013.01); H04L 5/0007 (2013.01); H04L 5/0053 (2013.01); H04L 5/0091 (2013.01); H04L 5/0094 (2013.01); H04L 5/023 (2013.01); H04L 5/14 (2013.01); H04L 5/143 (2013.01); H04L 5/1469 (2013.01); H04L 5/24 (2013.01); H04W 4/70 (2018.02); H04W 72/0446 (2013.01); H04W 72/0453 (2013.01); H04L 1/04 (2013.01); H04L 5/001 (2013.01); H04L 5/0023 (2013.01); H04W 56/0005 (2013.01); H04W 56/008 (2013.01)

(58) Field of Classification Search
CPC ..... H04L 5/0007; H04L 5/001; H04L 5/0023; H04L 5/005; H04L 5/0053; H04L 5/006; H04L 5/0091; H04L 5/0094; H04L 5/023; H04L 5/14; H04L 5/143; H04L 5/1469; H04L 5/24; H04W 4/70; H04W 56/0005; H04W 56/008; H04W 72/0446; H04W 72/0453
See application file for complete search history.

(56) References Cited

U.S. PATENT DOCUMENTS

2009/0093257 A1   4/2009   Rinne et al.
2013/0083749 A1   4/2013   Xu et al.
2013/0272215 A1   10/2013  Khoryaev et al.
2013/0315159 A1   11/2013  Xia et al.
2014/0029568 A1   1/2014   Wang et al.
2014/0119332 A1   5/2014   Kim et al.
2014/0204961 A1   7/2014   Hooli et al.
2014/0307685 A1   10/2014  Takano
2015/0078220 A1   3/2015   Hu et al.
2015/0124663 A1   5/2015   Chen et al.
2015/0327324 A1   11/2015  Wei et al.
2017/0041122 A1   2/2017   Li et al.
2017/0070968 A1   3/2017   Kim et al.
2017/0187563 A1   6/2017   Shin et al.
2017/0202025 A1*  7/2017   Ouchi ............... H04W 16/32
2017/0273059 A1   9/2017   You et al.
2017/0311276 A1   10/2017  Tsai et al.
2017/0373900 A1   12/2017  Adhikary et al.
2018/0049047 A1*  2/2018   Lin .................... H04W 24/02
2018/0049151 A1   2/2018   Yoon et al.
2018/0062699 A1   3/2018   Horiuchi et al.
2018/0069593 A1   3/2018   Yi
2018/0077703 A1   3/2018   Sun et al.
2018/0176893 A1   6/2018   Zhang et al.
2018/0234169 A1   8/2018   Sridharan et al.
2018/0234170 A1   8/2018   Sridharan et al.
2018/0234171 A1   8/2018   Sridharan et al.
2018/0234219 A1   8/2018   Sridharan et al.
2018/0234229 A1   8/2018   Somichetty et al.
2018/0234951 A1   8/2018   Somichetty et al.
2018/0234966 A1   8/2018   Somichetty et al.
2018/0241495 A1   8/2018   Xue et al.
2018/0317244 A1   11/2018  Um et al.
2019/0274141 A1   9/2019   Somichetty et al.

FOREIGN PATENT DOCUMENTS

WO   2015018368 A1   2/2015
WO   2016119162 A1   8/2016
WO   2016123292 A1   8/2016
WO   2016154835 A1   10/2016
WO   2016190620 A1   12/2016
WO   2017078802 A1   5/2017
WO   2017136003 A1   8/2017
WO   2018026199 A1   2/2018
WO   2018030936 A1   2/2018

OTHER PUBLICATIONS

Huawei, et al., "TS 36.300 Section 5 for NB-IoT up to RAN1#84," 3GPP Draft; R1-161554, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016, Mar. 2, 2016, XP051079463, Retrieved from the Internet: URL: http://www.3gpp.org/ftp/tsg_ran/WG1_RL1/TSGR1_84/Docs/ [retrieved on Mar. 2, 2016].
Huawei et al., "DCI for NB-IoT," 3GPP Draft; R1-160032, 3rd Generation Partnership Project (3GPP), Mobile Competence Centre, 650, Route Des Lucioles, F-06921 Sophia-Antipolis Cedex, France vol. RAN WG1, no. Budapest HU, Jan. 18, 2016-Jan. 20, 2016 Jan. 17, 2016 (Jan. 17, 2016). XP051053355, Retrieved from the Internet: URL:http://www.3gpp.org/ftp/Meetings_3GPP_SYNC/RAN1/Docs/ [retrieved on Jan. 17, 2016] sections 2. 2.1, 3, 3 pages.
Huawei et al., "On Multi-PRB Operation", 3GPP Draft; R1-161039, 3rd Generation Partnership Project (3GPP), Mobile Competence Centre, 650, Route Des Lucioles, F-06921, Sophia-Antipolis Cedex, France, vol. RAN WG1, No. St Julian's, Malta; Feb. 15, 2016-Feb. 19, 2016 Feb. 14, 2016, XP051054343, Retrieved from the Internet: URL:http://www.3gpp.org/ftp/Meetings_3GPP_SYNC/RAN1/Docs/ [retrieved on Feb. 14, 2016], 3 pages.
Huawei et al: "TDD Support for NB-IoT in Rel-15," 3GPP Draft; RP-162161, 3rd Generation Partnership Project (3GPP), Mobile Competence Centre; 650, Route Des Lucioles; F-06921 Sophia-Antipolis Cedex; France, vol. TSG RAN, No. Vienna, Austria; Dec. 5, 2016-Dec. 8, 2016, Dec. 4, 2016 (Dec. 4, 2016), XP051183589, pp. 1-9, Retrieved from the Internet:URL:http://www.3gpp.org/ftp/Meetings_3GPP_SYNC/RAN/Docs/ [retrieved on Dec. 4, 2016].
Huawei., et al., "Synchronization Signal Design," 3GPP Draft; R1-160311, 3rd Generation Partnership Project (3GPP), Mobile Competence Centre; 650, Route Des Lucioles; F-06921 Sophia-Antipolis Cedex; France; vol. RAN NG1, no. St Julian's, Malta; Feb. 15, 2016-Feb. 19, 2016; Feb. 14, 2016 (Feb. 14, 2016), 10 pages, XP051053651, Retrieved from the Internet: URL:http://www.3gpp.org/ftp/Meetings_3GPP_SYNC/RAN1/Docs/ [retrieved on Feb. 14, 2016], the whole document.
International Search Report and Written Opinion—PCT/US2018/017636—ISA/EPO—dated May 18, 2018.
LG Electronics: "Discussion on Multiple PRB Operation for SIB1 Transmission", 3GPP Draft; R1-160615 NB-SIB, 3rd Generation Partnership Project (3GPP), Mobile Competence Centre, 650, Route Des Lucioles, F-06921, Sophia-Antipolis Cedex, France, vol. RAN

(56) References Cited

OTHER PUBLICATIONS

WG1, No. St. Julian's, Malta; Feb. 15, 2016-Feb. 19, 2016 Feb. 14, 2016, XP051053944, Retrieved from the Internet: URL:http://www.3gpp.org/ftp/Meetings_3GPP_SYNC/ RAN1/Docs/ [retrieved on Feb. 14, 2016], 3 pages.

Nokia, et al., "Existing Downlink Signals for OTDOA Positioning in NB-IoT," 3GPP Draft; R1-1608881, 3rd Generation Partnership Project (3GPP), Mobile Competence Centre; 650, Route Des Lucioles; F-06921 Sophia-Antipolis Cedex; France vol. RAN WG1, no. Lisbon, Portugal; Oct. 10, 2016-Oct. 14, 2016, Oct. 9, 2016, 3 pages, XP051148935, Retrieved from the Internet: URL:http://www.3gpp.org/ftp/Meetings_3GPP_SYNC/RAN1/Docs/ [retrieved on Oct. 9, 2016].

Nokia Networks, et al., "Synchronization Signal Design for NB-IoT", 3GPP Draft; R1-161104, 3rd Generation Partnership Project (3GPP), vol. RAN WG1, no. St Julian's, Malta; Feb. 15, 2016-Feb. 19, 2016, Feb. 24, 2016 (Feb. 24, 2016), XP051079077, Retrieved from the Internet: URL: http://www.3gpp.org/ftp/tsg_ran/WG1_RL1/TSGR1_84/Docs/ [retrieved on Feb. 24, 2016].

Nokia Networks: "On the TDD Support for NB-IoT," 3GPP Draft; R1-160011, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 17, 2016, XP051053334, Retrieved from the Internet: URL: http://www.3gpp.org/ftp/Meetings_3GPP_SYNC/RAN1/Docs/ [retrieved on Jan. 17, 2016].

Nokia Networks: "On the Synchronization Signal Design for NB-IoT", 3GPP Draft; R1-157274, 3rd Generation Partnership Project (3GPP), Mobile Competence Centre, 650, Route Des Lucioles, F-06921, Sophia-Antipolis Cedex, France, vol. RAN WG1, No. Anaheim, USA; Nov. 15, 2015-Nov. 22, 2015 Nov. 15, 2015, XP051003479, Retrieved from the Internet: URL:http://www.3gpp.org/ftp/Meetings_3GPP_SYNC/RAN1/Docs/ [retrieved on Nov. 15, 2015], 9 pages.

Qualcomm Incorporated: "Physical Channel Time and Frequency Relationship", 3GPP Draft, R1-155704, Physical Channel Time and Frequency Relationship, 3rd Generation Partnership Project (3GPP), Mobile Competence Centre, 650, Route Des Lucioles, F-06921, Sophia-Antipolis Cedex, vol. RAN WG1, no. Malmo, Sweden, Oct. 5, 2015-Oct. 9, 2015, Oct. 4, 2015 (Oct. 4, 2015), XP051002533,Retrieved from the Internet: URL:http://www.3gpp.org/ftp/Meetings_3GPP_SYNC/RAN1/Docs/.

Samsung: "Discussion on Forward Compatibility for NR," 3GPP Draft; R1-166743, Forward Compatibility Final, 3rd Generation Partnership Project (3GPP), Mobile Competence Centre; 650, Route Des Lucioles; F-06921, Sophia-Antipolis Cedex; France vol. RAN WG1, no. Gothenburg, Sweden; Aug. 22, 2016-Aug. 26, 2016, Aug. 21, 2016, pp. 1-4, XP051125541, Retrieved from the Internet: URL: http://www.3gpp.org/ftp/Meetings_3GPP_SYNC/RAN1/Docs/ [retrieved on Aug. 21, 2016].

Wi Rapporteur (Ericsson): "RAN1 agreements for Rel-13 NB-IoT",3GPP Draft; R1-165977, 3rd Generation Partnership Project (3GPP), Mobile Competence Centre, 650, Route Des Lucioles, F-06921, Sophia-Antipolis Cedex, France, vol. RAN WG1, No. Nanjing, China; Aug. 11, 2016, XP051141850, Retrieved from the Internet: URL:http://www.3gpp.org/ftp/tsg_ran/WG1_RL1/TSGR1_85/Docs/ [retrieved on Aug. 11, 2016], 33 pages.

Wi Rapporteur (Ericsson): "RAN2 Agreements for Rel-13 eMTC sorted and Edited by Topic," 3GPP Draft; R1-161546 RAN1 Agreements for Rel-13 eMTC Sorted by Topic with SPEC Impacts—with Change Tracking, 3rd Generation Partnership Project (3GPP), Mobile Competence Centre; 650, Route Des Luc, vol. RAN WG1, no. St Julian's, Malta; Feb. 15, 2016-Feb. 19, 2016, Feb. 24, 2016, XP051079451, 44 pages, Retrieved from the Internet: URL: http://www.3gpp.org/ftp/tsg_ran/WG1/_RL1/TSGR1_84/Docs/ [retrieved on Feb. 24, 2016].

\* cited by examiner

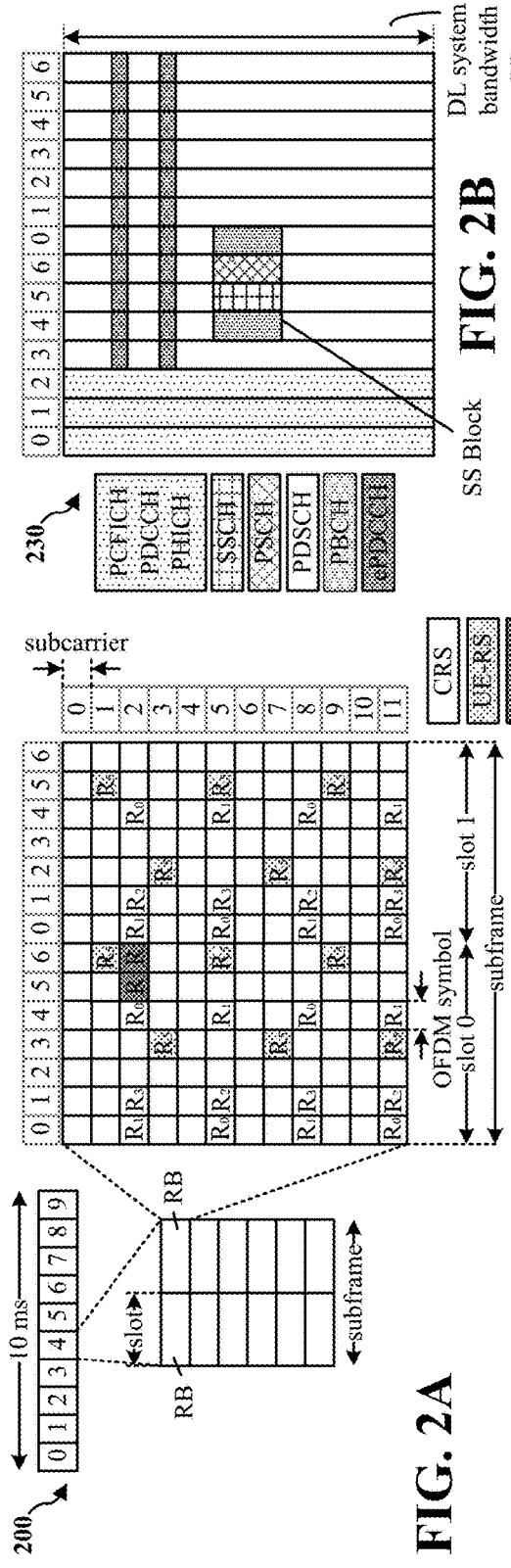
FIG. 2A
FIG. 2B
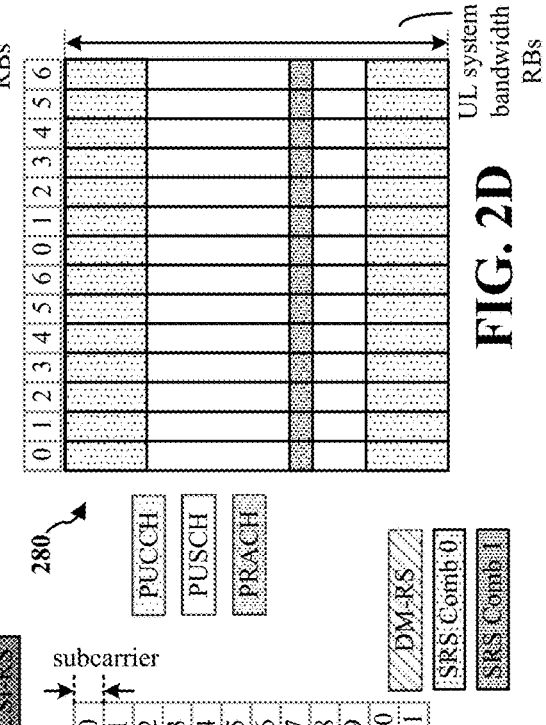
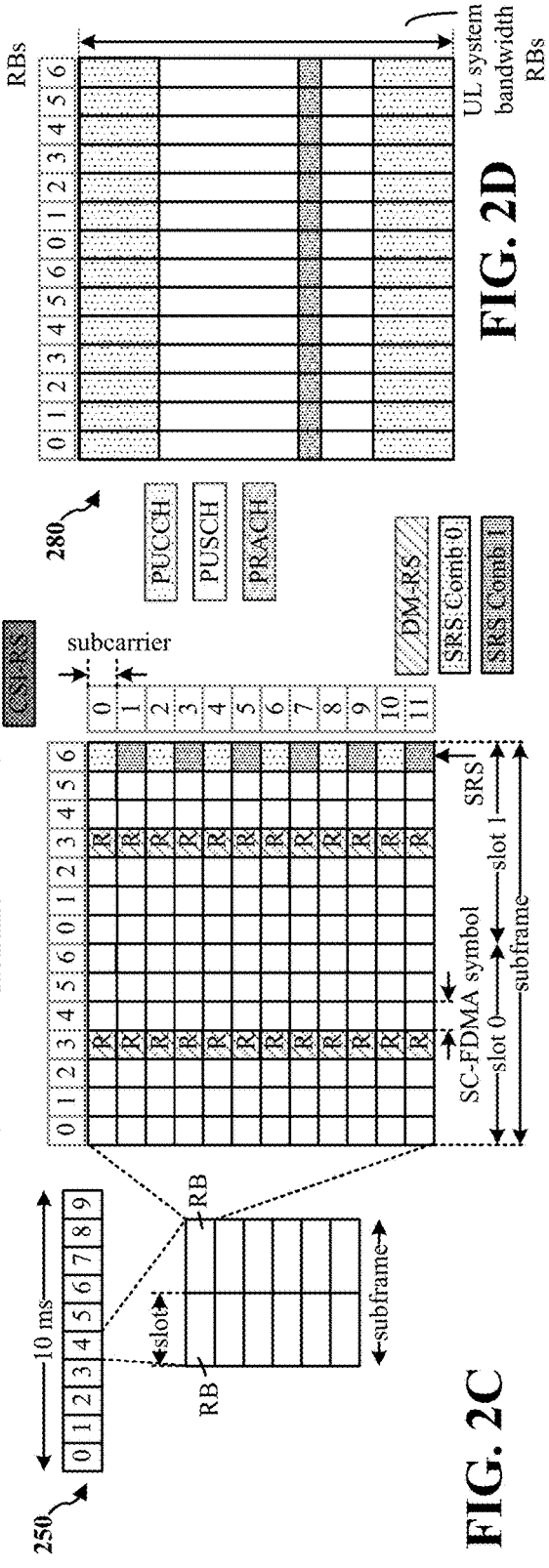
FIG. 2C
FIG. 2D

NARROWBAND TIME-DIVISION DUPLEX FRAME STRUCTURE FOR NARROWBAND COMMUNICATIONS

CROSS-REFERENCE TO RELATED APPLICATIONS

This application claims the benefit of Indian Application Serial No. 201741005220, entitled "NARROWBAND TIME-DIVISION DUPLEX FRAME STRUCTURE FOR NARROWBAND COMMUNICATIONS" and filed on Feb. 14, 2017, which is expressly incorporated by reference herein in its entirety. In addition, this application claims the benefit of Indian Application Serial No. 201741005360, entitled "NARROWBAND TIME-DIVISION DUPLEX FRAME STRUCTURE FOR NARROWBAND COMMUNICATIONS" and filed on Feb. 15, 2017, which is expressly incorporated by reference herein in its entirety.

BACKGROUND

Field

The present disclosure relates generally to communication systems, and more particularly, to a narrowband time-division duplex (TDD) frame structure for narrowband communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrowband communications involve communicating with a limited frequency bandwidth as compared to the frequency bandwidth used for LTE communications. One example of narrowband communication is narrowband (NB) IoT (NB-IoT) communication, which is limited to a single resource block (RB) of system bandwidth, e.g., 180 kHz. Another example of narrowband communication is enhanced machine-type communication (eMTC), which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. Because the coverage provided by narrowband communications may include reaching challenging locations (e.g., a smart gas meter located in the basement of a building) there is an increased chance that one or more transmissions will not be properly received. Hence, repeated transmissions may be used in narrowband communication to increase the probability that a transmission will be properly decoded by a receiver device. A TDD frame structure may support repeated transmissions due to an increased number of contiguous downlink and/or uplink subframes, as compared to a frequency division-duplex (FDD) frame structure. There is a need to support narrowband TDD frame structure for narrowband communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used for LTE communications. One example of narrowband communication is NB-IoT communication, which is limited to a single RB of system bandwidth, e.g., 180 kHz. Another example of narrowband communication is eMTC, which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. However, because the coverage provided by narrowband communications may include reaching challenging locations (e.g., a smart gas meter located in the basement of a building) there is an increased chance that one or more transmissions will not be properly decoded by a receiver device. Consequently, narrowband communication may include a predetermined number of repeated transmissions to increase the chance of having the transmission properly decoded by the receiver device. A TDD frame structure may be used by a narrowband communication system since certain TDD frame configurations may include a greater number of contiguous uplink and/or downlink subframes that may be used for the repeated transmissions, as compared to a FDD frame structure. There is a need to support the use of narrowband TDD frame structure for narrowband communication.

The present disclosure provides a mechanism to support one or more narrowband TDD frame structure(s) for narrowband communication.

In an aspect of the disclosure, a method, a computer-readable medium, and an apparatus are provided. The apparatus may determine a bandwidth for narrowband communications. The apparatus may determine a narrowband TDD frame structure for the narrowband communications. In one aspect, the narrowband TDD frame structure may include at least one of two or more contiguous downlink subframes, or one or more flexible subframes that can be configured as either a downlink subframe or an uplink subframe. The apparatus may communicate with a UE using the narrowband TDD frame structure determined for the narrowband communications.

In certain aspects, the apparatus may determine a TDD mode for narrowband communications. The apparatus may also determine a TDD frame structure for the narrowband communications from a group of narrowband TDD frame structures. In an aspect, at least one common subframe in each narrowband TDD frame structure in the group of narrowband TDD frame structures may be configured as a downlink subframe. The apparatus may also transmit a primary synchronization signal (PSS) using the at least one common subframe in the narrowband TDD frame structure determined for the narrowband communications.

In certain other aspects, the apparatus may determine a TDD mode for narrowband communications. The apparatus may also determine a narrowband TDD frame structure for the narrowband communications from a group of narrowband TDD frame structures. The apparatus may also transmit a PSS using the narrowband TDD frame structure determined for the narrowband communications. In an aspect, a set of PSS sequences may be associated with at least one of the TDD mode or the narrowband TDD frame structure determined for the narrowband communications.

In certain other aspects, the apparatus may determine a narrowband communication frame structure comprising a FDD mode or a TDD mode and a particular TDD frame structure for narrowband communications from a group of narrowband TDD frame structures. The apparatus may determine a periodicity, subframe number, and transmission sequence associated with a SSS based at least in part on the narrowband TDD frame structure. The apparatus may transmit the SSS using the narrowband TDD frame structure determined for the narrowband communications. In one aspect, the SSS may be transmitted using a same subframe in at most every other frame.

In certain other aspects, the apparatus may determine a narrowband communication frame structure comprising a FDD frame structure or a TDD frame structure and a narrowband TDD frame structure configuration for narrowband communications from a group of narrowband TDD frame structures configurations. The apparatus may determine one or more narrowband carriers and subframes within the one or more narrowband carriers to transmit at least one of a BCH or a SIB1 based on the narrowband communication frame structure or the TDD frame structure configuration. The apparatus may transmit a PSS, an SSS, and at least one of a BCH or an SIB1 using the narrowband TDD frame structure determined for the narrowband communications. In one aspect, a carrier used for transmitting the BCH and/or the SIB may be different than a carrier used to transmit one or more of the PSS or the SSS. In another aspect, a narrowband carrier used for transmitting the BCH may be different than a narrowband carrier used to transmit one or more of the PSS or the SSS.

In certain other aspects, the apparatus may determine a narrowband TDD frame structure for narrowband communications. In one aspect, the narrowband TDD frame structure may include one or more of a set of downlink subframes, a set of uplink subframes, a set of special subframes, or a set of flexible subframes. In certain other aspects, the apparatus may transmit a bitmap associated with the narrowband TDD frame structure to a UE. In one aspect, the bitmap may indicate the one or more of the set of downlink subframes, the set of uplink subframes, the set of special subframes, or the set of flexible subframes.

The apparatus may determine a narrowband TDD frame structure for narrowband communications from a group of narrowband TDD frame structures. In one aspect, the narrowband TDD frame structure may include a set of downlink subframes and more than one special subframe. The apparatus may determine a set of narrowband carriers and a minimum set of subframes on the set of narrowband carriers based at least in part on the set of downlink subframes and more than one special subframe on which a NRS should be transmitted. The apparatus may transmit the NRS using the narrowband TDD frame structure determined for the narrowband communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
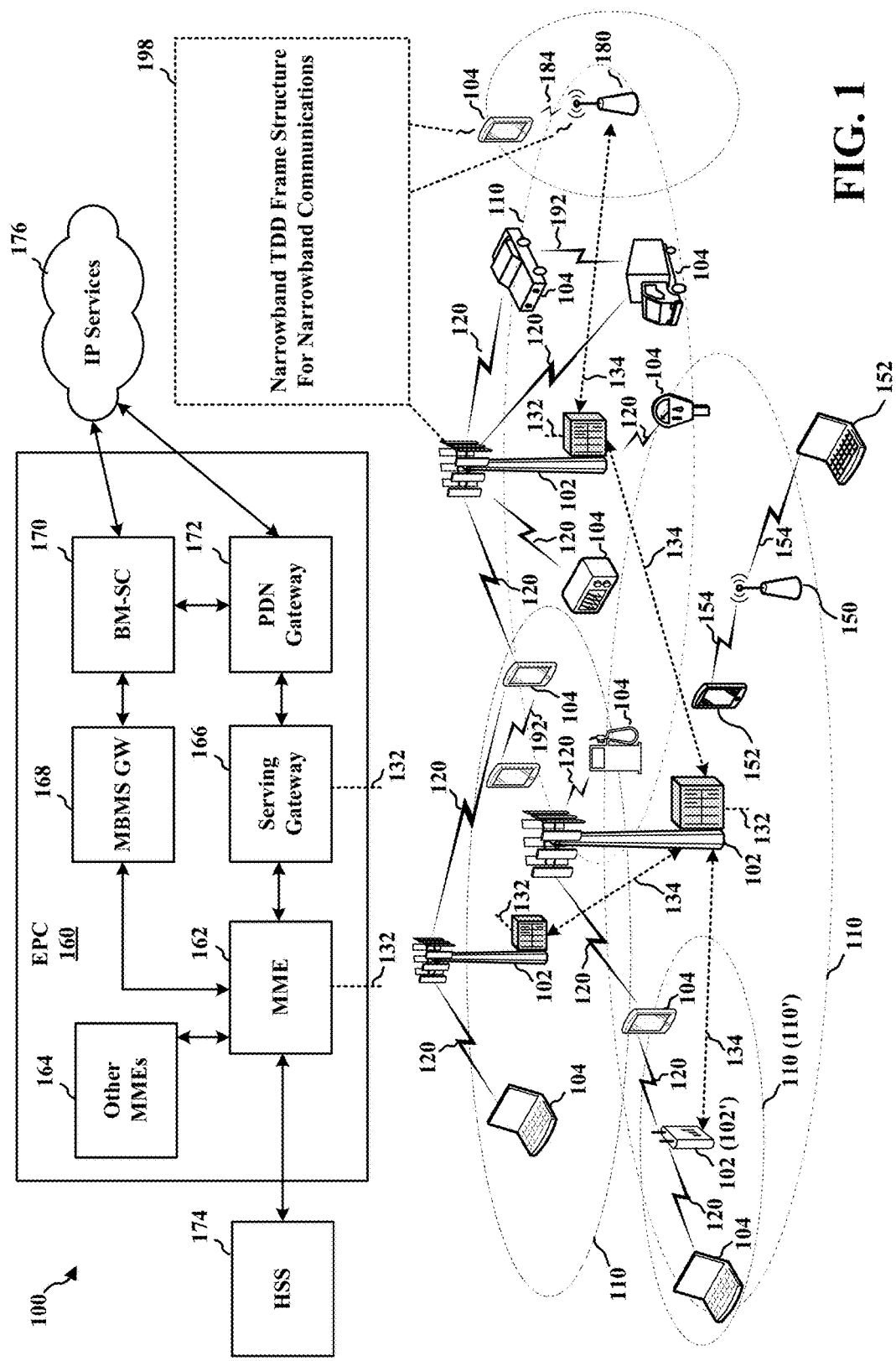
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or less carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102, 180 and/or UE 104 may be configured to support one or more narrowband TDD frame structure(s) for narrowband communications (198), e.g., as described in connection with any of FIGS. 4-25.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a PSS that is used by a UE to determine subframe timing and a physical layer identity. The secondary synchronization channel (SSCH) is within symbol 5 of slot 0 within subframes 0 and 5 of a frame, and carries an SSS that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
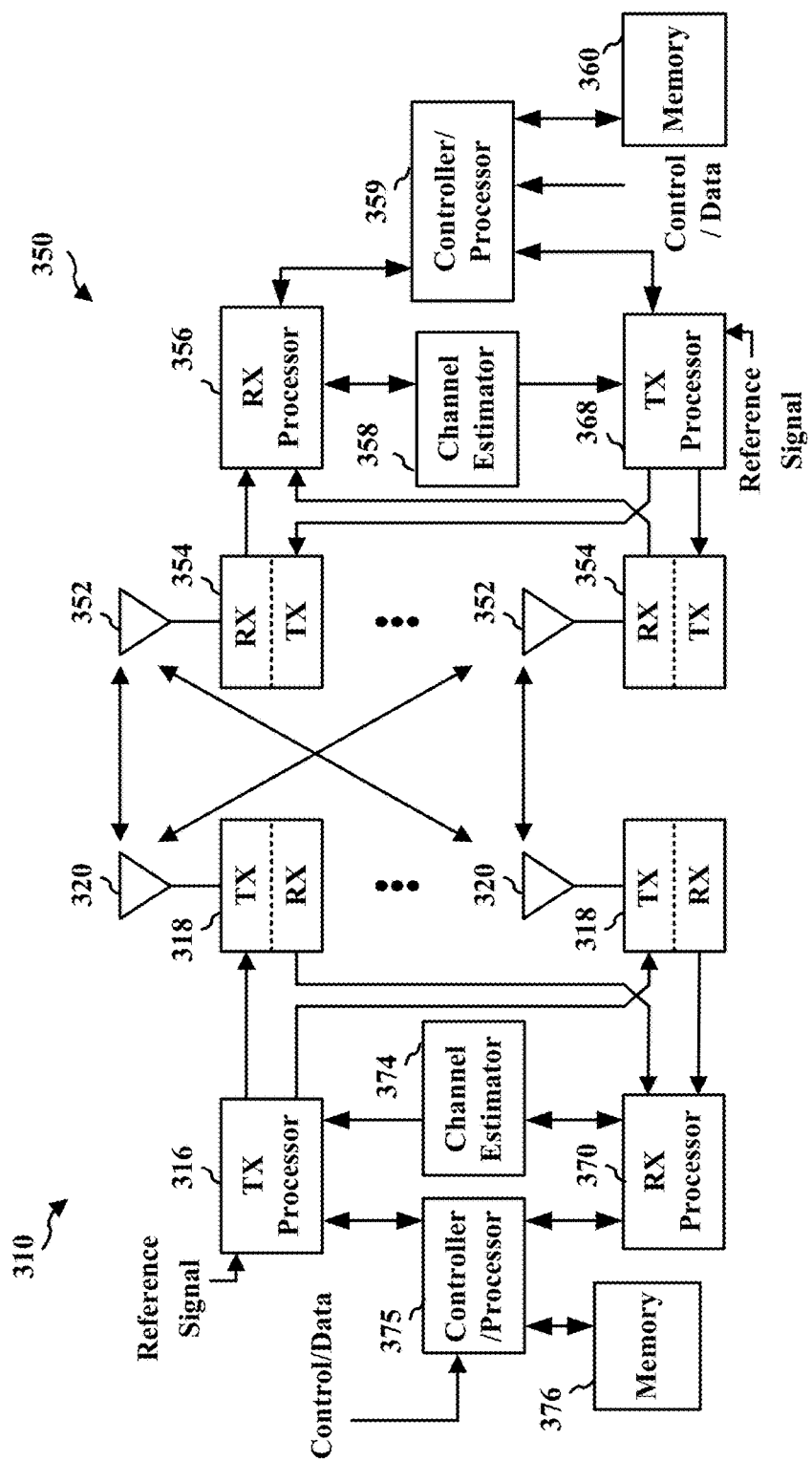
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband communications involve communicating with a limited frequency bandwidth as compared to the frequency bandwidth used for LTE communications. One example of narrowband communication is NB-IoT communication, which is limited to a single RB of system bandwidth, e.g., 180 kHz. Another example of narrowband communication is eMTC, which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. However, because the coverage provided by narrowband communications may include reaching challenging locations (e.g., a smart gas meter located in the basement of a building) there is an increased chance that one or more transmissions will not be properly decoded by a receiver device. Consequently, narrowband communication may include a predetermined number of repeated transmissions to increase the chance of having the transmission properly decoded by the receiver device. A TDD frame structure may be used by a narrowband communication system since certain TDD frame configurations may include a greater number of contiguous uplink and/or downlink subframes that may be used for the repeated transmissions, as compared to a FDD frame structure. There is a need to support the use of narrowband TDD frame structure for narrowband communication.

The present disclosure provides a mechanism to support one or more narrowband TDD frame structure(s) for narrowband communication, as described below with reference to FIGS. 5A-5D.

Figure 4:
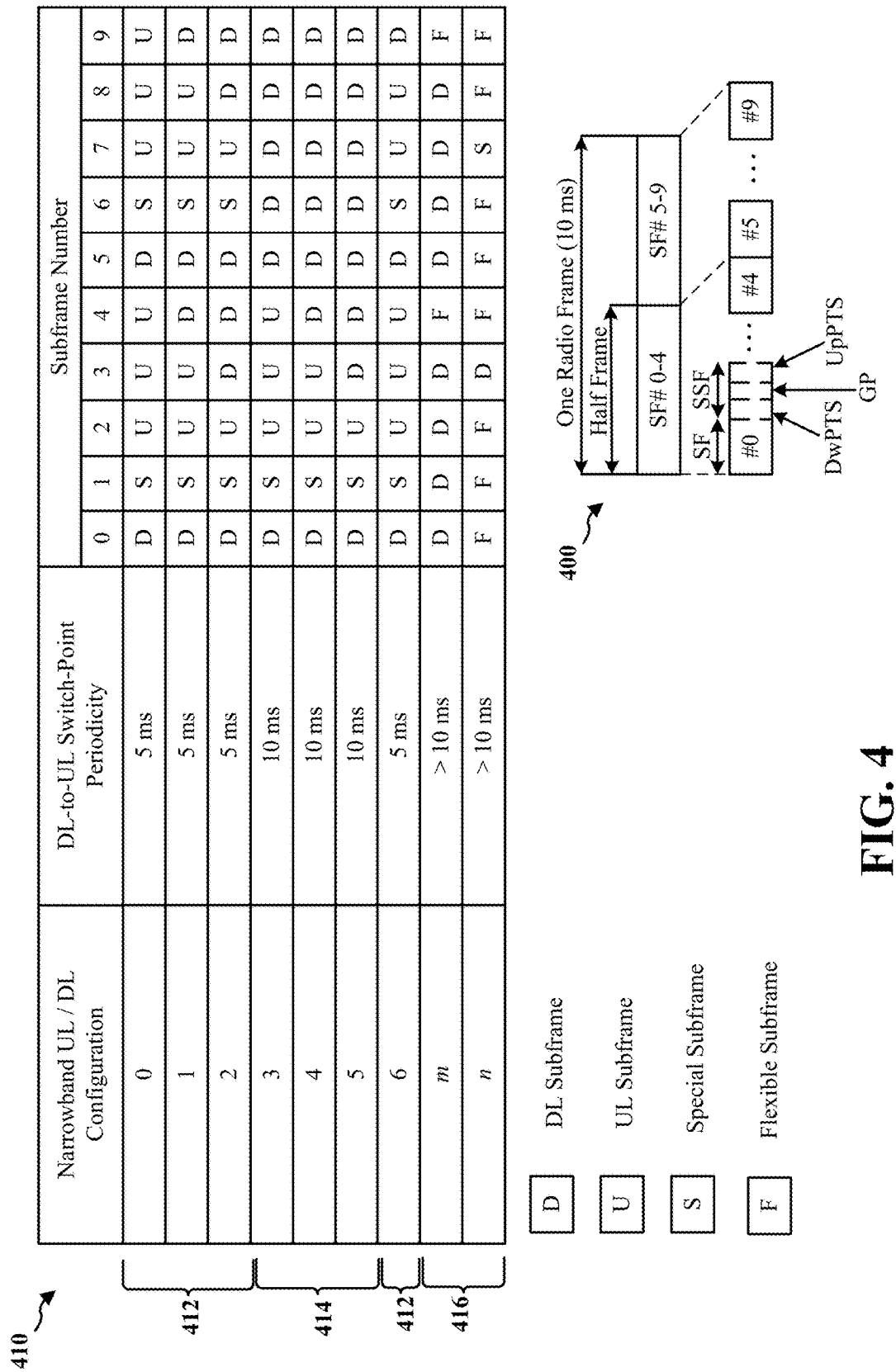
FIG. 4 is a diagram illustrating example narrowband TDD frame structures in accordance with certain aspects of the disclosure.

FIG. 4 is a diagram illustrating a narrowband TDD frame structure 400 that may be used for narrowband communication in accordance with certain aspects of the disclosure. In aspect, the narrowband TDD frame structure 400 used for narrowband communication may be determined from the group of narrowband TDD frame structures (e.g., configuration 0-configuration n) listed in table 410. In certain aspects, a base station may determine the narrowband TDD frame structure based on higher layer signaling (e.g., RRC messaging) received from the network. In certain other aspects, the base station may determine the narrowband TDD frame structure based on channel conditions.

In one aspect, the narrowband TDD frame structure 400 may include a 10 ms radio frame split into two half frames, each 5 ms long. The half-frames may be further split into five subframes, each 1 ms long. The narrowband TDD frame structure 400 may be any one of the narrowband configurations listed in table 410.

Switching periodicity refers to the time a UE uses to switch between monitoring a downlink subframe (e.g., for a downlink transmission from a base station) and sending a transmission using an uplink subframe, or vice versa. Depending on the determined narrowband TDD frame structure 400, the switching periodicity may be 5 ms, 10 ms, or more than 10 ms (e.g., 20 ms). For narrowband TDD frame structures 412 with a 5 ms switching periodicity, a special subframe (SSF) may be located in both half frames of the narrowband TDD frame structure 400. For narrowband TDD frame structures 414 with a 10 ms switching periodicity, a special subframe may be located in the first half frame but not in the second half frame. For narrowband TDD frame structures 416 with more than a 10 ms switching periodicity, no special subframes may be needed since more than an entire frame can be used to perform the switch. In the narrowband TDD frame structures 412, 414 that include a special subframe (e.g., configurations 0, 1, 2, 3, 4, 5, and 6), subframes 0 and 5 as well as the Downlink Pilot Time Slot (DwPTS) in the special subframe may be reserved for downlink transmissions. Additionally and/or alternatively, in the narrowband TDD frame structures 412, 414 that include a special subframe, the Uplink Pilot Time Slot (UpPTS) in the special subframe and the subframe immediately following the special subframe may be reserved for an uplink transmission.

When operating in in-band mode and/or guard-band mode, the narrowband TDD frame structure 400 may reuse certain LTE TDD frame structures (e.g., configurations 0, 1, 2, 3, 4, 5, 6). When operating in standalone mode, some subframes in the narrowband TDD frame structure 400 may be marked as flexible subframes (e.g., configurations m and n) and may be used as either a downlink subframe or an uplink subframe by a UE depending on the current grant received from the base station.

In certain aspects, a subset of the narrowband TDD configurations listed in table 410 in FIG. 4 may be used to support narrowband communications. For example, configuration 0 may not be suitable for narrowband communications because configuration 0 only has two downlink subframes, and hence, may not support repeated transmissions to the UE. In certain aspects, narrowband communications that use a narrowband TDD frame structure may only be supported in in-band mode and/or guard-band mode (e.g., but not standalone mode). In certain other aspects, narrowband communications that use a narrowband TDD frame structure may support in-band mode, guard-band mode, and standalone mode.

Multiple narrowband downlink carriers and multiple narrowband uplink carriers may be used to enhance narrowband communication between a base station and a UE. Among the carriers, a narrowband anchor carrier may be used to provide synchronization, system information, paging, data, and control for multi-carrier enabled. UEs. Overhead narrowband system information may be reduced when a narrowband anchor carrier is used. For instance, synchronization and paging for a certain cell may not be not provided on all narrowband carriers. Narrowband carriers that do not provide synchronization and/or paging may be referred to as narrowband non-anchor carriers. Coordination between base stations for selecting anchor carriers that mitigate interference, and coordination between base stations for non-anchor carrier transmit power control may provide further network performance advantages.

Information indicating the determined narrowband TDD frame structure 400 may be transmitted from the base station to the UE using narrowband PSS (NPSS), narrowband SSS (NSSS), narrowband PBCH (NPBCH) and/or SIB (e.g., using the narrowband anchor carrier).

For in-band mode and guard-band mode, the narrowband anchor carrier used for narrowband communication (e.g., using a narrowband TDD frame structure) may be located in RB pairs for downlink transmissions from the base station to the UE. In certain aspects, the UE may monitor one RB at any given time. In one example, the SIB and/or NPBCH may arrive at the UE in a first RB of the RB pair, and the NPSS and/or NSSS may arrive at the UE in a second RB in the pair. In another example, the SIB may arrive at the UE in a first RB of the RB pair and the NPSS, NSSS, and/or the NPBCH may arrive at the UE in a second RB in the pair. A location of one RB may be determined (e.g., implicitly derived) by the UE based on the location of the other RB in the pair, or based on a location of a different RB in a different RB pair.

In addition, the UE may send uplink transmissions using RB pairs. In certain aspects, the UE may determine which of the RB pairs to use for uplink transmissions based on signaling (e.g., higher layer signaling) received from the base station. In certain other aspects, the UE may determine which RB pairs to use for uplink transmissions based on the type of uplink channels being transmitted (e.g., PRACH and ACK/NACK uses one RB and PUSCH uses the other RB). In certain other aspects, the UE may determine which RB pairs to use for uplink transmission based on the coverage level and/or channel conditions.

Figure 5A:
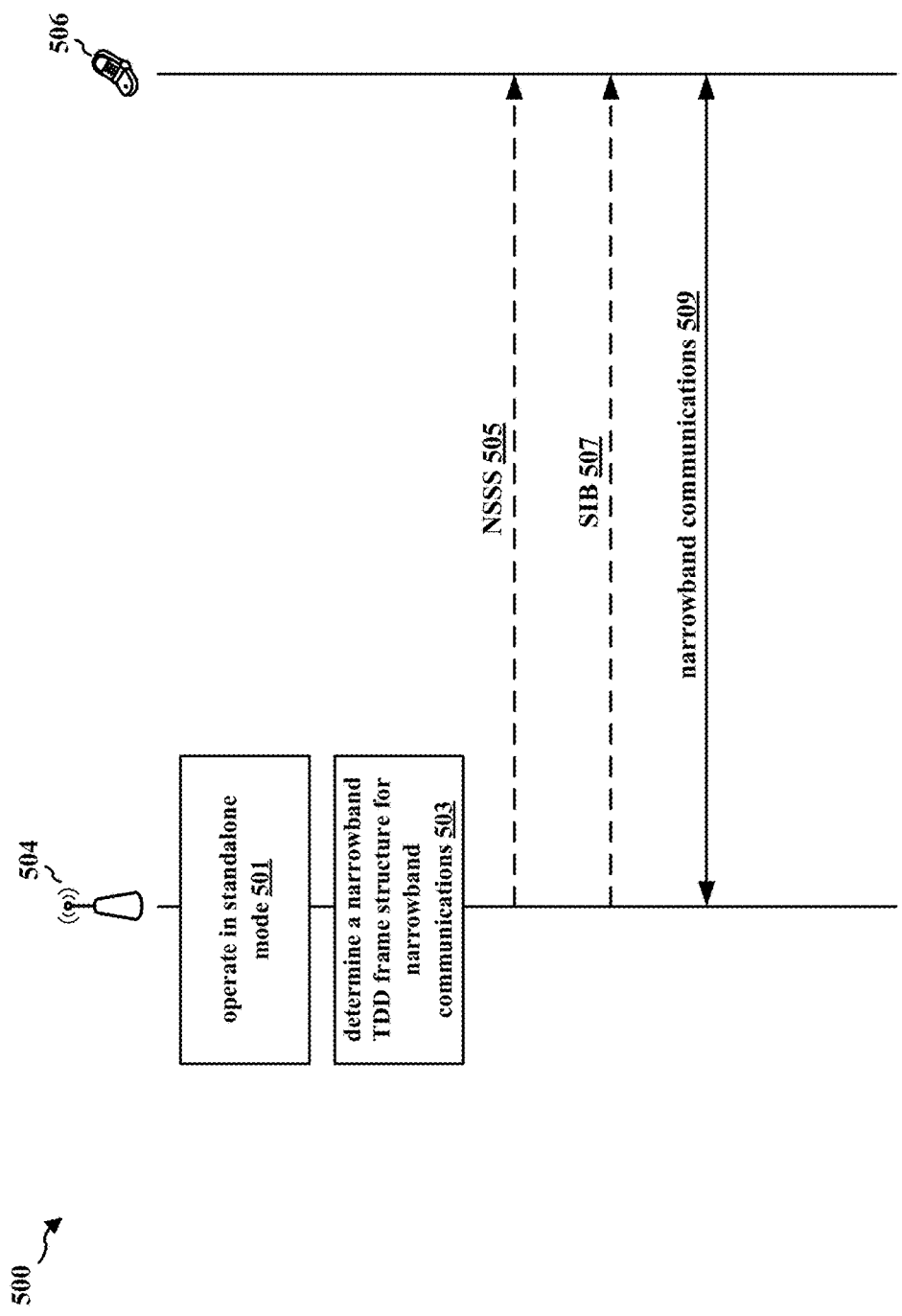
FIG. 5A is a diagram of a dataflow for narrowband communications using narrowband TDD frame structures in accordance with certain aspects of the disclosure.

FIG. 5A is a diagram illustrating a data flow 500 that may be used for narrowband communications in accordance with certain aspects of the disclosure. For example, the data flow 500 may be performed by a base station 504 and/or UE 506. Base station 504 may correspond to, e.g., base station 102, 180, eNB 310, apparatus 1102/1102', 1302/1302', 1502/1502', 1702/1702', 1902/1902', 2302/2302'. UE 506 may correspond to, e.g., UE 104, 350, 1150, 1350, 1550, 1750, 1950, 2350. In addition, the base station 504 and the UE 506 may be configured to communicate using narrowband communications 509 (e.g., NB-IoT and/or eMTC). For example, the UE 506 may be an NB-IoT device and/or an eMTC device. In FIG. 5A, optional operations are indicated with dashed lines.

Referring to FIG. 5A, base station 504 may operate 501 in standalone mode, and the base station may use a standalone mode bandwidth (e.g., 1.08 MHz or 180 kHz) for the narrowband communications 509 that is different than a bandwidth available for LTE communications (e.g., 1.4 MHz, 3 MHz, 5 MHz, 10 MHz, 15 MHz, 20 MHz, 100 MHz, etc.).

In certain aspects, base station 504 may determine 503 a narrowband TDD frame structure for narrowband communications 509. In one aspect, the narrowband TDD frame structure may be a TDD frame structure that is different than an LTE TDD frame structure available for LTE communications. For example, the base station 504 may determine the narrowband TDD frame structure is either configuration m or n from table 410 in FIG. 4. Configuration m or n from table 410 may not be available for LTE communications.

In certain other aspects, the base station 504 may determine 503 a narrowband TDD frame structure from a subset of the configurations from table 410 in FIG. 4. For example, base station 504 may determine 503 the narrowband TDD frame structure from configurations 1, 2, 3, 4, 5, m, and/or n. In certain aspects, configurations 0 and 6 may not be used for the narrowband TDD frame structure since configurations 0 and 6 have a small number of downlink subframes compared to the other configurations, and hence, may not support repeated transmissions.

When base station 504 repeats a downlink transmission, the base station 504 may choose a narrowband TDD frame structure with at least a minimum number of downlink subframes (e.g., at least three downlink subframes) so that the downlink transmission may be repeated in each of the downlink subframes.

In certain other aspects, base station 504 may determine 503 a narrowband TDD frame structure for the narrowband communications 509 based on a switching periodicity used by the base station 504 and/or the UE 506 to switch from transmitting on downlink subframes to monitoring uplink subframes, or vice versa. For example, when the switching periodicity used by base station 504 and/or UE 506 is longer than a switching periodicity in LTE TDD frame structures (e.g., configurations 0, 1, 2, 3, 4, 5, and 6), base station 504 may select either configuration m or n because the switching periodicity of configuration m and n are both greater than 10 ms (e.g., 20 ms).

In a first example, the narrowband TDD frame structure determined by the base station 504 may be configuration n (e.g., see FIG. 4). Configuration n may include a plurality of flexible subframes that may each be dynamically configured as a downlink subframe, uplink subframe, or special subframe by the base station 504. Configuration n may provide the base station 504 with the flexibility to have a downlink transmission or an uplink transmission (e.g., based on channel conditions) in order to increase the chance of the UE 506 properly decoding a transmission.

In a second example, the narrowband TDD frame structure determined by the base station 504 may be one of configuration 3, 4, 5, m, or n (e.g., seen in FIG. 4). The narrowband TDD frame structure associated with configurations 3, 4, 5, m, and n each include at least three downlink subframes (e.g., the flexible subframes in configuration n may be dynamically configured by base station 504 such that the TDD frame structure has three or more downlink subframes). Using a narrowband TDD frame structure with at least three downlink subframes may enable base station 504 to send the NPSS, NSSS, and NPBCH in different subframes of the same radio frame, as described below with reference to FIGS. 5B-5D. In certain aspects, repetition of the NPSS, NSSS, and NPBCH may be implemented by repeating the NPSS, NSSS, and NPBCH over multiple symbols in the same subframe. If configuration 4, 5, m, or n (e.g., configurations with four downlink subframes or that are configurable with four downlink subframes) is determined for use as the narrowband TDD frame structure, an SIB 507 may also be transmitted in a subframe different than the subframe used to transmit the NSSS 505. For example, assuming base station 504 determines the narrowband TDD frame structure is configuration 5, base station 504 may transmit the NSSS 505 in subframe 5 and transmit the SIB 507 in subframe 7.

In certain aspects, base station 504 may use at least three consecutive downlink subframes to repeat a downlink transmission. If a narrowband TDD frame structure is used for the repeated downlink transmission that has less than three contiguous downlink subframes (e.g., configurations 0, 1, and 2 in FIG. 4), the duration over which the repeated transmission is sent may be increased as compared to a duration of the same number of repetitions transmitted using a narrowband TDD frame structure with at least three contiguous downlink subframes. For example, the duration may be increased due to the presence of uplink subframes and/or unused flexible subframes located between downlink subframes used to repeat the transmission. The likelihood that channel conditions may change over the repeated transmission using a narrowband TDD frame structure with less than three contiguous downlink subframes may therefore be increased as compared to a repeated transmission using a narrowband TDD frame structure with at least three contiguous downlink subframes. Hence, the UE 506 may be less likely to combine the repeated transmission received in a narrowband TDD frame structure with less than three contiguous downlink subframes.

Figure 5B:
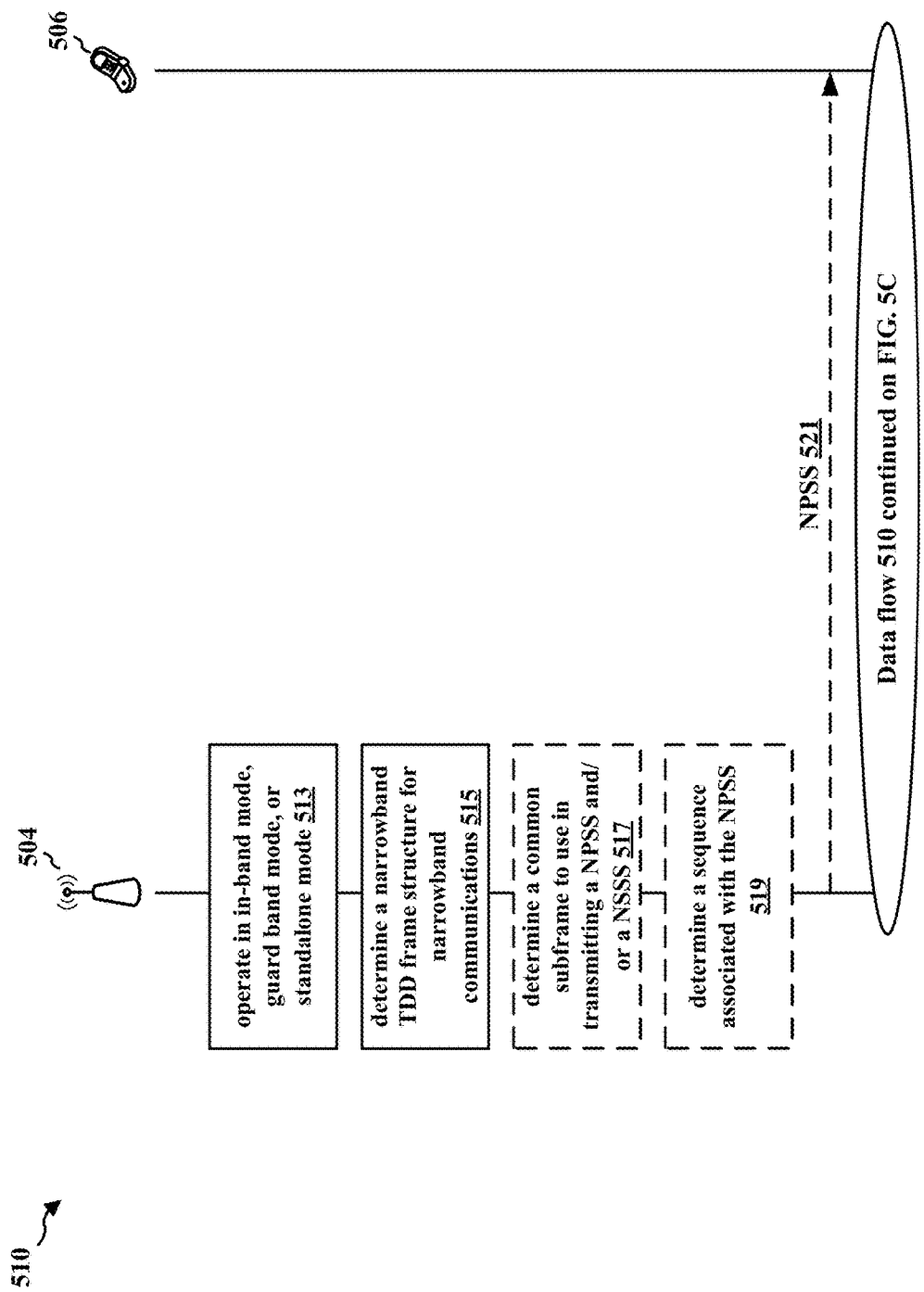
FIGS. 5B-5D are a diagram of a dataflow for narrowband communications using narrowband TDD frame structures in accordance with certain aspects of the disclosure.
Figure 5C:
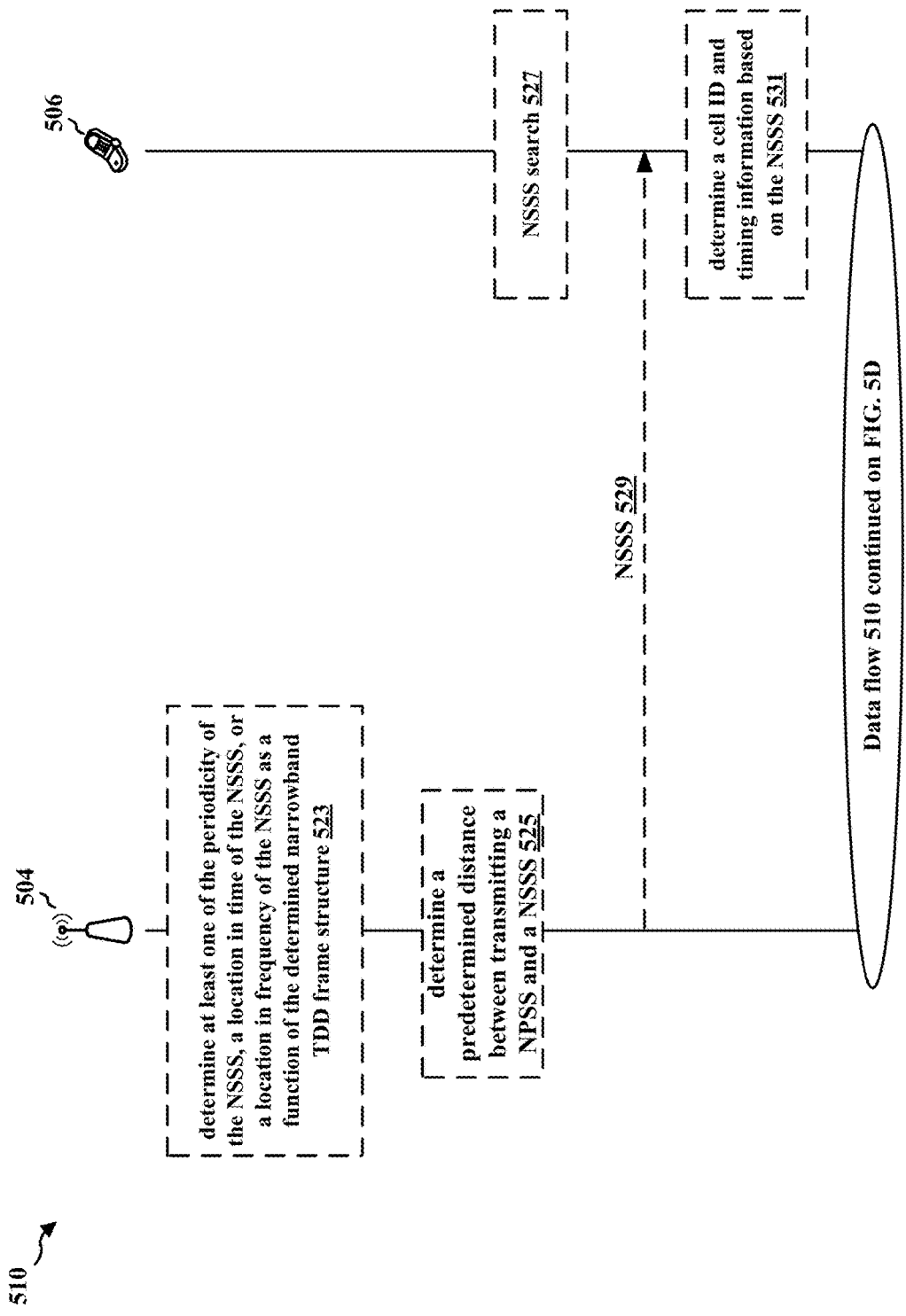
Figure 5D:
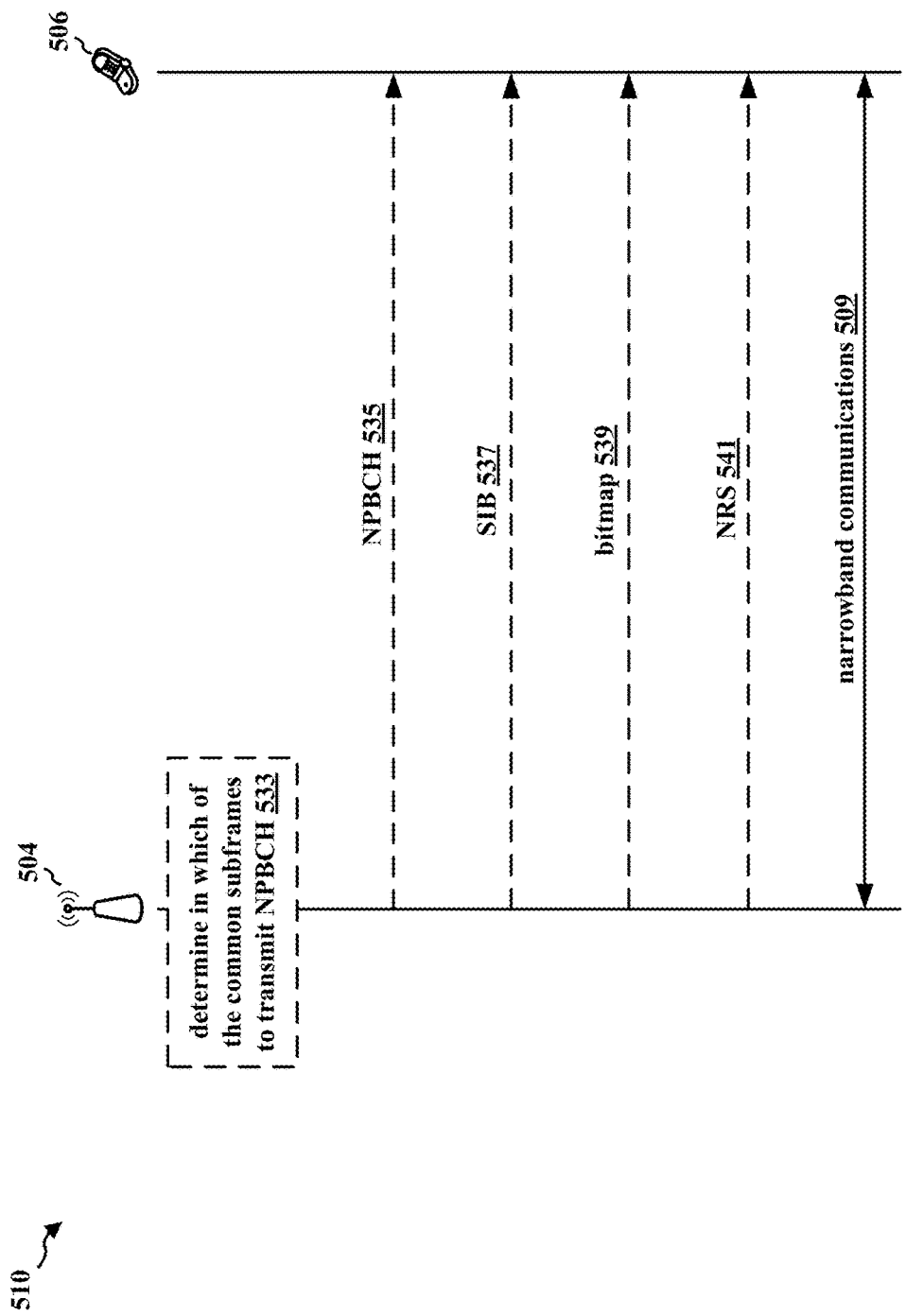

FIGS. 5B-5D illustrate a data flow 510 that may be used for narrowband communications in accordance with certain aspects of the disclosure. For example, the data flow 500 may be performed by a base station 504 and/or UE 506 (e.g., the base station 504 and the UE 506 in FIG. 5A). Base station 504 may correspond to base station 102, 180, eNB 310, apparatus 1102/1102', 1302/1302', 1502/1502', 1702/1702', 1902/1902', 2302/2302'. UE 506 may correspond to UE 104, 350, 1150, 1350, 1550, 1750, 1950, 2350. In addition, the base station 504 and the UE 506 may be configured to communicate using narrowband communications 509 (e.g., NB-IoT and/or eMTC). For example, the UE 506 may be an NB-IoT device and/or an eMTC device. In FIGS. 5B-5D, optional operations are indicated with dashed lines.

Referring to FIG. 5B, base station 504 may operate 513 in in-band mode, guard band mode, or standalone mode. In certain aspects, base station 504 may determine 515 a narrowband TDD frame structure for the narrowband communications 509 (see FIG. 5D) from a group of narrowband TDD frame structures (e.g., the configurations listed in table 410 in FIG. 4). In one aspect, each narrowband TDD frame structure in the group of narrowband TDD frame structures may include at least one common downlink subframe, as described below.

NPSS

In certain aspects, base station 504 may determine 517 a common subframe from a plurality of common subframes to use in transmitting an NPSS 521. For example, when the determine narrowband TDD frame structure is one of configurations 0, 1, 2, 3, 4, 5, 6, or m, the NPSS 521 may be sent on one of subframe 0 or subframe 5 because subframes 0 and 5 are the common downlink subframes in each of configurations 0, 1, 2, 3, 4, 5, 6, and m. In another example, when the determined narrowband TDD frame structure is determined from a subset of the configurations listed in table 410 (e.g., one of configurations 1, 2, 3, 4, 5, or 6), the NPSS 521 may be sent on one of subframe 0, subframe 5, or subframe 9 because subframes 0, 5, and 9 are common downlink subframes in each of configurations 1, 2, 3, 4, 5, and 6. Additionally and/or alternatively, the subframe used to transmit the NPSS 521 may be a function of the determined narrowband TDD frame structure. In one example, the function may be that the first downlink subframe in the narrowband TDD frame structure may be used to transmit the NPSS 521. In certain aspects, a periodicity (e.g., once every 20 ms) associated with a NPSS transmitted using the narrowband TDD frame structure may shorter or be longer as compared to a NPSS transmitted using a narrowband FDD frame structure (e.g., once every 10 ms). Reduced periodicity of NPSS transmissions (e.g., more frequent transmission of NPSS) may be useful if the NPSS carrier and NPBCH carrier are different, and the NPSS carrier cannot be power boosted as much as in FDD, for example. In such a scenario, the UE 506 may use more NPSS averaging to achieve increase coverage. Increased periodicity of NPSS transmissions (e.g., less frequent transmission of NPSS) may be useful so that transmissions of NPBCH, NPSS, NSSS, SIB, etc. can be accommodated in the same carrier.

In certain other aspects, base station 504 may determine 519 a sequence (e.g., a Zadoff Chu sequence) associated with the NPSS 521. In certain other aspects, the NPSS sequences 521 may be associated with at least one of the TDD mode or the determined narrowband TDD frame structure. In certain other aspects, the NPSS 521 may have the same set of sequences as an NPSS transmitted using a narrowband FDD frame structure. An FDD NPSS sequence may comprise a Zadoff Chu sequence of length 11 with root index 5, and the same sequence may be flipped in sign on some symbols to provide better timing properties. In certain other aspects, the NPSS 521 may have a different set of sequences than an NPSS transmitted using a narrowband FDD frame structure. In certain other aspects, the NPSS 521 may have a different Zadoff Chu sequence for initialization than an NPSS transmitted in a FDD frame structure. In certain other aspects, the NPSS 521 transmitted using the determined narrowband TDD frame structure may have a different cover code than an NPSS transmitted using a narrowband FDD frame structure. While the use of different NPSS sequences for narrowband TDD may add complexity to the processing at the UE, if a UE is aware that certain bands only support TDD or FDD, the UE 506 may limit the NPSS search to only one corresponding sequence in order to reduce such complexity.

NSSS

Referring to FIG. 5C, base station 504 may transmit an NSSS 529 using the determined narrowband TDD frame structure. In one aspect, the periodicity of the NSSS 529 transmitted using the narrowband TDD frame structure may be the same as compared to the periodicity of an NSSS transmitted using a narrowband FDD frame structure, which is transmitted in subframe 9 of every other radio frame.

Alternatively, the periodicity of the NSSS 529 transmitted using the narrowband TDD frame structure may be increased as compared to the periodicity of an NSSS transmitted using a narrowband FDD frame structure, which is transmitted in subframe 9 of every other radio frame. Hence, the periodicity of the NSSS 529 transmitted using the narrowband TDD frame structure may be greater than two radio frames. Increasing the periodicity of transmitting the NSSS 529 may be beneficial if separate carriers for NPSS 521/NSSS 529 and NPBCH/SIB because the NSSS subframe may not be usable otherwise. Also since NRS may not be present on the NSSS carrier, additional NSSS measurements may be needed.

In certain aspects, the NSSS 529 may be transmitted using a different RB (e.g., carrier) than the RB used to transmit the NPSS 521. In scenarios when the periodicity of the NPSS 521 is reduced (e.g., NPSS 521 is not transmitted in every radio frame) or increased (e.g., NPSS 521 is transmitted in every radio frame or more than once every radio frame), the NSSS 529 may be transmitted in radio frames that do not include the NPSS 521. Increasing the periodicity associated with might make sense if we have separate carriers for PSS/SSS and PBCH/SIB as the SSS subframe may not be usable otherwise. Also since NRS are not present anymore on that carrier may need more SSS for measurements.

Additionally and/or alternatively, the NSSS 529 and the NPSS 521 may be multiplexed such that one of the NSSS 529 or the NPSS 521 is transmitted in an even numbered subframe and the other one of the NSSS 529 or the NPSS 521 is transmitted in an odd numbered subframe.

In certain aspects, base station 504 may determine 517 a common subframe from a plurality of common subframes described above to transmit NSSS 529. For example, when the narrowband TDD frame structure is determined from one of configurations 0, 1, 2, 3, 4, 5, 6, and m, the NSSS 529 may be sent on one of subframe 0 or subframe 5 because subframes 0 and 5 are the common downlink subframes in each configuration in the group. In another example, when the narrowband TDD frame structure is determined from one of configurations 1, 2, 3, 4, 5, and 6, the NSSS 529 may be sent on one of subframe 0, subframe 5, or subframe 9 because subframes 0, 5, and 9 are the common downlink subframes in each of configurations 1, 2, 3, 4, 5, and 6. In one example, NSSS may be sent on a special subframe, which may cause a length of the NSSS to be different for a narrowband TDD configuration than for a narrowband FDD configuration.

In one aspect, base station 504 may determine 523 at least one of the periodicity of the NSSS 529, a location in time of the NSSS 529, or a location in frequency of the NSSS 529 as a function of the determined narrowband TDD frame structure.

In certain aspects, UE 506 may be able to differentiate between narrowband FDD frame structure and a narrowband TDD frame structure while performing an NSSS search 527. For example, when a narrowband FDD frame structure is used, the base station 504 may transmit the NPSS 521 in subframe 5 in odd numbered radio frames and the NSSS 529 in subframe 9 in even numbered radio frames. In certain other aspects, base station 504 may transmit the NPSS 521 in subframe 0 in odd numbered radio frames and the NSSS 529 in subframe 5 in even numbered radio frames. In certain other aspects, base station 504 may transmit the NPSS 521 in subframe 5 in even numbered radio frames and the NSSS 529 in subframe 0 in odd numbered radio frames. Based on the subframe number and even/odd radio frames used to transmit the NPSS 521 and the NSSS 529, the UE 506 may be able to determine (e.g., implicitly without signaling from the base station 504) if a narrowband FDD frame structure or a narrowband TDD frame structure is used by the base station 504. Additionally and/or alternatively, the UE 506 may be able to determine 531 a cell identification (ID) and timing information based on the NSSS 529. For example, the UE 506 may use the NSSS to determine a cell ID and a radio frame boundary (e.g., 20 ms frame boundary).

Referring to FIG. 5C, base station 504 may determine 525 a predetermined distance (e.g., subframe distance and/or radio frame boundary) between the NPSS 521 and the NSSS 529, and use the predetermined distance to convey information to UE 506. For example, the predetermined distance may be configured to convey information associated with at least one of the TDD mode (e.g., in-band mode, guard band mode, and/or standalone mode) used by base station 504, an FDD mode, the determined narrowband TDD frame structure, a bandwidth associated with the TDD mode, or a theta f or θf mapping associated with the narrowband TDD frame structure and used to indicate the NSSS 529 sequence. For narrowband communications using a narrowband FDD frame structure, the $\theta_f$ mapping may be used to indicate the NSSS sequence. For example, $\theta_f$ may be defined as $\theta_f = 33/132(n_f/2) \bmod 4$. In narrowband communications using a narrowband TDD frame structure, the $\theta_f$ mapping may be the same as that used for a narrowband FDD frame structure expect that the value of $n_f$ is different. The distance between the NPSS 521 and the NSSS 529 may be used to convey the value of $n_f$ that the UE 506 may use to determine the NSSS sequence using $\theta_f$ mapping.

NPBCH

Referring to FIG. 5D, when the base station 504 operates in in-band mode, base station 504 may determine 533 in which of the common subframes described above to transmit the NPBCH 535. In one aspect, the base station 504 may transmit the NPBCH 535 in a different narrowband carrier than the narrowband carrier used to transmit the NPSS 521 and/or the NSSS 529.

For example, when the narrowband TDD frame structure is determined from one of configurations 0, 1, 2, 3, 4, 5, 6, and m, the NPBCH 535 may be sent on one of subframe 0 or subframe 5 because subframes 0 and 5 are common downlink subframes in each configuration in the group. In another example, when the narrowband TDD frame structure is determined from one of configurations 1, 2, 3, 4, 5, and 6, the NPBCH 535 may be sent on one of subframe 0, subframe 5, or subframe 9 because subframes 0, 5, and 9 are common downlink subframes in each configuration in the group. Alternatively, base station 504 may transmit the NPBCH 535 in radio frames that do not include NSSS 529 (e.g., in order to accommodate the NSSS 529).

In certain aspects, the periodicity of NPBCH transmissions using the narrowband TDD frame structure may be reduced as compared to the periodicity of NPBCH transmissions using a narrowband FDD frame structure.

In certain scenarios, UE 506 may not have knowledge prior to the NPBCH decoding process if base station 504 is using a narrowband FDD frame structure or a narrowband TDD frame structure. In such scenarios, UE 506 may hypothesize whether base station 504 is using a narrowband FDD frame structure or a narrowband TDD frame structure during the NPBCH decoding process. To avoid scenarios in which the UE 506 hypothesizes the type of frame structure, base station 504 may include information in the NPBCH 535 to indicate to UE 506 that the narrowband TDD frame structure is being used. For example, base station 504 may include cyclic redundancy check (CRC) masking in the NPBCH 535 to indicate the narrowband TDD frame structure is being used. Additionally and/or alternatively, the CRC masking in the NPBCH 535 may indicate to UE 506 which configuration (e.g., see table 410 in FIG. 4) the narrowband TDD frame structure uses. Further, including the CRC masking may keep legacy UEs (e.g., UEs not configured for narrowband communications using a TDD frame structure) from attempting to decode the NPBCH 535.

In certain other aspects, the periodicity of the NPBCH 535, the location in time of the NPBCH 535, or a location in frequency of the NPBCH 535 transmitted by base station 504 may be related to the determined narrowband TDD frame structure.

Additionally, the NPBCH 535 may include a first bit that may indicate to UE 506 if a narrowband TDD frame structure is being used, a second bit that may indicate to UE 506 if a narrowband FDD frame structure being used, information indicating a RB location or subframe location associated with an SIB 537 transmitted by base station 504, or information used for decoding the SIB 537. In another aspect, the NPBCH 535 may include a single bit that may indicate to the UE 506 if a narrowband TDD frame structure or a narrowband FDD frame structure is being used.

SIB

In certain aspects, base station 504 may transmit SIB 537 (e.g., SIB-1) using the same RB and/or a different RB as the RB used to transmit one or more of the NPSS 521, the NSSS 529, and/or the NPBCH 535. The bandwidth used for the narrowband communications 509, deployment type (e.g., in-band mode, guard band mode, standalone mode), and/or frequency location associated with the NPBCH 535 may be used to by UE 506 to infer which RB is used to carry the SIB 537.

In certain aspects, base station 504 may transmit the SIB 537 using one of the common subframes described above. For example, when the narrowband TDD frame structure is one of configurations 0, 1, 2, 3, 4, 5, 6, and m, the SIB 537 may be sent on one of subframe 0 or subframe 5 because subframes 0 and 5 are common downlink subframes in each configuration in the group. In another example, when the narrowband TDD frame structure is determined from one of configurations 1, 2, 3, 4, 5, and 6, the SIB 537 may be sent on one of subframe 0, subframe 5, or subframe 9 because subframes 0, 5, and 9 are common downlink subframes in each of configuration 1, 2, 3, 4, 5, and 6. Alternatively, base station 504 may transmit the SIB 537 in a downlink subframe that is a function of the determined narrowband TDD frame structure (e.g., transmit SIB 537 in the first downlink subframe).

NRS

In certain aspects, base station 504 may transmit a narrowband reference signal (NRS) 541 using the narrowband TDD frame structure determined for the narrowband communications 509. For example, base station 504 may transmit the NRS using a subframe that is also used to transmit the SIB 537 and/or NPBCH 535. Additionally, the NRS 541 may be transmitted using a different narrowband carrier than the narrowband carrier used to transmit the NPSS 521 and/or the NSSS 529.

In certain other aspects, base station 504 may transmit the NRS 541 using one of the common subframes described above. For example, when the narrowband TDD frame structure is determined from one of configurations 0, 1, 2, 3, 4, 5, 6, and m, the NRS 541 may be sent on one of subframe 0 or subframe 5 because subframes 0 and 5 are common downlink subframes in each configuration in the group. Further, the NRS 541 may be sent on subframe 1 or subframe 6 because subframes 1 and 6 are special subframes (e.g., that include downlink resources) or downlink subframes in each of configuration 0, 1, 2, 3, 4, 5, 6, and m. In another example, when the narrowband TDD frame structure is determined from one of configurations 1, 2, 3, 4, 5, and 6, the NRS 541 may be sent on one of subframe 0, subframe 5, or subframe 9 because subframes 0, 5, and 9 are common downlink subframes in each configuration in the group. Alternatively, base station 504 may transmit the NRS 541 in a downlink subframe that is not a function of the determined narrowband TDD frame structure. For example, a NPBCH 535 transmitted (e.g., broadcast signaling) by base station 504 may be used to indicate the downlink subframes that include the NRS 541 to UE 506 when the downlink subframe used to transmit the NRS 541 is not a function of the determined narrowband TDD frame structure. In certain aspects, a bitmap 539 may be included in NPBCH 535.

In one aspect, the NRS 541 may be transmitted in the DwPTS portion (e.g., see FIG. 4) of a special subframe and in downlink subframes in the determined narrowband TDD frame structure. In one aspect, the same symbols in the DwPTS portion of the special subframe and the downlink subframes may be used to transmit the NRS 541. When the NRS 541 is transmitted in the DwPTS of the special subframe, the UpPTS portion of the special subframe may be punctured.

In certain aspects, a density of the NRS 541 transmitted using the narrowband TDD frame structure may be greater than an NRS density transmitted using a narrowband FDD frame structure. In other words, the NRS 541 occupancy (e.g., density) in the time-frequency grid may be larger in a narrowband TDD frame structure than in a narrowband FDD frame structure. Hence, a higher pilot density in the narrowband TDD frame structure may be used because, unlike the narrowband FDD frame structure, the narrowband TDD frame structure may have a reduced number of downlink subframes with which to average the channel variations and/or noise variations. In certain other aspects, the NRS 541 may be transmitted in a same subframe that base station 504 uses to transmit a CRS.

Figure 6:
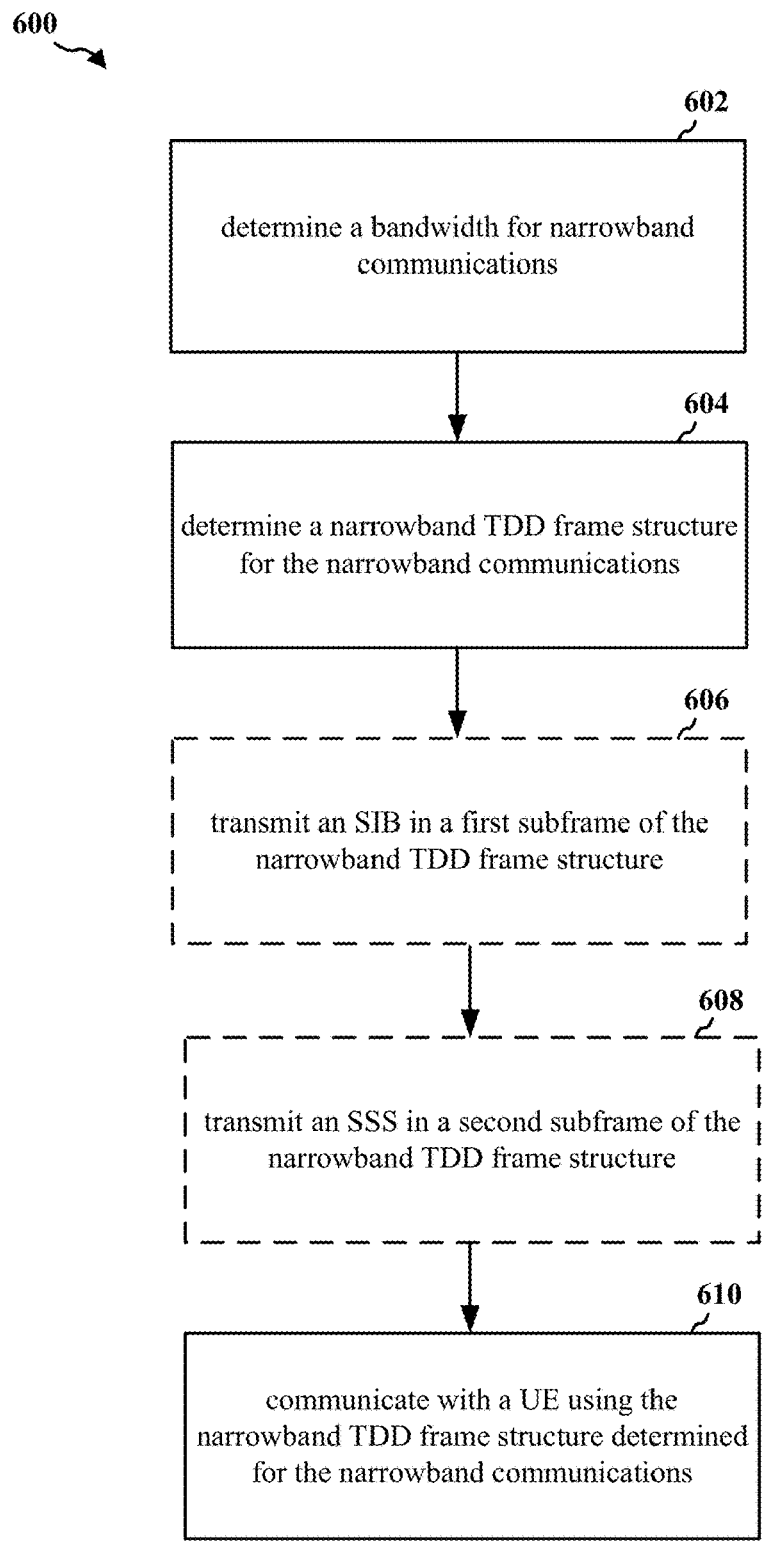
FIG. 6 is a flowchart of a method of wireless communication.

FIG. 6 is a flowchart 600 of a method of wireless communication. The method may be performed by a base station (e.g., the base station 102, 180, 504, eNB 310, the apparatus 1102/1102', 1302/1302', 1502/1502', 1702/1702', 1902/1902', 2302/2302'). In FIG. 6, optional operations are indicated with dashed lines.

At 602, the base station may determine a bandwidth for narrowband communications. In one aspect, the bandwidth for the narrowband communications may be include at least one flexible subframe that may be configured as an uplink subframe, a downlink subframe, or a special subframe depending on what is being transmitted by either the base station and/or the UE. For example, referring to FIG. 5A, base station 504 may operate 501 in standalone mode, and the bandwidth associated with standalone mode (e.g., the bandwidth the base station 504 determines to use for the narrowband communications 509) may be different than a bandwidth available for LTE communications.

At 604, the base station may determine a narrowband TDD frame structure for the narrowband communications. In certain configurations, the narrowband TDD frame structure may include two or more contiguous downlink subframes, or one or more flexible subframes that can be configured as either a downlink subframe or an uplink subframe. In certain other configurations, when a first duration is used by the UE to switch between monitoring a downlink subframe to sending a transmission using an uplink subframe, a special subframe may be located in both half frames of the narrowband TDD frame structure. In certain other configurations, when a second duration that is longer than the first duration is used by the UE to switch between monitoring the downlink subframe to sending the transmission using the uplink subframe, a special subframe may be located in a first half frame of the narrowband TDD frame structure but not the second half frame of the narrowband TDD frame structure. In certain other configurations, when a third duration that is longer than the second duration is used by the UE to switch between monitoring the downlink subframe to sending the transmission using the uplink subframe, no special subframes are present in the narrowband TDD frame structure. In certain other configurations, the narrowband TDD frame structure for the narrowband communications may be different than another TDD frame structure actively being used in an overlapping frequency region by a different RAT. For example, referring to FIG. 5A, base station 504 may determine 503 a narrowband TDD frame structure for narrowband communications 509. In one aspect, the narrowband TDD frame structure determined by the base station 504 may include a TDD frame structure that is different than an LTE TDD frame structure available for LTE communications. For example, the base station 504 may determine the narrowband TDD frame structure is either configuration m or n from table 410 in FIG. 4. When base station 504 repeats a downlink transmission, the base station 504 may choose a narrowband TDD frame structure with at least a minimum number of downlink subframes (e.g., at least three downlink subframes) so that the downlink transmission may be repeated in each of the downlink subframes. Using a narrowband TDD frame structure with at least three downlink subframes may enable base station 504 to send the NPSS, NSSS, and NPBCH in different subframes of the same radio frame, as described above with reference to FIGS. 5B-5D. In certain aspects, repetition of the NPSS, NSSS, and NPBCH may be implemented by repeating the NPSS, NSSS, and NPBCH over multiple symbols in the same subframe. Additionally and/or alternatively, base station 504 may determine 503 a narrowband TDD frame structure for the narrowband communications 509 based on a switching periodicity used by the base station 504 and/or the UE 506 to switch from transmitting on downlink subframes to monitoring uplink subframes, or vice versa. For example, when the switching periodicity used by base station 504 and/or UE 506 is longer than a switching periodicity in LTE TDD frame structures (e.g., configurations 0, 1, 2, 3, 4, 5, and 6), base station 504 may select either configuration m or n because the switching periodicity of configuration m and n are both greater than 10 ms (e.g., 20 ms). In certain configurations, the narrowband TDD frame structure (e.g., configuration m or n illustrated in FIG. 4) may include two or more contiguous downlink subframes, or one or more flexible subframes that can be configured as either a downlink subframe or an uplink subframe. For example, the narrowband TDD frame structure may include at least three contiguous downlink subframes (e.g., configurations 3, 4, 5, and m illustrated in FIG. 4). In certain other configurations, when a first duration is used by the UE 506 to switch between monitoring a downlink subframe to sending a transmission using an uplink subframe, a special subframe may be located in both half frames of the narrowband TDD frame structure (e.g., configurations 0, 1, 2, and 6 illustrated in FIG. 4). In certain other configurations, when a second duration that is longer than the first duration is used by the UE 506 to switch between monitoring the downlink subframe to sending the transmission using the uplink subframe, a special subframe may be located in a first half frame of the narrowband TDD frame structure but not the second half frame of the narrowband TDD frame structure (e.g., configurations 3, 4, and 5 illustrated in FIG. 4). In certain other configurations, when a third duration that is longer than the second duration is used by the UE 506 to switch between monitoring the downlink subframe to sending the transmission using the uplink subframe, no special subframes are present in the narrowband TDD frame structure (e.g., configuration m illustrated in FIG. 4). In certain other configurations, the narrowband TDD frame structure for the narrowband communications (e.g., configurations m or n illustrated in FIG. 4) may be different than another TDD frame structure (e.g., configurations 0, 1, 2, 3, 4, 5, and 6 illustrated in FIG. 4) actively being used in an overlapping frequency region by a different RAT.

At 606, the base station may transmit a SIB in a first subframe of the narrowband TDD frame structure. For example, referring to FIG. 5A, if one of configuration 4, 5, m, or n (e.g., configurations with four downlink subframes or configurations that are configurable with four downlink subframes) is determined for use as the narrowband TDD frame structure, an SIB 507 may also be transmitted in a subframe different than the subframe used to transmit the NSSS 505, as discussed above with respect to FIGS. 5B-5D. For example, assuming base station 504 determines the narrowband TDD frame structure includes configuration 5, base station 504 may transmit the NSSS 505 in subframe 5 and transmit the SIB 507 in subframe 7, or vice versa.

At 608, the base station may transmit a SSS in a second subframe of the narrowband TDD frame structure. In one aspect, the second subframe may be different than the first subframe. For example, referring to FIG. 5A, if one of configurations 4, 5, m, or n (e.g., configurations with four downlink subframes or configurations that are configurable with four downlink subframes) is determined for use as the narrowband TDD frame structure, an SIB 507 may also be transmitted in a subframe different than the subframe used to transmit the NSSS 505, as discussed above with reference to FIGS. 5B-5D. For example, assuming base station 504 determines the narrowband TDD frame structure includes configuration 5, base station 504 may transmit the NSSS 505 in subframe 5 and transmit the SIB 507 in subframe 7, or vice versa.

At 610, the base station may communicate with a UE using the narrowband TDD frame structure determined for the narrowband communications. For example, referring to FIG. 5A, the base station 504 and the UE 506 may be configured to communicate using narrowband communications 509 (e.g., NB-IoT and/or eMTC).

Figure 7:
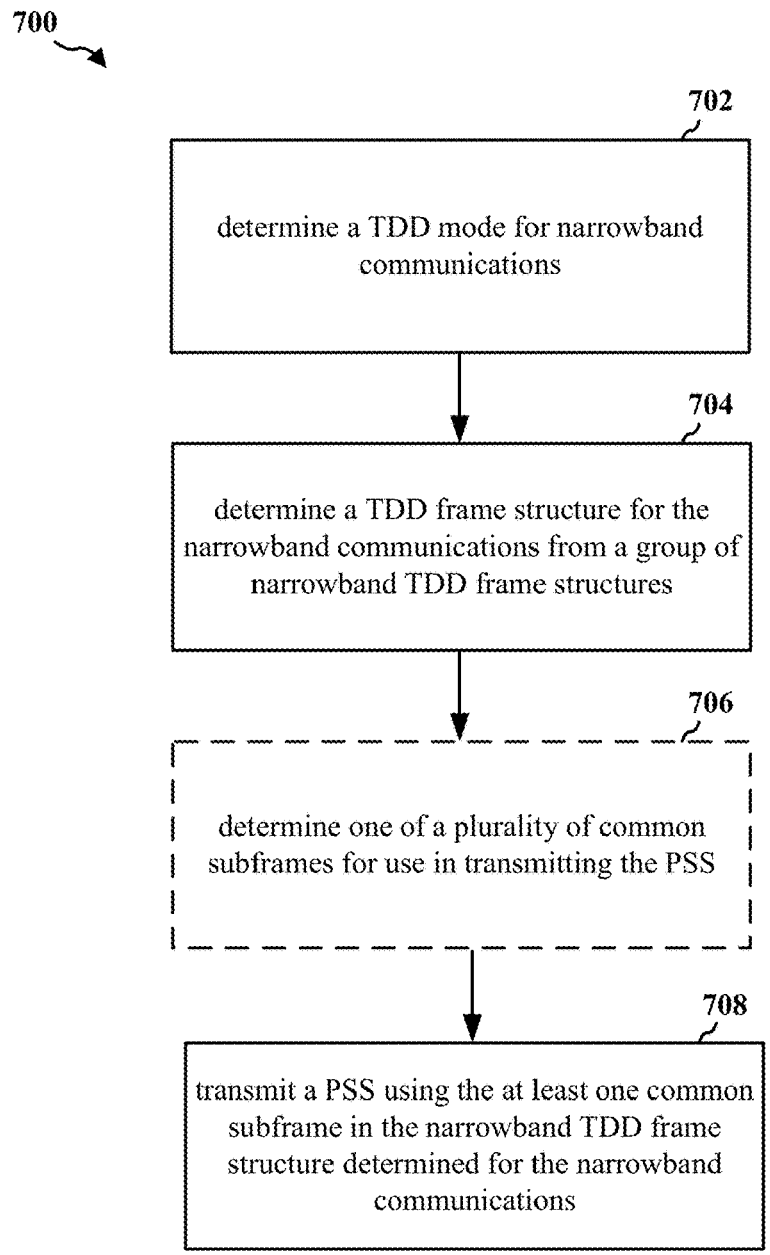
FIG. 7 is a flowchart of a method of wireless communication.

FIG. 7 is a flowchart 700 of a method of wireless communication. The method may be performed by a base station (e.g., the base station 102, 180, 504, eNB 310, the apparatus 1102/1102', 1302/1302', 1502/1502', 1702/1702', 1902/1902', 2302/2302'). In FIG. 7, optional operations are indicated with dashed lines.

At 702, the base station may determine a TDD mode for narrowband communications. For example, referring to FIGS. 5B-5D, base station 504 may operate 513 in in-band mode, guard band mode, or standalone mode.

At 704, the base station may determine a TDD frame structure for the narrowband communications from a group of narrowband TDD frame structures. In one aspect, at least one common subframe in each narrowband TDD frame structure in the group of narrowband TDD frame structures may be configured as a downlink subframe. In another aspect, a first periodicity associated with the PSS using the narrowband TDD frame structure may be increased as compared to a second periodicity associated with a transmission of a second PSS using a narrowband FDD frame structure. For example, referring to FIGS. 5B-5D, base station 504 may determine 515 a narrowband TDD frame structure for the narrowband communications 509 from a group of narrowband TDD frame structures (e.g., the configurations listed in table 410 in FIG. 4). In one aspect, each narrowband TDD frame structure in the group of narrowband TDD frame structures may include at least one common downlink subframe. Base station 504 may determine 515 which of the common subframes to use in transmitting an NPSS 521. For example, when the narrowband TDD frame structure is determined from one of configurations 0, 1, 2, 3, 4, 5, 6, and m, the NPSS 521 may be sent on one of subframe 0 or subframe 5 because subframes 0 and 5 are the common downlink subframes in each of configurations 0, 1, 2, 3, 4, 5, 6, and m. In another example, when the narrowband TDD frame structure is determined from one of configurations 1, 2, 3, 4, 5, and 6, the NPSS 521 may be sent on one of subframe 0, subframe 5, or subframe 9 because subframes 0, 5, and 9 are common downlink subframes in each configuration in the group. Additionally and/or alternatively, the subframe used to transmit the NPSS 521 may be a function of the determined narrowband TDD frame structure. In one example, the function may be that the first downlink subframe in the narrowband TDD frame structure may be used to transmit the NPSS 521. In certain aspects, a periodicity (e.g., once every 20 ms) associated with NPSS transmissions in the narrowband TDD frame structure may be reduced as compared to NPSS transmission in a narrowband FDD frame structure.

At 706, the base station may determine one of the plurality of common subframes for use in transmitting the PSS. In one aspect, the one of the plurality of common subframes may be determined as a function of the narrowband TDD frame structure selected for the narrowband communications. For example, referring to FIGS. 5B-5D, base station 504 may determine 515 which of the common subframes to use in transmitting an NPSS 521. In certain aspects, when the narrowband TDD frame structure is determined from one of configurations 0, 1, 2, 3, 4, 5, 6, and m, the NPSS 521 may be sent on one of subframe 0 or subframe 5 because subframes 0 and 5 are the common downlink subframes in each configuration in the group. In certain other aspects, when the narrowband TDD frame structure is determined from one of configurations 1, 2, 3, 4, 5, and 6, the NPSS 521 may be sent on one of subframe 0, subframe 5, or subframe 9 because subframes 0, 5, and 9 are common downlink subframes in each configuration in the group. Additionally and/or alternatively, the subframe used to transmit the NPSS 521 may be a function of the determined narrowband TDD frame structure. In one example, the function may be that the first downlink subframe in the narrowband TDD frame structure may be used to transmit the NPSS 521. In certain other aspects, a periodicity (e.g., once every 20 ms) associated with NPSS transmissions in the narrowband TDD frame structure may be reduced as compared to NPSS transmission in a narrowband FDD frame structure.

At 708, the base station may transmit a PSS using the at least one common subframe in the narrowband TDD frame structure determined for the narrowband communications. In one aspect, a first periodicity associated with the transmitting the PSS using the narrowband TDD frame structure may be reduced or increased as compared to a second periodicity associated with transmission of a second PSS using a narrowband FDD frame structure. For example, referring to FIGS. 5B-5D, base station 504 may determine 515 which of the common subframes to use in transmitting an NPSS 521. For example, when the narrowband TDD frame structure is determined from one of configurations 0, 1, 2, 3, 4, 5, 6, and m, the NPSS 521 may be sent on one of subframe 0 or subframe 5 because subframes 0 and 5 are the common downlink subframes in each configuration in the group. In another example, when the narrowband TDD frame structure is determined from one of configurations 1, 2, 3, 4, 5, and 6, the NPSS 521 may be sent on one of subframe 0, subframe 5, or subframe 9 because subframes 0, 5, and 9 are common downlink subframes in each configuration in the group. Additionally and/or alternatively, the subframe used to transmit the NPSS 521 may be a function of the determined narrowband TDD frame structure. In one example, the function may be that the first downlink subframe in the narrowband TDD frame structure may be used to transmit the NPSS 521. In certain aspects, a periodicity (e.g., once every 20 ms) associated with NPSS transmissions in the narrowband TDD frame structure may be reduced as compared to NPSS transmission in a narrowband FDD frame structure. In certain aspects, a periodicity (e.g., once every 20 ms) associated with NPSS transmissions in the narrowband TDD frame structure may be reduced as compared to NPSS transmission in a narrowband FDD frame structure.

Figure 8:
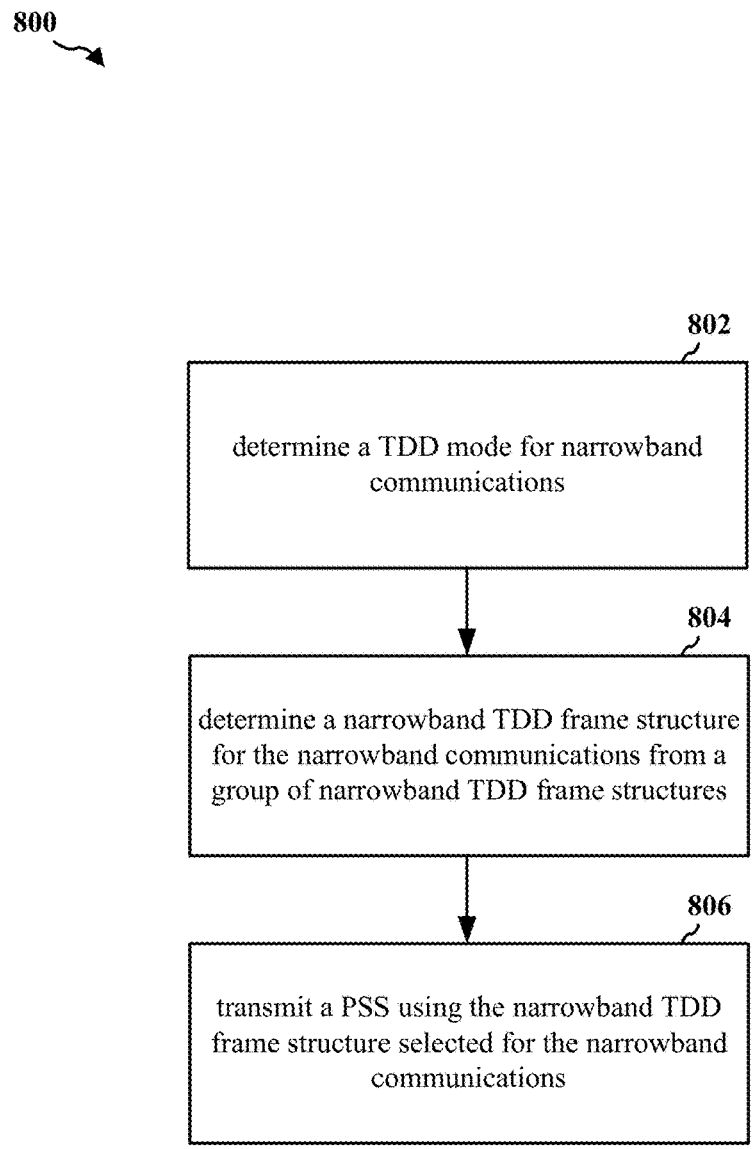
FIG. 8 is a flowchart of a method of wireless communication.

FIG. 8 is a flowchart 800 of a method of wireless communication. The method may be performed by a base station (e.g., the base station 102, 180, 504, eNB 310, the apparatus 1102/1102', 1302/1302', 1502/1502', 1702/1702', 1902/1902', 2302/2302').

At 802, the base station may determine a TDD mode for narrowband communications. For example, referring to FIGS. 5B-5D, base station 504 in may operate 513 in in-band mode, guard band mode, or standalone mode.

At 804, the base station may determine a narrowband TDD frame structure for the narrowband communications from a group of narrowband TDD frame structures. For example, referring to FIGS. 5B-5D, base station 504 may determine 515 a narrowband TDD frame structure for the narrowband communications 509 from a group of narrowband TDD frame structures (e.g., the configurations listed in table 410 in FIG. 4). In one aspect, each narrowband TDD frame structure in the group of narrowband TDD frame structures may include at least one common downlink subframe. Base station 504 may determine 515 which of the common subframes to use in transmitting an NPSS 521. For example, when the narrowband TDD frame structure is determined from one of configurations 0, 1, 2, 3, 4, 5, 6, and m, the NPSS 521 may be sent on one of subframe 0 or subframe 5 because subframes 0 and 5 are the common downlink subframes in each configuration in the group. In another example, when the narrowband TDD frame structure is determined from one of configurations 1, 2, 3, 4, 5, and 6, the NPSS 521 may be sent on one of subframe 0, subframe 5, or subframe 9 because subframes 0, 5, and 9 are common downlink subframes in each configuration in the group. Additionally and/or alternatively, the subframe used to transmit the NPSS 521 may be a function of the determined narrowband TDD frame structure. In one example, the function may be that the first downlink subframe in the narrowband TDD frame structure may be used to transmit the NPSS 521.

At 806, the base station may transmit a PSS using the narrowband TDD frame structure selected for the narrowband communications. In one aspect, a set of PSS sequences may be associated with at least one of the TDD mode or the determined narrowband TDD frame structure. In another aspect, the set of PSS sequences transmitted using the narrowband TDD frame structure may be the same as a second set of PSS sequences transmitted using a narrowband FDD frame structure. In a further aspect, the set of PSS sequences transmitted using the narrowband TDD frame structure may be different than a second set of PSS sequences transmitted using a narrowband FDD frame structure. In certain other aspects, the set of PSS sequences transmitted using the narrowband TDD frame structure may have a different Zadoff Chu sequence for initialization than the second set of PSS sequences transmitted using a narrowband FDD frame structure. In certain other aspects, the set of PSS sequences transmitted using the narrowband TDD frame structure may have a different cover code than the second set of PSS sequences transmitted using a narrowband FDD frame structure. For example, referring to FIGS. 5B-5D, base station 504 may determine 519 a sequence associated with the NPSS 521. In one aspect, the sequence of the NPSS 521 may be associated with at least one of the TDD mode or the determine narrowband TDD frame structure. In certain aspects, the NPSS 521 transmitted using the determine narrowband TDD frame structure may have the same sequence as an NPSS transmitted using a narrowband FDD frame structure. In certain other aspects, the NPSS 521 transmitted using the determined narrowband TDD frame structure may have a different sequence than an NPSS transmitted using a narrowband FDD frame structure. In certain other aspects, the NPSS 521 transmitted using the determined narrowband TDD frame structure may have a different Zadoff Chu sequence for initialization than an NPSS transmitted in a FDD frame structure. In certain other aspects, the NPSS 521 transmitted using the determined narrowband TDD frame structure may have a different cover code than an NPSS transmitted using a narrowband FDD frame structure.

Figure 9:
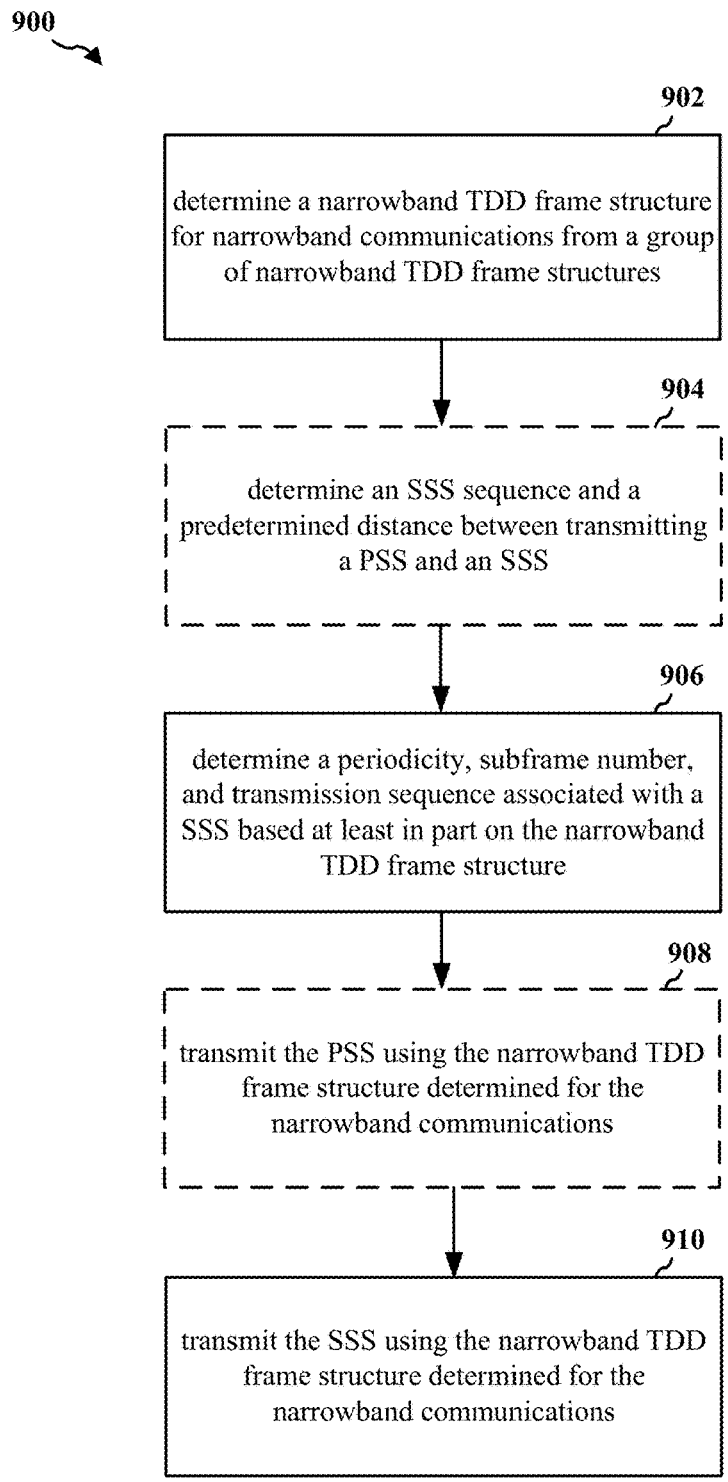
FIG. 9 is a flowchart of a method of wireless communication.

FIG. 9 is a flowchart 900 of a method of wireless communication. The method may be performed by a base station (e.g., the base station 102, 180, 504, eNB 310, the apparatus 1102/1102', 1302/1302', 1502/1502', 1702/1702', 1902/1902', 2302/2302'). In FIG. 9, optional operations are with dashed lines.

At 902, the base station may determine a narrowband communication frame structure comprising a FDD mode or a TDD mode and a particular TDD frame structure for narrowband communications from a group of narrowband TDD frame structures. In one aspect, least one common subframe in each narrowband TDD frame structure in the group of narrowband TDD frame structures may be configured as a downlink subframe. In another aspect, the SSS may be transmitted using the at least one common subframe in the narrowband TDD frame structure determined for the narrowband communications. In a further aspect, the group of narrowband TDD frame structures may include a subset of all narrowband TDD frame structures available for narrowband communications. For example, referring to FIGS. 5B-5D, base station 504 may determine 515 a narrowband TDD frame structure for the narrowband communications 509 from a group of narrowband TDD frame structures (e.g., the configurations listed in table 410 in FIG. 4). When the narrowband TDD frame structure is determined from one of configurations 0, 1, 2, 3, 4, 5, 6, and m, the NSSS 529 may be sent on one of subframe 0 or subframe 5 because subframes 0 and 5 are the common downlink subframes in each configuration in the group. In another example, when the narrowband TDD frame structure is determined from one of configurations 1, 2, 3, 4, 5, and 6, the NSSS 529 may be sent on one of subframe 0, subframe 5, or subframe 9 because subframes 0, 5, and 9 are the common downlink subframes in each configuration in the group.

At 904, the base station may determine an SSS sequence and a predetermined distance between transmitting the PSS and SSS. In one aspect, at least one of the SSS sequence or the predetermined distance may be configured to convey information associated with the narrowband communications to a UE. In another aspect, the information may include at least one of the TDD mode, the FDD mode, the narrowband TDD frame structure determined for narrowband communications, a bandwidth associated with the TDD mode, or a frequency offset of a first carrier used to transmit a physical broadcast channel (PBCH) or system information block (SIB) relative to a second carrier used to transmit one or more of the SSS or the PSS. For example, referring to FIGS. 5B-5D, base station 504 may determine a predetermined distance (e.g., subframe distance) between the NPSS 521 and the NSSS 529, and use the predetermined distance to convey information to UE 506. For example, the predetermined distance may be configured to convey information associated with at least one of the TDD mode (e.g., in-band mode, guard band mode, and/or standalone mode) used by base station 504, an FDD mode, the determined narrowband TDD frame structure, a bandwidth associated with the TDD mode, or a $\theta_f$ mapping associated with the narrowband TDD frame structure and used to indicate the NSSS 529 sequence. For narrowband communications using a narrowband FDD frame structure, the $\theta_f$ mapping used to indicate the NSSS sequence may be defined as $\theta_f = 33/132(n_f/2) \bmod 4$. In narrowband communications using a narrowband TDD frame structure, the $\theta_f$ mapping may be the same as that used for a narrowband FDD frame structure expect that the value of $n_f$ is different. The distance between the NPSS 521 and the NSSS 529 may be used to convey the value of $n_f$ that the UE 506 may use to determine the NSSS sequence using $\theta f$ mapping.

At 906, the base station may determine a periodicity, subframe number, and transmission sequence associated with a SSS based at least in part on the narrowband TDD frame structure. For example, referring to FIGS. 5B-5D, the NSSS 529 may be transmitted using a different RB (e.g., carrier) than the RB used to transmit the NPSS 521. In configurations when the periodicity of the NPSS 521 is reduced (e.g., NPSS 521 is not transmitted in every radio frame), the NSSS 529 may be transmitted in radio frames that do not include the NPSS 521. In one aspect, the NSSS 529 may be transmitted in the same subframe number that is used to transmit the NPSS 521 but in radio frames that do not include NPSS 521. For example, assuming that NPSS 521 is transmitted in subframe 5 in even numbered radio frames, NSSS 529 may be transmitted in subframe 5 in odd numbered radio frames. Alternatively, base station 504 may transmit the NPSS 521 in subframe 0 in odd numbered radio frames and the NSSS 529 in subframe 5 in even numbered radio frames. In another configuration, base station 504 may transmit the NPSS 521 in subframe 5 in even numbered radio frames and the NSSS 529 in subframe 0 in odd numbered radio frames.

At 908, the base station may transmit a PSS using the narrowband TDD frame structure determined for the narrowband communications. In an aspect, the PSS may be transmitted on a different narrowband carrier than the SSS. In another aspect, the PSS may be transmitted using a particular subframe. In a further aspect, the PSS may not be transmitted in every frame. In a further aspect, the SSS may be transmitted using the particular subframe in at least one frame in which the PSS is not transmitted.

In still another aspect, the PSS may be transmitted using a particular subframe. In still a further aspect, the SSS may be transmitted using a subframe other than the particular subframe. For example, referring to FIGS. 5B-5D, the NSSS 529 may be transmitted using a different RB (e.g., carrier) than the RB used to transmit the NPSS 521. In configurations when the periodicity of the NPSS 521 is reduced (e.g., NPSS 521 is not transmitted in every radio frame), the NSSS 529 may be transmitted in radio frames that do not include the NPSS 521. In one aspect, the NSSS 529 may be transmitted in the same subframe number that is used to transmit the NPSS 521 but in radio frames that do not include NPSS 521. For example, assuming that NPSS 521 is transmitted in subframe 5 in even numbered radio frames, NSSS 529 may be transmitted in subframe 5 in odd numbered radio frames. Alternatively, base station 504 may transmit the NPSS 521 in subframe 0 in odd numbered radio frames and the NSSS 529 in subframe 5 in even numbered radio frames. In another configuration, base station 504 may transmit the NPSS 521 in subframe 5 in even numbered radio frames and the NSSS 529 in subframe 0 in odd numbered radio frames.

At 910, the base station may transmit an SSS using the narrowband TDD frame structure determined for the narrowband communications. In an aspect, the SSS may be transmitted using a same subframe in at most every other frame. In another aspect, a periodicity associated with transmitting the SSS using the narrowband TDD frame structure may be increased or reduced as compared to a periodicity associated with transmission of a second SSS using a narrowband FDD frame structure. In a further aspect, at least one of the periodicity associated with transmitting the SSS, a location in time associated with transmitting the SSS, or a location in frequency associated with transmitting the SSS is related to the narrowband TDD frame structure determined for narrowband communications. For example, referring to FIGS. 5B-5D, base station 504 may transmit an NSSS 529 using the determined narrowband TDD frame structure. In one aspect, the NSSS 529 may be transmitted in the same subframe in every other radio frame. In other words, the periodicity of the NSSS 529 transmitted using the narrowband TDD frame structure may be reduced as compared to the periodicity of an NSSS transmitted using a narrowband FDD frame structure. Base station 504 may determine 523 at least one of the periodicity of the NSSS 529, a location in time of the NSSS 529, or a location in frequency of the NSSS 529 as a function of the determined narrowband TDD frame structure.

Figure 10:
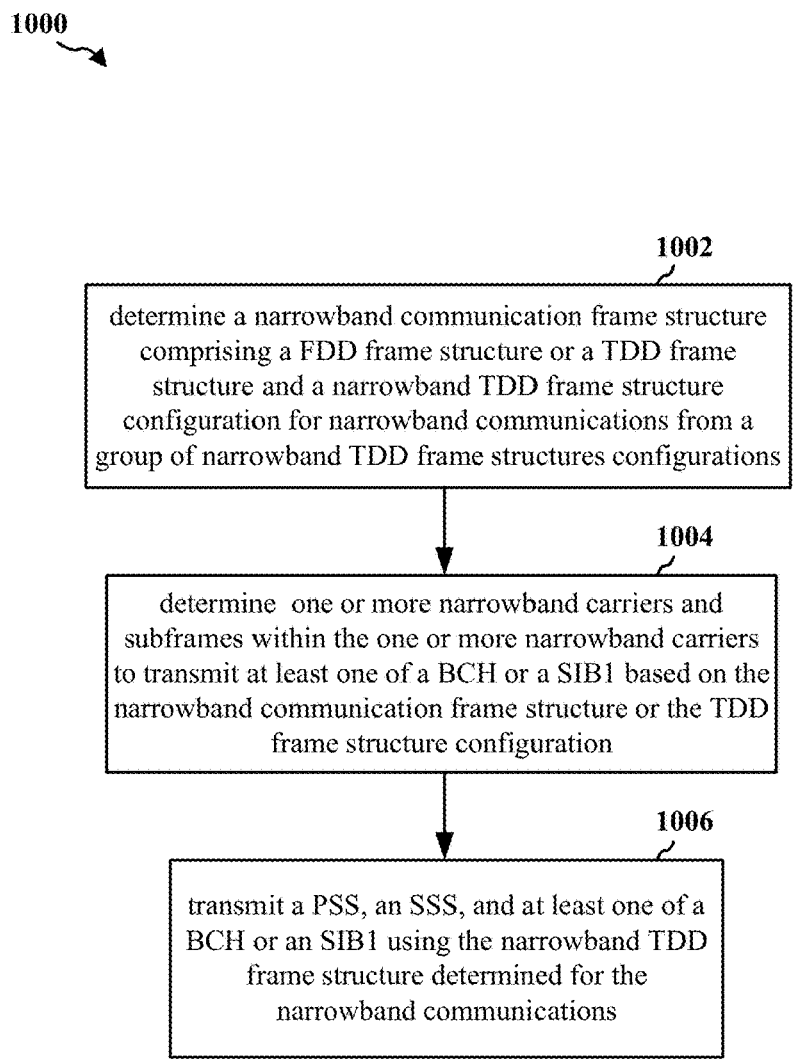
FIG. 10 is a flowchart of a method of wireless communication.

FIG. 10 is a flowchart 1000 of a method of wireless communication. The method may be performed by a base station (e.g., the base station 102, 180, 504, eNB 310, the apparatus 1102/1102', 1302/1302', 1502/1502', 1702/1702', 1902/1902', 2302/2302').

At 1002, the base station may determine a narrowband communication frame structure comprising a FDD frame structure or a TDD frame structure and a narrowband TDD frame structure configuration for narrowband communications from a group of narrowband TDD frame structures configurations. For example, referring to FIGS. 5B-5D, base station 504 may determine 515 to either use a FDD frame structure or a TDD frame structure that includes a narrowband TDD frame structure configuration for the narrowband communications 509 from a group of narrowband TDD frame structures (e.g., the configurations listed in table 410 in FIG. 4).

At 1004, the base station may determine one or more narrowband carriers and subframes within the one or more narrowband carriers to transmit at least one of a BCH or a SIB1 based on the narrowband communication frame structure or the TDD frame structure configuration. For example, referring to FIGS. 5B-5D, base station 504 may determine one or more narrowband carriers and subframes within the one or more narrowband carriers to transmit the SIB (e.g., SIB1) and/or the BCH. The base station 504 may transmit SIB 537 using the same RB (e.g., carrier) or a different RB as the RB used to transmit one or more of the NPSS 521, the NSSS 529, and/or the NPBCH 535. The bandwidth used for the narrowband communications 509, deployment type (e.g., in-band mode, guard band mode, standalone mode), and/or frequency location associated with the NPBCH 535 may be used to by UE 506 to infer which RB is used to transmit the SIB 537 to UE 506.

At 1006, the base station may transmit a PSS, an SSS, and at least one of a BCH or an SIB1 using the narrowband TDD frame structure determined for the narrowband communications. In one aspect, a carrier used for transmitting the BCH and/or the SIB may be different than a carrier used to transmit one or more of the PSS or the SSS. In another aspect, a narrowband carrier used for transmitting the BCH may be different than a narrowband carrier used to transmit one or more of the PSS or the SSS. In another aspect, the BCH may be transmitted using one or more subframes in every radio frame. In certain other aspects, the SSS may be transmitted using a particular subframe in every other frame.

In certain other aspects, the BCH may be transmitted using the particular subframe in each frame in which the SSS is not transmitted. In certain other aspects, a periodicity associated with the transmitting the BCH may be used to indicate which of the FDD frame structure or the TDD frame structure is being used for the narrowband communications. In certain other aspects, at least one of a periodicity associated with the transmitting the BCH, a location in time associated with the transmitting the BCH, or a location in frequency associated with the transmitting the BCH may be related to one or more of the narrowband TDD frame structure determined for narrowband communications, the second carrier containing the PSS or the SSS, or information sent on the PSS or the SSS. In certain other aspects, the first carrier used to transmit the BCH may be located at a fixed frequency offset with respect to the second carrier used to transmit the one or more of the PSS or the SSS. In certain other aspects, the BCH includes information that indicates at least one of the narrowband TDD frame structure configuration determined for the narrowband communications, whether a narrowband communications use uses the FDD frame structure or the TDD frame structure, or a carrier location or subframe location associated with the SIB1. In certain other aspects, the information may be included in the BCH by at least one of including additional bits in a payload, by using different CRC masks based on the additional bits, or by using different scrambling codes based on the additional bits. In certain other aspects, the first carrier may be used to transmit both the BCH and the SIB1 when the first carrier is different than the second carrier used to transmit the PSS and SSS. In certain other aspects, the SIB1 may be transmitted using a different carrier than the first carrier used to transmit the BCH. In certain other aspects, at least one of a narrowband carrier location relative to the PSS carrier location or a subframe used to transmit the SIB1 may be associated with the narrowband frame structure determined for the narrowband communications. For example, referring to FIGS. 5B-5D, base station 504 may transmit a NPBCH 535 using the determined narrowband TDD frame structure. In one aspect, the base station 504 may transmit the NPBCH 535 in a different RB than the RB used to transmit the NPSS 521 and/or the NSSS 529. UE 506 may not know before the NPBCH decoding process if base station 504 is using a narrowband FDD frame structure or a narrowband TDD frame structure. In such scenarios, UE 506 may hypothesize whether base station 504 is using a narrowband FDD frame structure or a narrowband TDD frame structure during the NPBCH decoding process. To avoid scenarios in which the UE 506 hypothesizes a type of frame structure, base station 504 may include information in the NPBCH 535 to indicate to UE 506 that the narrowband TDD frame structure is being used. For example, base station 504 may include CRC masking in the NPBCH 535 to indicate the narrowband TDD frame structure is being used. In addition, including the CRC masking may keep legacy UEs (e.g., UEs not configured for narrowband communications using a TDD frame structure) from attempting to decode the NPBCH 535. In certain aspects, the periodicity of the NPBCH 535, the location in time of the NPBCH 535, or a location in frequency of the NPBCH 535 transmitted by base station 504 may be related to the determined narrowband TDD frame structure. Additionally, the NPBCH 535 may include a first bit that may indicate to UE 506 if a narrowband TDD frame structure being used, a second bit that may indicate to UE 506 if a narrowband FDD frame structure being used, information indicating a RB location or subframe location associated with an SIB 537 transmitted by base station 504, or information used for decoding the SIB 537.

Figure 11:
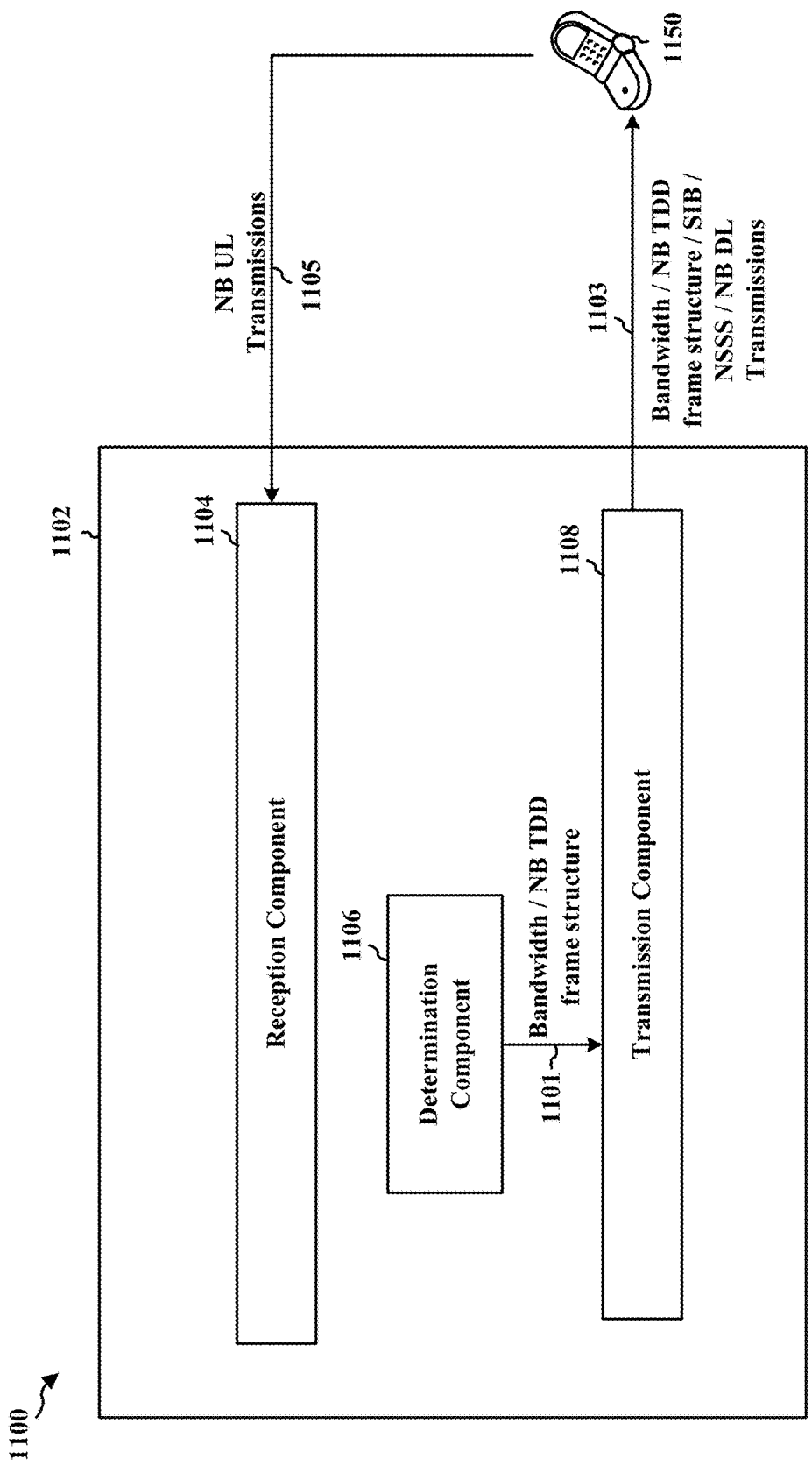
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station (e.g., the base station 102, 180, 310, 504, the apparatus 1102', 1302/1302', 1502/1502', 1702/1702', 1902/1902', 2302/2302') in narrowband communication (e.g., NB-IoT communication or eMTC) with UE 1150 (e.g., UE 104, 350, 506, 1350, 1550, 1750, 1950, 2350). The apparatus may include a reception component 1104, a determination component 1106, and a transmission component 1108.

The determination component 1106 may be configured to determine a bandwidth for narrowband communications. In one aspect, the bandwidth for the narrowband communications may be different than a bandwidth available for LTE communications. The determination component 1106 may be configured to determine a narrowband TDD frame structure for the narrowband communications. In an aspect, the narrowband TDD frame structure may be different than an LTE TDD frame structure available for LTE communications. In another aspect, a switching periodicity from downlink subframes to uplink subframes in the narrowband TDD frame structure may be longer than a switching periodicity in LTE TDD frame structures. In a further aspect, the narrowband TDD frame structure has at least three contiguous downlink subframes. The determination component 1106 may be configured to send a signal 1101 including information associated with the bandwidth for narrowband communications and/or the narrowband TDD frame structure for the narrowband communications to the transmission component 1108.

The transmission component 1108 may be configured to transmit a SIB 1103 in a first subframe of the narrowband TDD frame structure to the UE 1150. The transmission component 1108 may be configured to transmit a SSS 1103 in a second subframe of the narrowband TDD frame structure. In one aspect, the second subframe may be different than the first subframe. The transmission component 1108 may be configured to transmit information associated with one or more of information 1103 associated with the bandwidth for narrowband communications and/or information 1103 the narrowband TDD frame structure for the narrowband communications to UE 1150.

The reception component 1104 and/or the transmission component 1108 may be configured to communicate 1103, 1105 with the UE 1150 using the narrowband TDD frame structure determined for narrowband communications. For example, the reception component 1104 may be configured to receive narrowband uplink transmissions 1105 from the UE 1150. The transmission component 1108 may be configured to transmit one or more narrowband downlink transmissions 1103 to the UE 1150.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
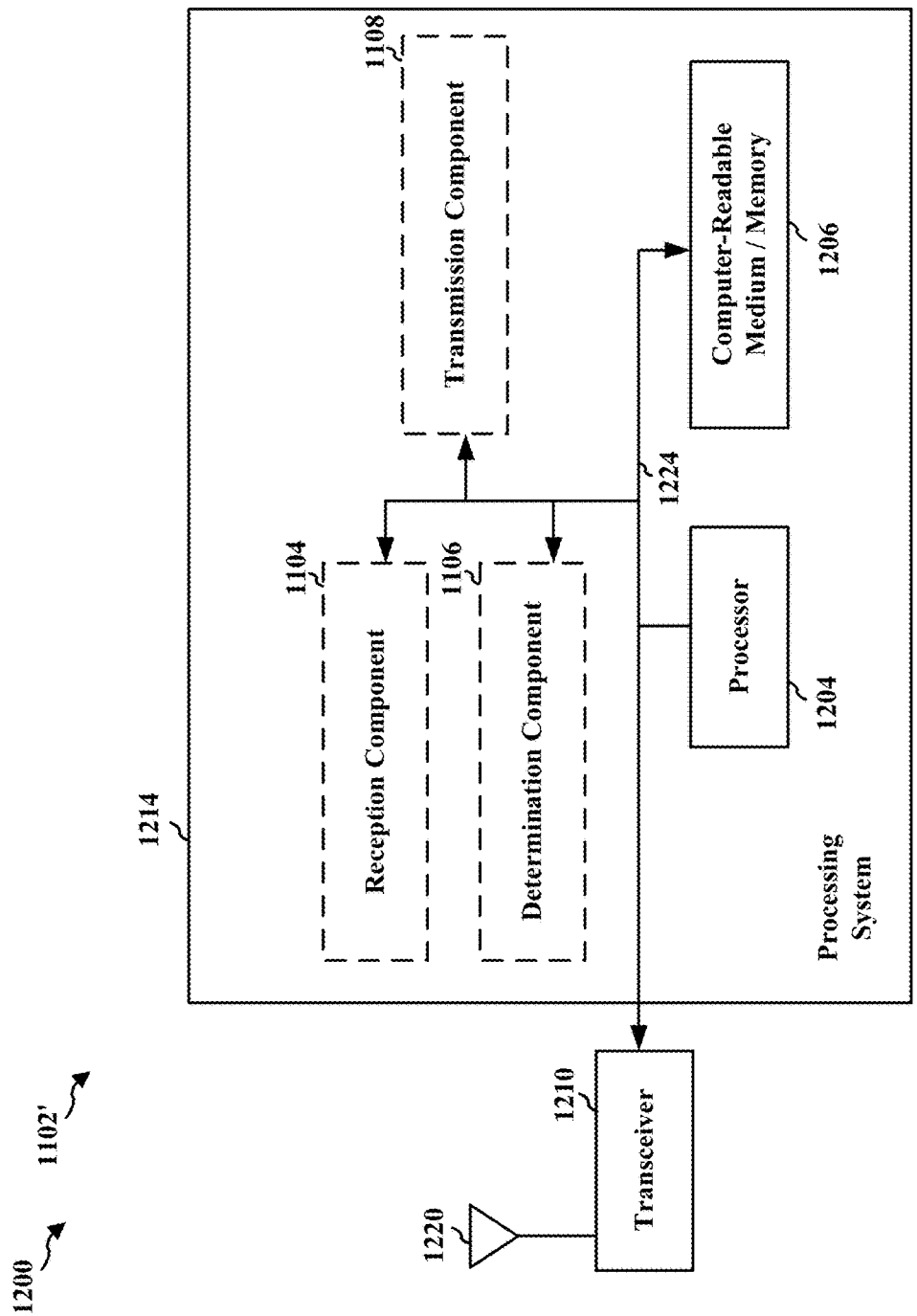
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described above for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof. The processing system 1214 may be a component of the eNB 310 and may include the memory 376 and/or at least one of the TX processor 316, the RX processor 370, and the controller/processor 375.

In certain aspects, the apparatus 1102/1102' for wireless communication may include means for determining a bandwidth for narrowband communications. In one aspect, the bandwidth for the narrowband communications may be different than a bandwidth available for LTE communications. In certain other aspects, the apparatus 1102/1102' for wireless communication may include means for determining a narrowband TDD frame structure for the narrowband communications. In an aspect, the narrowband TDD frame structure may be different than an LTE TDD frame structure available for LTE communications. In another aspect, a switching periodicity from downlink subframes to uplink subframes in the narrowband TDD frame structure may be longer than a switching periodicity in LTE TDD frame structures. In a further aspect, the narrowband TDD frame structure has at least three contiguous downlink subframes. In certain other aspects, the apparatus 1102/1102' for wireless communication may include means for transmitting an SIB in a first subframe of the narrowband TDD frame structure. In certain other aspects, the apparatus 1102/1102' for wireless communication may include means for transmitting an SSS in a second subframe of the narrowband TDD frame structure. In one aspect, the second subframe may be different than the first subframe. In certain other aspects, the apparatus 1102/1102' for wireless communication may include means for communicating with a UE using the narrowband TDD frame structure determined for the narrowband communications. The aforementioned means may be one or more of the aforementioned components of the apparatus 1102 and/or the processing system 1214 of the apparatus 1102' configured to perform the functions recited by the aforementioned means. As described above, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
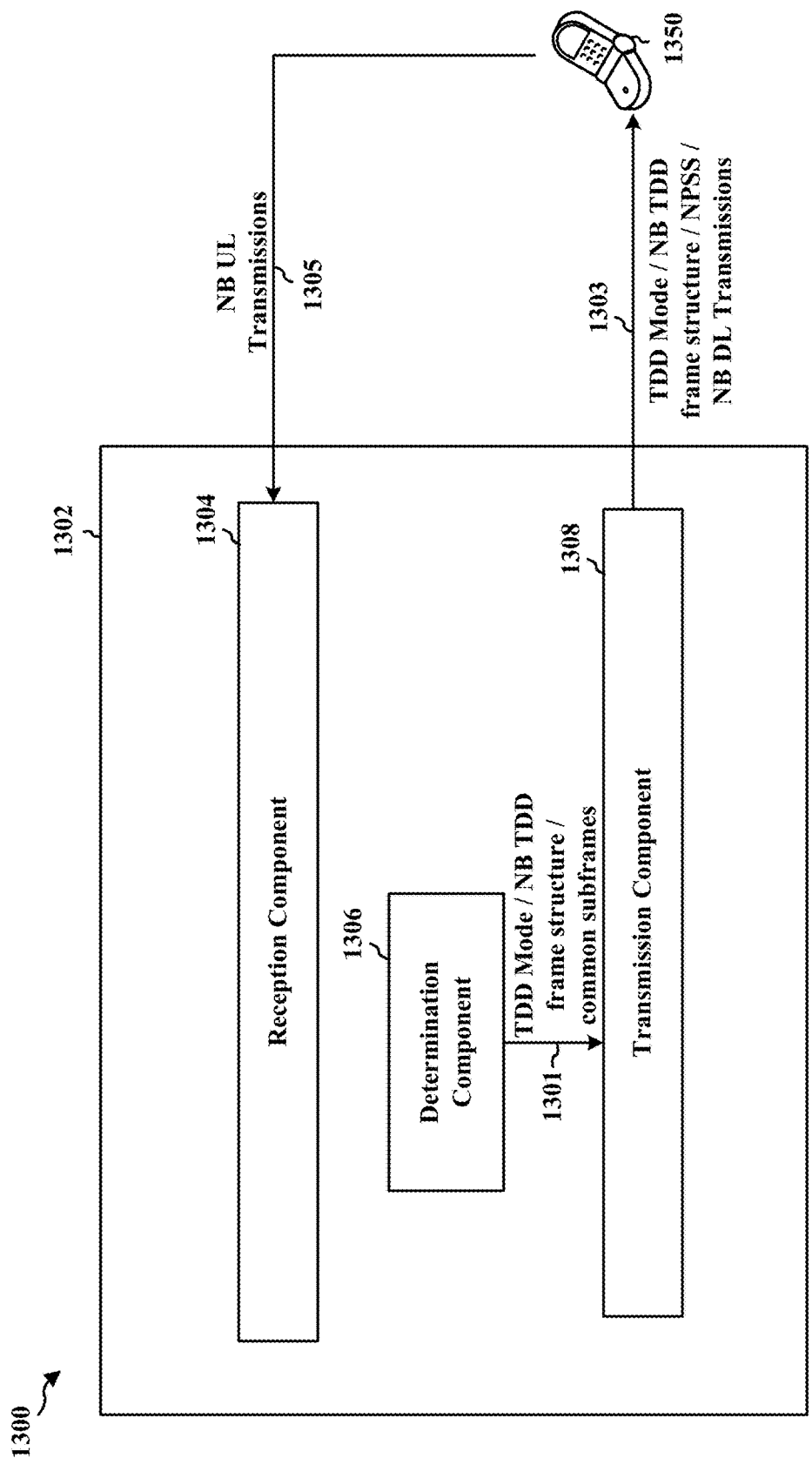
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station (e.g., the base station 102, 180, 310, 504, the apparatus 1102/1102', 1302', 1502/1502', 1702/1702', 1902/1902', 2302/2302') in narrowband communication (e.g., NB-IoT communication or eMTC) with UE 1350 (e.g., UE 104, 350, 506, 1150, 1550, 1750, 1950, 2350). The apparatus may include a reception component 1304, a determination component 1306, and a transmission component 1308.

The determination component 1306 may be configured to determine a TDD mode for narrowband communications. The determination component 1306 may be configured to determine a TDD frame structure for the narrowband communications from a group of narrowband TDD frame structures. In one aspect, at least one common subframe in each narrowband TDD frame structure in the group of narrowband TDD frame structures may be configured as a downlink subframe. In another aspect, a first periodicity associated with the PSS using the narrowband TDD frame structure may be increased as compared to a second periodicity associated with transmission of a second PSS using a narrowband FDD frame structure. The determination component 1306 may be configured to determine one of a plurality of common subframes for use in transmitting the PSS. In one aspect, the one of the plurality of common subframes may be determined as a function of the narrowband TDD frame structure selected for the narrowband communications. The determination component 1306 may be configured to send a signal 1301 that includes information associated with one or more of the TDD mode for narrowband communications, TDD frame structure for narrowband communications, and/or the one of the plurality of common subframes to the transmission component 1308.

The transmission component 1308 may be configured to transmit information 1303 associated with one or more of the TDD mode for narrowband communications, TDD frame structure for narrowband communications, and/or the one of the plurality of common subframes to the UE 1350. The transmission component 1308 may be configured to transmit a PSS 1303 (e.g., NPSS) using the at least one common subframe in the narrowband TDD frame structure determined for the narrowband communications. In one aspect, a first periodicity associated with the transmitting the PSS 1303 using the narrowband TDD frame structure may be increased as compared to a second periodicity associated with transmission of a second PSS 1303 using a narrowband FDD frame structure.

The reception component 1304 and/or the transmission component 1308 may be configured to communicate 1303, 1305 with the UE 1350 using the narrowband TDD frame structure determined for narrowband communications. For example, the reception component 1304 may be configured to receive narrowband uplink transmissions 1305 from the UE 1350. The transmission component 1308 may be configured to transmit one or more narrowband downlink transmissions 1303 to the UE 1350.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
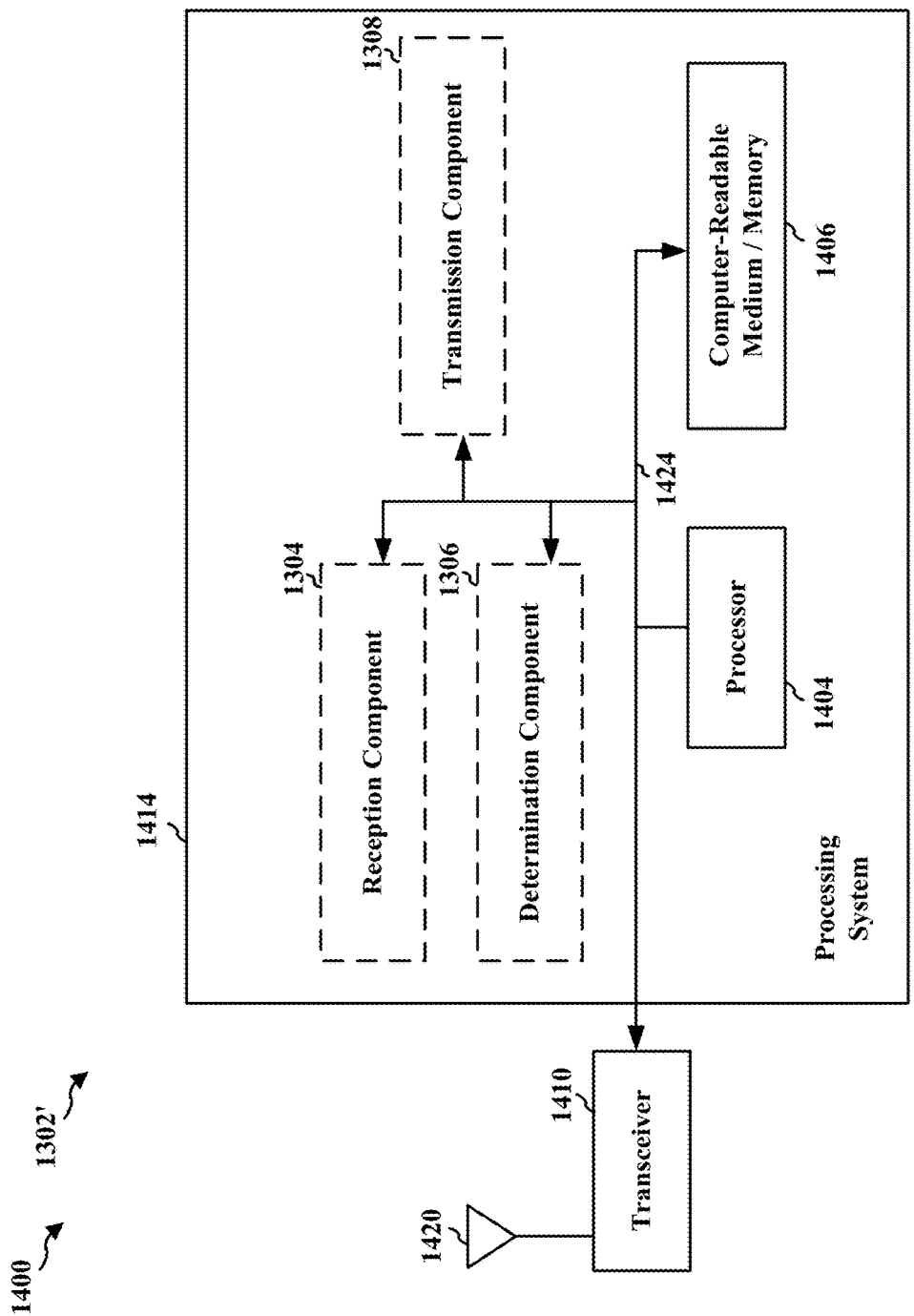
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described above for any particular apparatus. The computer-readable medium/memory 1406 may also be used for storing data that is manipulated by the processor 1404 when executing software. The processing system 1414 further includes at least one of the components 1304, 1306, 1308. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In certain aspects, the apparatus 1302/1302' for wireless communication may include means for determining a TDD mode for narrowband communications. In certain other aspects, the apparatus 1302/1302' for wireless communication may include means for determining a TDD frame structure for the narrowband communications from a group of narrowband TDD frame structures. In one aspect, at least one common subframe in each narrowband TDD frame structure in the group of narrowband TDD frame structures may be configured as a downlink subframe. In another aspect, a first periodicity associated with the PSS using the narrowband TDD frame structure may be increased as compared to a second periodicity associated with transmission of a second PSS using a narrowband FDD frame structure. In certain other aspects, the apparatus 1302/1302' for wireless communication may include means for determining one of the plurality of common subframes for use in transmitting the PSS. In one configuration, the one of the plurality of common subframes may be determined as a function of the narrowband TDD frame structure selected for the narrowband communications. In certain other aspects, the apparatus 1302/1302' for wireless communication may include means for transmitting a PSS using the at least one common subframe in the narrowband TDD frame structure determined for the narrowband communications. In one aspect, a first periodicity associated with the transmitting the PSS using the narrowband TDD frame structure may be increased as compared to a second periodicity associated with transmission of a second PSS using a narrowband FDD frame structure. The aforementioned means may be one or more of the aforementioned components of the apparatus 1302 and/or the processing system 1414 of the apparatus 1302' configured to perform the functions recited by the aforementioned means. As described above, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
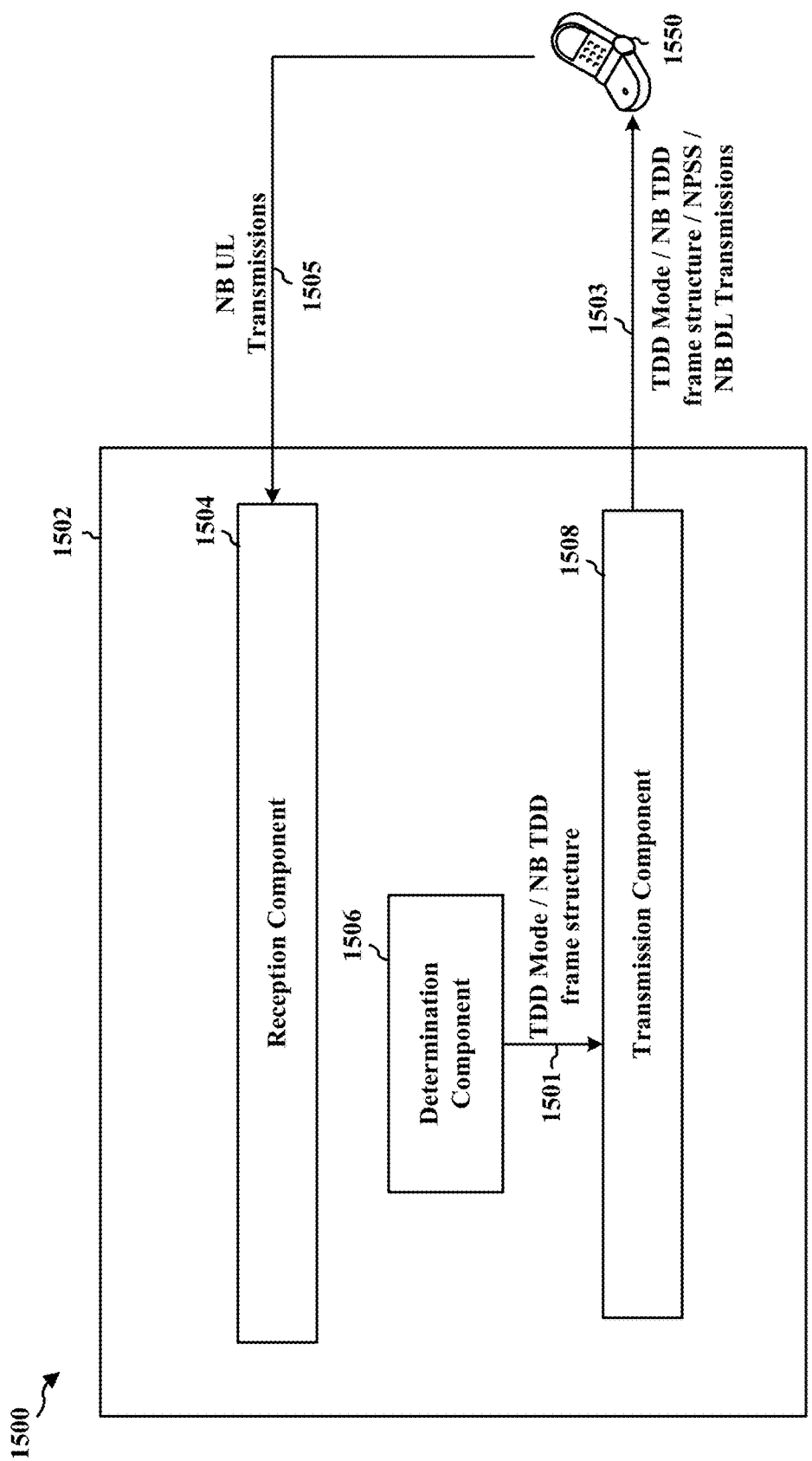
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a base station (e.g., the base station 102, 180, 310, 504, the apparatus 1102/1102', 1302/1302', 1502', 1702/1702', 1902/1902', 2302/2302') in narrowband communication (e.g., NB-IoT communication or eMTC) with UE 1550 (e.g., UE 104, 350, 506, 1150, 1350, 1750, 1950, 2350). The apparatus may include a reception component 1504, a determination component 1506, and a transmission component 1508.

The determination component 1506 may be configured to determine a TDD mode for narrowband communications. The determination component 1506 may be configured to determine a narrowband TDD frame structure for the narrowband communications from a group of narrowband TDD frame structures. The determination component 1506 may be configured to send a signal 1501 including information associated with one or more of the TDD mode for narrowband communications or the narrowband TDD frame structure for the narrowband communications.

The transmission component 1508 may be configured to transmit a PSS 1503 using the narrowband TDD frame structure selected for the narrowband communications. In one aspect, a sequence of the PSS 1503 may be associated with at least one of the TDD mode or the determined narrowband TDD frame structure. In another aspect, the PSS sequence transmitted using the narrowband TDD frame structure may be the same as a second PSS sequence transmitted using a narrowband FDD frame structure. In a further aspect, the PSS sequence transmitted using the narrowband TDD frame structure may be different than a second PSS sequence transmitted using a narrowband FDD frame structure. In certain other aspects, the PSS sequence transmitted using the narrowband TDD frame structure may have a different Zadoff Chu sequence for initialization than the second PSS sequence transmitted using a narrowband FDD frame structure. In certain other aspects, the PSS sequence transmitted using the narrowband TDD frame structure may have a different cover code than the second PSS sequence transmitted using a narrowband FDD frame structure. The transmission component 1508 may be configured to transmit information 1503 associated with one or more of the TDD mode for narrowband communications or the narrowband TDD frame structure for the narrowband communications.

The reception component 1504 and/or the transmission component 1508 may be configured to communicate 1503, 1505 with the UE 1550 using the narrowband TDD frame structure determined for narrowband communications. For example, the reception component 1504 may be configured to receive narrowband uplink transmissions 1505 from the UE 1550. The transmission component 1508 may be configured to transmit one or more narrowband downlink transmissions 1503 to the UE 1550.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
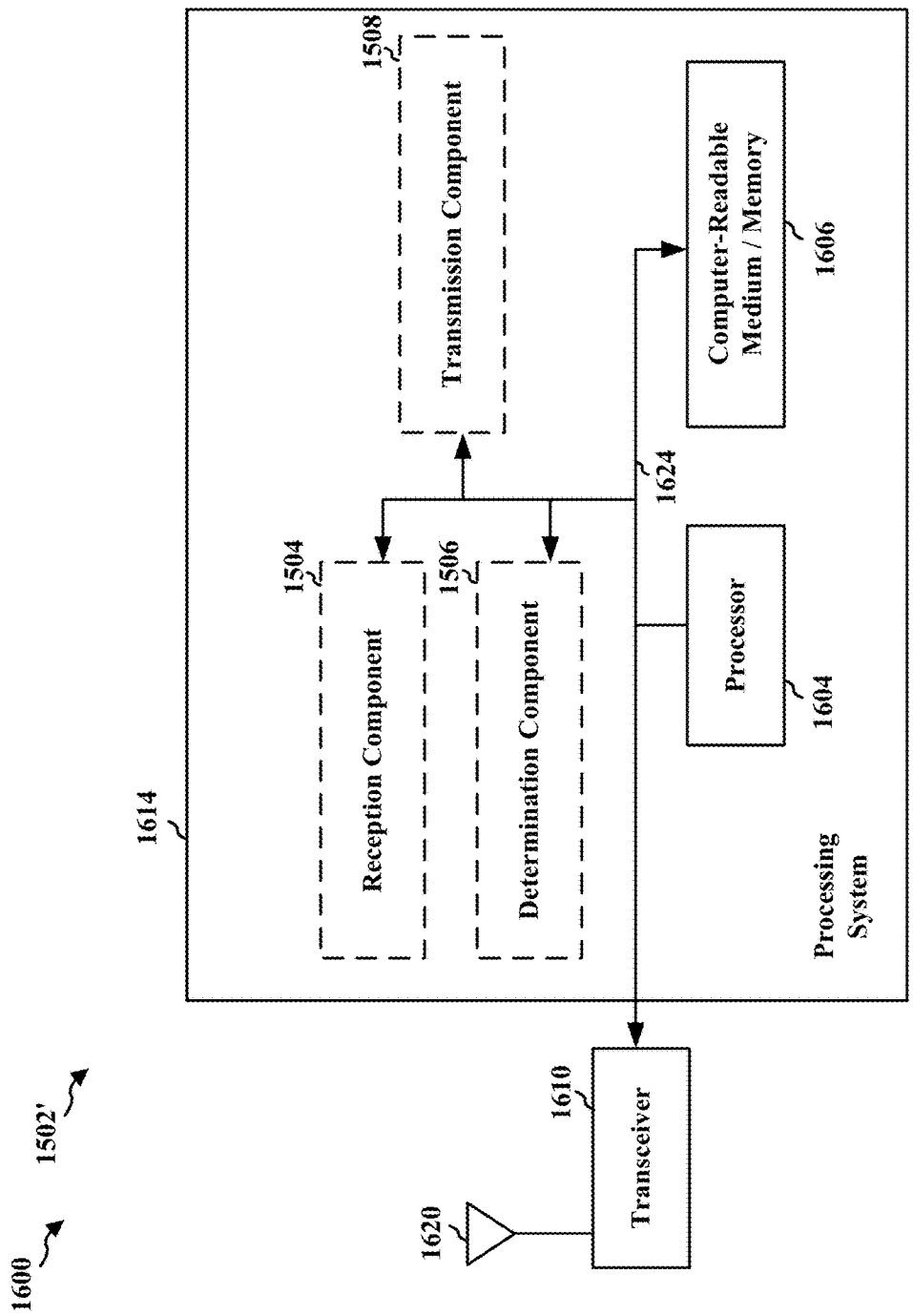
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1508, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described above for any particular apparatus. The computer-readable medium/memory 1606 may also be used for storing data that is manipulated by the processor 1604 when executing software. The processing system 1614 further includes at least one of the components 1504, 1506, 1508. The components may be software components running in the processor 1604, resident/stored in the computer readable medium/memory 1606, one or more hardware components coupled to the processor 1604, or some combination thereof. The processing system 1614 may be a component of the base station 310 and may include the memory 376 and/or at least one of the TX processor 316, the RX processor 370, and the controller/processor 375.

In certain aspects, the apparatus 1502/1502' for wireless communication may include means for determining a TDD mode for narrowband communications. In certain other aspects, the apparatus 1502/1502' for wireless communication may include means for determining a narrowband TDD frame structure for the narrowband communications from a group of narrowband TDD frame structures. In certain other aspects, the apparatus 1502/1502' for wireless communication may include means for transmitting a PSS using the narrowband TDD frame structure selected for the narrowband communications. In one aspect, a sequence of the PSS may be associated with at least one of the TDD mode or the determined narrowband TDD frame structure. In another aspect, the PSS sequence transmitted using the narrowband TDD frame structure may be the same as a second PSS sequence transmitted using a narrowband FDD frame structure. In a further aspect, the PSS sequence transmitted using the narrowband TDD frame structure may be different than a second PSS sequence transmitted using a narrowband FDD frame structure. In certain other aspects, the PSS sequence transmitted using the narrowband TDD frame structure may have a different Zadoff Chu sequence for initialization than the second PSS sequence transmitted using a narrowband FDD frame structure. In certain other aspects, the PSS sequence transmitted using the narrowband TDD frame structure may have a different cover code than the second PSS sequence transmitted using a narrowband FDD frame structure. The aforementioned means may be one or more of the aforementioned components of the apparatus 1502 and/or the processing system 1614 of the apparatus 1502' configured to perform the functions recited by the aforementioned means. As described above, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 17:
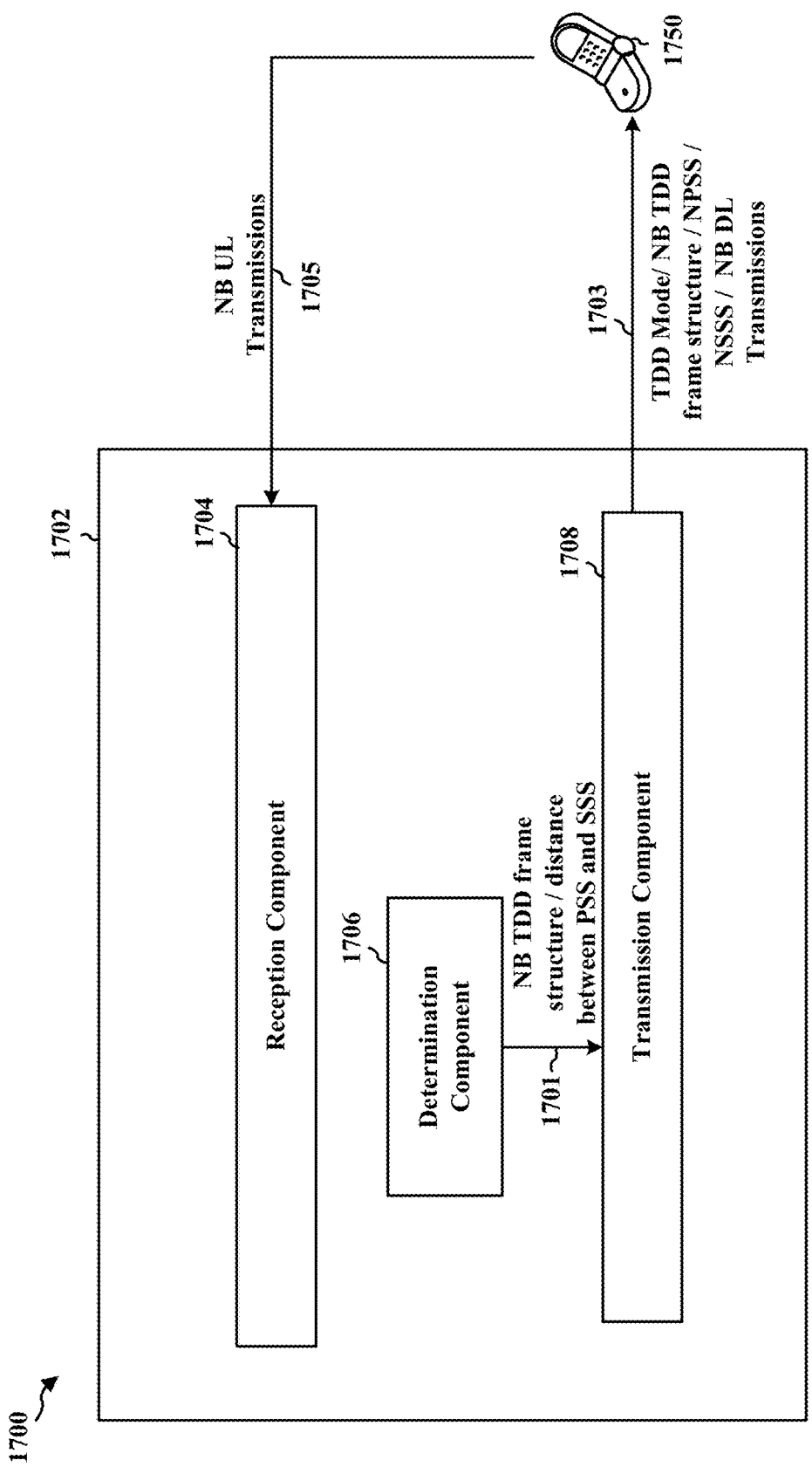
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a base station (e.g., the base station 102, 180, 310, 504, the apparatus 1102/1102', 1302/1302', 1502/1502', 1702', 1902/1902', 2302/2302') in narrowband communication (e.g., NB-IoT communication or eMTC) with UE 1750 (e.g., UE 104, 350, 506, 1150, 1350, 1550, 1950, 2350). The apparatus may include a reception component 1704, a determination component 1706, and a transmission component 1708.

The determination component 1706 may be configured to determine a narrowband TDD frame structure for narrowband communications from a group of narrowband TDD frame structures. In one aspect, least one common subframe in each narrowband TDD frame structure in the group of narrowband TDD frame structures may be configured as a downlink subframe. In another aspect, the SSS may be transmitted using the at least one common subframe in the narrowband TDD frame structure determined for the narrowband communications. In a further aspect, the group of narrowband TDD frame structures may include a subset of all narrowband TDD frame structures available for narrowband communications. The determination component 1706 may be configured to determine a predetermined distance between transmitting a PSS and an SSS. In one aspect, the predetermined distance may be configured to convey information associated with the narrowband communications to a UE. In another aspect, the information may include at least one of TDD mode, FDD mode, the narrowband TDD frame structure determined for narrowband communications, or a bandwidth associated with the TDD mode. The determination component 1706 may be configured to send a signal 1701 including information associated with at least one of the narrowband TDD frame structure for narrowband communications and/or the predetermined distance between transmitting the PSS and the SSS to the transmission component 1708.

The transmission component 1708 may be configured to transmit a PSS 1703 using the narrowband TDD frame structure determined for the narrowband communications. In an aspect, the PSS 1703 may be transmitted on a different resource block than the SSS. In another aspect, the PSS 1703 may be transmitted using a particular subframe. In a further aspect, the PSS 1703 may not be transmitted in every frame. In a further aspect, the SSS 1703 may be transmitted using the particular subframe in at least one frame in which the PSS 1703 is not transmitted. In still another aspect, the PSS 1703 may be transmitted using a particular subframe in every other frame. In still a further aspect, the SSS 1703 may be transmitted using a subframe other than the particular subframe in each frame in which the PSS 1703 is not transmitted. The transmission component 1708 may be configured to transmit an SSS 1703 using the narrowband TDD frame structure determined for the narrowband communications. In an aspect, the SSS 1703 may be transmitted using a same subframe in at most every other frame. In another aspect, a periodicity associated with transmitting the SSS 1703 using the narrowband TDD frame structure may be reduced as compared to a periodicity associated with transmission of a second SSS 1703 using a narrowband FDD frame structure. In a further aspect, at least one of the periodicity associated with transmitting the SSS 1703, a location in time associated with transmitting the SSS 1703, or a location in frequency associated with transmitting the SSS 1703 is related to the narrowband TDD frame structure determined for narrowband communications.

The reception component 1704 and/or the transmission component 1708 may be configured to communicate 1703, 1705 with the UE 1750 using the narrowband TDD frame structure determined for narrowband communications. For example, the reception component 1704 may be configured to receive narrowband uplink transmissions 1705 from the UE 1750. The transmission component 1708 may be configured to transmit one or more narrowband downlink transmissions 1703 to the UE 1750.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
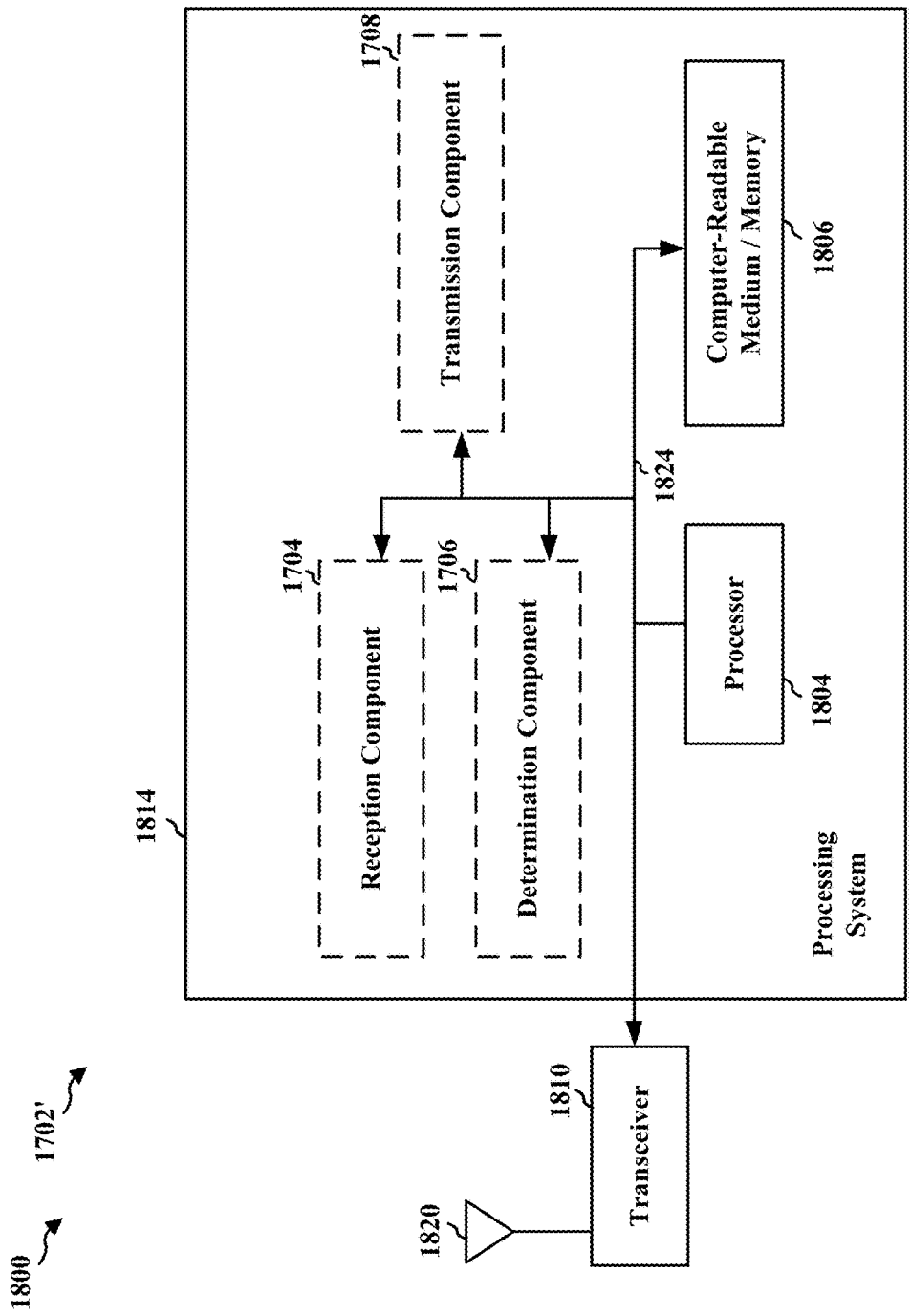
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1708, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described above for any particular apparatus. The computer-readable medium/memory 1806 may also be used for storing data that is manipulated by the processor 1804 when executing software. The processing system 1814 further includes at least one of the components 1704, 1706, 1708. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375.

In certain aspects, the apparatus 1702/1702' for wireless communication may include means for determining a narrowband TDD frame structure for narrowband communications from a group of narrowband TDD frame structures. In one aspect, least one common subframe in each narrowband TDD frame structure in the group of narrowband TDD frame structures may be configured as a downlink subframe. In another aspect, the SSS may be transmitted using the at least one common subframe in the narrowband TDD frame structure determined for the narrowband communications. In a further aspect, the group of narrowband TDD frame structures may include a subset of all narrowband TDD frame structures available for narrowband communications. In certain other aspects, the apparatus 1702/1702' for wireless communication may include means for determining a predetermined distance between transmitting a PSS and an SSS. In one aspect, the predetermined distance may be configured to convey information associated with the narrowband communications to a UE. In another aspect, the information may include at least one of TDD mode, FDD mode, the narrowband TDD frame structure determined for narrowband communications, or a bandwidth associated with the TDD mode. In certain other aspects, the apparatus 1702/1702' for wireless communication may include means for transmitting a PSS using the narrowband TDD frame structure determined for the narrowband communications. In an aspect, the PSS may be transmitted on a different resource block than the SSS. In another aspect, the PSS may be transmitted using a particular subframe. In a further aspect, the PSS may not be transmitted in every frame. In a further aspect, the SSS may be transmitted using the particular subframe in at least one frame in which the PSS is not transmitted. In still another aspect, the PSS may be transmitted using a particular subframe in every other frame. In still a further aspect, the SSS may be transmitted using a subframe other than the particular subframe in each frame in which the PSS is not transmitted. In certain other aspects, the apparatus 1702/1702' for wireless communication may include means for transmitting an SSS using the narrowband TDD frame structure determined for the narrowband communications. In an aspect, the SSS may be transmitted using a same subframe in at most every other frame. In another aspect, a periodicity associated with transmitting the SSS using the narrowband TDD frame structure may be reduced as compared to a periodicity associated with transmission of a second SSS using a narrowband FDD frame structure. In a further aspect, at least one of the periodicity associated with transmitting the SSS, a location in time associated with transmitting the SSS, or a location in frequency associated with transmitting the SSS is related to the narrowband TDD frame structure determined for narrowband communications. The aforementioned means may be one or more of the aforementioned components of the apparatus 1702 and/or the processing system 1814 of the apparatus 1702' configured to perform the functions recited by the aforementioned means. As described above, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
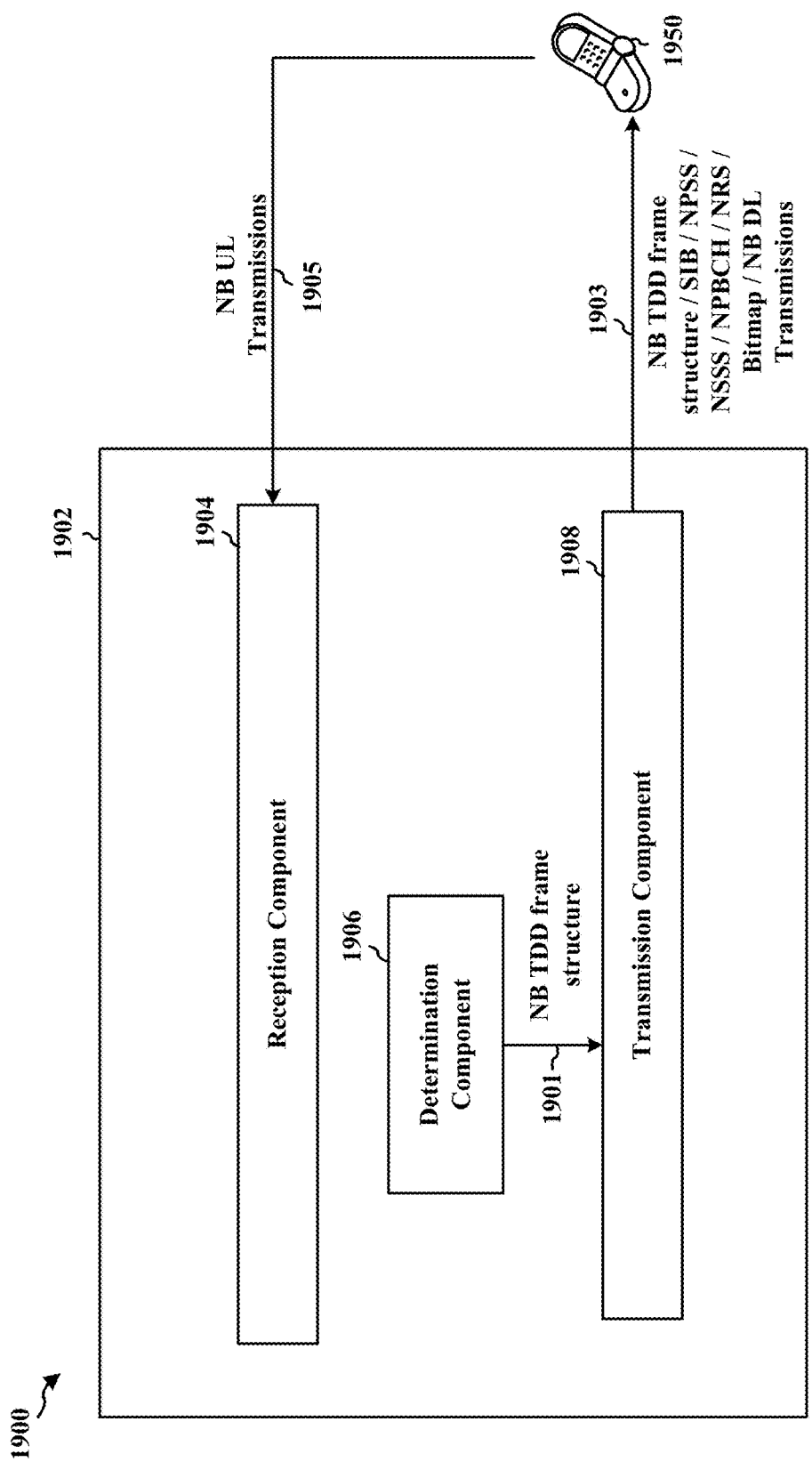
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be a base station (e.g., the base station 102, 180, 310, 504, the apparatus 1102/1102', 1302/1302', 1502/1502', 1702/1702', 1902', 2302/2302') in narrowband communication (e.g., NB-IoT communication or eMTC) with UE 1950 (e.g., UE 104, 350, 506, 1150, 1350, 1550, 1750, 2350). The apparatus may include a reception component 1904, a determination component 1906, and a transmission component 1908.

The determination component 1906 may be configured to determine a narrowband TDD frame structure for narrowband communications from a group of narrowband TDD frame structures. In one aspect, the narrowband TDD frame structure including a set of downlink subframes and more than one special subframe. In certain other configurations, the determination component 1906 may be configured to determine a set of narrowband carriers and a minimum set of subframes on the set of narrowband carriers based at least in part on the set of downlink subframes and more than one special subframe on which a NRS should be transmitted. The determination component 1906 may be configured to send a signal 1901 including information associated with the narrowband TDD frame structure for narrowband communications to the transmission component 1908.

The transmission component 1908 may be configured to transmit a PSS 1903, an SSS 1903, and a BCH 1903 using the narrowband TDD frame structure determined for the narrowband communications. In one aspect, a resource block used for transmitting the BCH 1903 may be different than a resource block used to transmit one or more of the PSS 1903 or the SSS 1903. In another aspect, the BCH 1903 may be transmitted using one or more subframes in every radio frame. In a further aspect, the SSS 1903 may be transmitted using a particular subframe in every other frame. In still another aspect, the BCH 1903 may be transmitted using the particular subframe in each frame in which the SSS is not transmitted. In yet a further aspect, a first periodicity associated with the transmitting the BCH 1903 using the narrowband TDD frame structure may be reduced as compared to a second periodicity associated with transmitting the BCH 1903 using a FDD frame structure. In another aspect, a CRC masking may be included in the BCH 1903 to indicate the narrowband TDD frame structure. In another aspect, at least one of a periodicity associated with the transmitting the BCH 1903, a location in time associated with the transmitting the BCH, or a location in frequency associated with the transmitting the BCH 1903 may be related to the narrowband TDD frame structure determined for narrowband communications. In another aspect, the BCH 1903 may include at least one of a first bit indicating the narrowband TDD frame structure determined for the narrowband communications, a second bit indicating a FDD frame structure determined for the narrowband communications, or information indicating a resource block location or subframe location associated with a SIB 1903. The transmission component 1908 may be configured to transmit a SIB 1903 using the narrowband TDD frame structure determined for the narrowband communications. In one aspect, the SIB 1903 may be transmitted using a same resource block as a resource block used to transmit one or more of the PSS 1903, SSS 1903, or BCH 1903. In another aspect, the SIB 1903 may be transmitted using a different resource block as a resource block used to transmit one or more of the PSS 1903, SSS 1903, or BCH 1903. In a further aspect, at least one of a resource block or a subframe used to transmit the SIB 1903 may be associated with the narrowband TDD frame structure determined for the narrowband communications. The transmission component 1908 may be configured to transmit information indicating additional subframes used to transmit the NRS 1903. In one aspect, the information may include broadcast signaling. The transmission component 1908 may be configured to transmit a NRS 1903 using the narrowband TDD frame structure determined for the narrowband communications. In one aspect, the NRS 1903 may be transmitted using a subframe that is also used to transmit the SIB 1903 and BCH 1903. In another aspect, the NRS 1903 may be transmitted using a resource block that is different than a resource block used to transmit at least one of the PSS 1903 or the SSS 1903. In another aspect, the same subframe used to transmit the NRS 1903, SIB 1903, and BCH 1903 may be not a function of the narrowband TDD frame structure determined for the narrowband communications. In a further aspect, the same subframe used to transmit the NRS 1903, SIB 1903, and BCH 1903 may be a function of the narrowband TDD frame structure determined for the narrowband communications. In another aspect, a density of the NRS 1903 transmitted using the narrowband TDD frame structure may be increased as compared to a density of an NRS 1903 transmitted using a narrowband FDD frame structure. In still another aspect, the NRS 1903 may be transmitted in a symbols and resource elements used to transmit a CRS. In yet a further aspect, the NRS 1903 may be transmitted in a downlink portion of a special subframe in the narrowband TDD frame structure determined for narrowband communications. In one aspect, symbols used to transmit the NRS in the downlink portion of the special subframe may be the same as symbols used to transmit the NRS in downlink subframes in the narrowband TDD frame structure. In another aspect, any NRS symbols present in an uplink portion of the special subframe may be punctured. In a further aspect, symbols used to transmit the NRS 1903 in the downlink portion of the special subframe may be different than symbols used to transmit the NRS 1903 in downlink subframes in the narrowband TDD frame structure. In certain aspects, the NRS 1903 may be transmitted on a carrier containing a SIB 1903 or a BCH 1903. In certain other configurations, the minimum set of subframes includes subframes used to transmit the SIB 1903 and the BCH 1903. In certain other aspects, the minimum set of subframes used to transmit the NRS 1903 may not be a function of the narrowband TDD frame structure determined for the narrowband communications. In certain other configurations, the minimum set of subframes may be restricted to subframes which are downlink subframes or special subframes in all supported TDD frame structures for the narrowband communications. In certain aspects, the minimum set of subframes used to transmit the NRS 1903 may be a function of the narrowband TDD frame structure determined for the narrowband communications.

The reception component 1904 and/or the transmission component 1908 may be configured to communicate 1903, 1905 with the UE 1950 using the narrowband TDD frame structure determined for narrowband communications. For example, the reception component 1904 may be configured to receive narrowband uplink transmissions 1905 from the UE 1950. The transmission component 1908 may be configured to transmit one or more narrowband downlink transmissions 1903 to the UE 1950.

Figure 25:
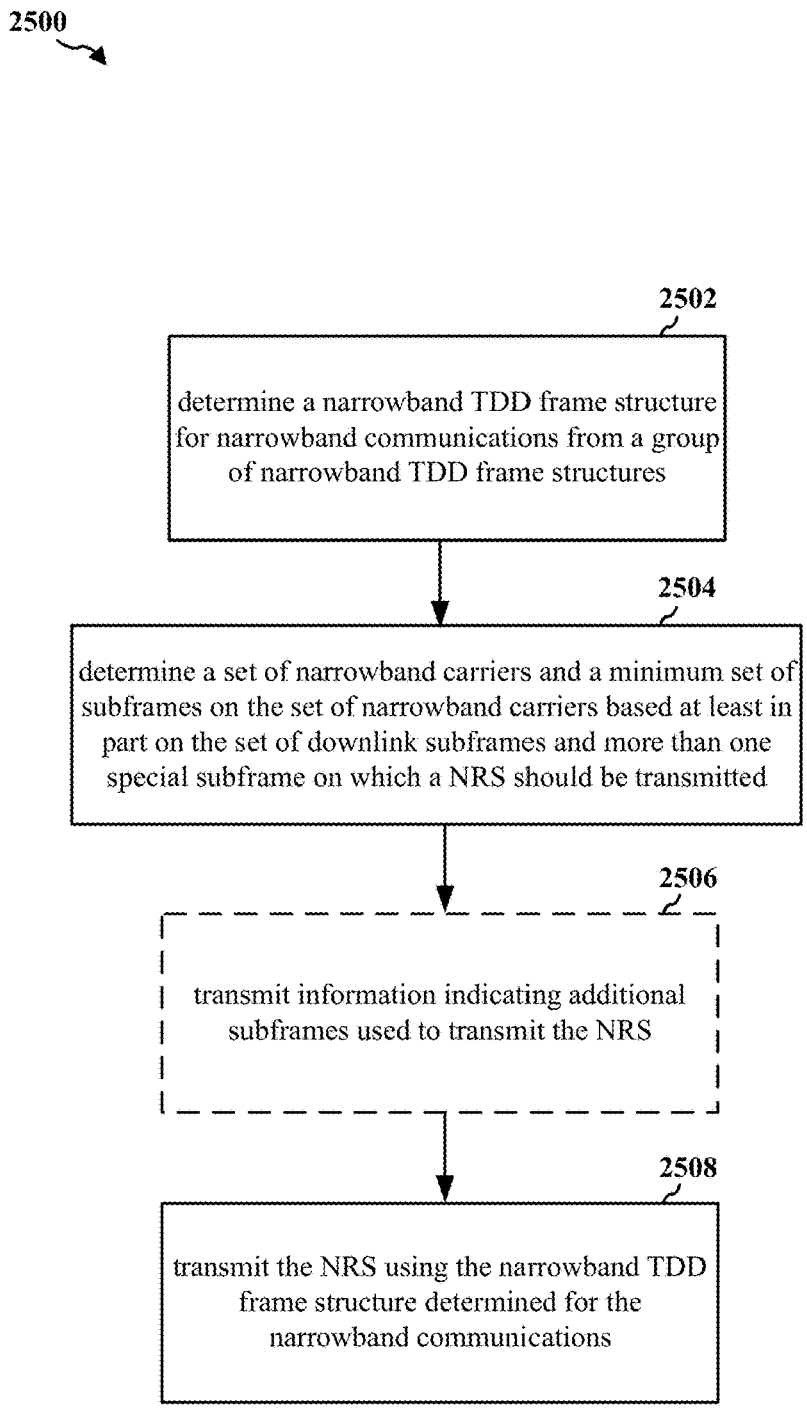
FIG. 25 is a flowchart of a method of wireless communication.

The apparatus may include additional components that perform each of the blocks of the algorithm in the aforementioned flowcharts of FIGS. 10 and 25. As such, each block in the aforementioned flowcharts of FIGS. 10 and 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
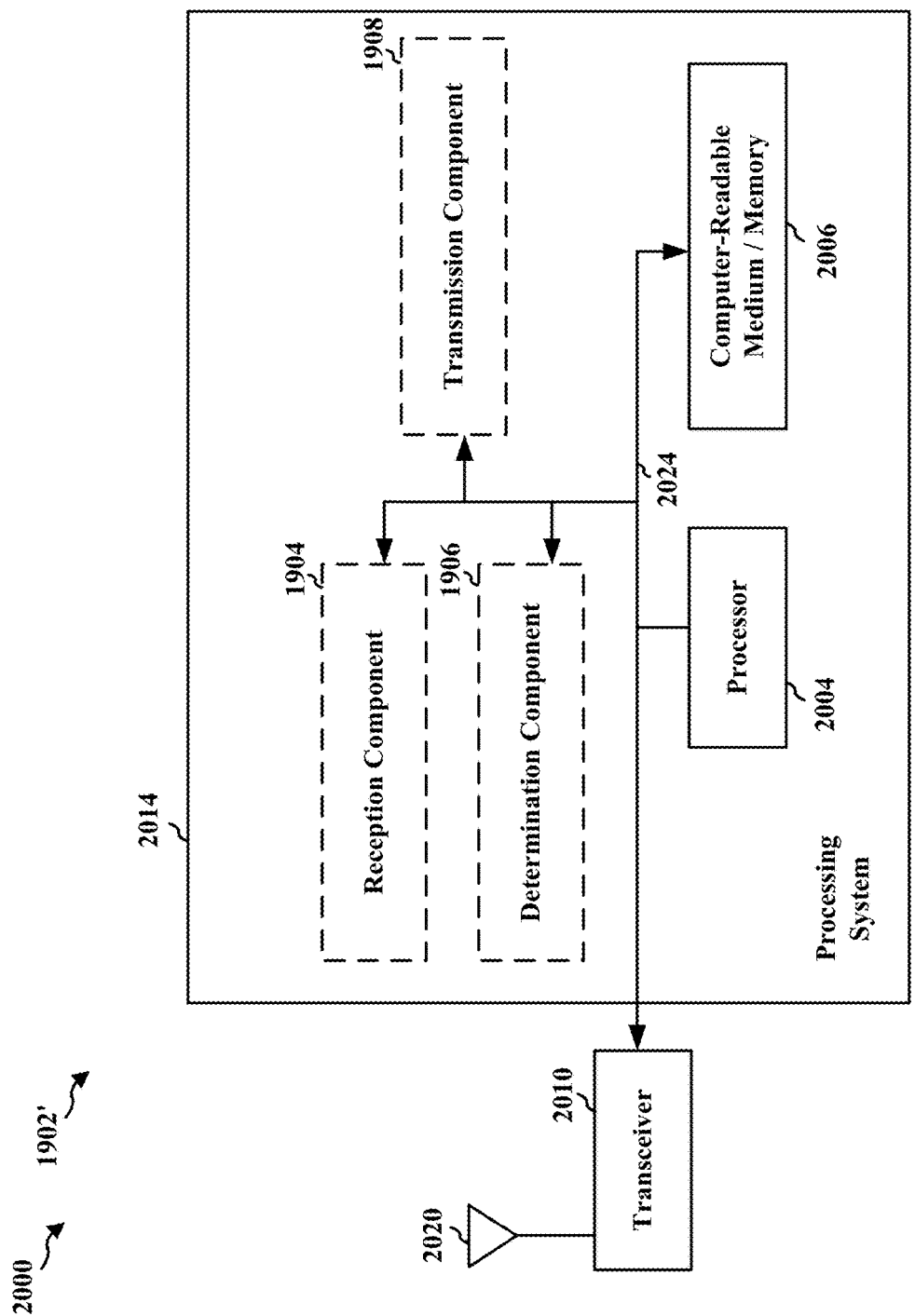
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1908, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described above for any particular apparatus. The computer-readable medium/memory 2006 may also be used for storing data that is manipulated by the processor 2004 when executing software. The processing system 2014 further includes at least one of the components 1904, 1906, 1908. The components may be software components running in the processor 2004, resident/stored in the computer readable medium/memory 2006, one or more hardware components coupled to the processor 2004, or some combination thereof. The processing system 2014 may be a component of the base station 310 and may include the memory 376 and/or at least one of the TX processor 316, the RX processor 370, and the controller/processor 375.

In certain aspects, the apparatus 1902/1902' for wireless communication may include means for determining a narrowband TDD frame structure for narrowband communications from a group of narrowband TDD frame structures. In certain configurations, the narrowband TDD frame structure may include a set of downlink subframes and more than one special subframe. In certain other aspects, the apparatus 1902/1902' for wireless communication may include means for determining a set of narrowband carriers and a minimum set of subframes on the set of narrowband carriers based at least in part on the set of downlink subframes and more than one special subframe on which a NRS should be transmitted. In certain other aspects, the apparatus 1902/1902' for wireless communication may include means for transmitting a PSS, an SSS, and a BCH using the narrowband TDD frame structure determined for the narrowband communications. In one aspect, a resource block used for transmitting the BCH may be different than a resource block used to transmit one or more of the PSS or the SSS. In another aspect, the BCH may be transmitted using one or more subframes in every radio frame. In a further aspect, the SSS may be transmitted using a particular subframe in every other frame. In still another aspect, the BCH may be transmitted using the particular subframe in each frame in which the SSS is not transmitted. In yet a further aspect, a first periodicity associated with the transmitting the BCH using the narrowband TDD frame structure may be reduced as compared to a second periodicity associated with transmitting the BCH using a FDD frame structure. In another aspect, a CRC masking may be included in the BCH to indicate the narrowband TDD frame structure. In another aspect, at least one of a periodicity associated with the transmitting the BCH, a location in time associated with the transmitting the BCH, or a location in frequency associated with the transmitting the BCH may be related to the narrowband TDD frame structure determined for narrowband communications. In another aspect, the BCH may include at least one of a first bit indicating the narrowband TDD frame structure determined for the narrowband communications, a second bit indicating a FDD frame structure determined for the narrowband communications, or information indicating a resource block location or subframe location associated with a SIB. In certain other aspects, the apparatus 1902/1902' for wireless communication may include means for transmitting a system information block using the narrowband TDD frame structure determined for the narrowband communications. In one aspect, the SIB may be transmitted using a same resource block as a resource block used to transmit one or more of the PSS, SSS, or BCH. In another aspect, the SIB may be transmitted using a different resource block as a resource block used to transmit one or more of the PSS, SSS, or BCH. In a further aspect, at least one of a resource block or a subframe used to transmit the SIB may be associated with the narrowband TDD frame structure determined for the narrowband communications. In certain other aspects, the apparatus 1902/1902' for wireless communication may include means for transmitting information indicating additional subframes used to transmit the NRS. In one aspect, the information may include broadcast signaling. In certain other aspects, the apparatus 1902/1902' for wireless communication may include means for transmit a NRS using the narrowband TDD frame structure determined for the narrowband communications. In one aspect, the NRS may be transmitted using a subframe that is also used to transmit the SIB and BCH. In another aspect, the NRS may be transmitted using a resource block that is different than a resource block used to transmit at least one of the PSS or the SSS. In another aspect, the same subframe used to transmit the NRS, SIB, and BCH may be not a function of the narrowband TDD frame structure determined for the narrowband communications. In a further aspect, the same subframe used to transmit the NRS, SIB, and BCH may be a function of the narrowband TDD frame structure determined for the narrowband communications. In another aspect, a density of the NRS transmitted using the narrowband TDD frame structure may be increased as compared to a density of an NRS transmitted using a narrowband FDD frame structure. In still another aspect, the NRS is transmitted in a same subframe used to transmit a CRS. In yet a further aspect, the NRS may be transmitted in a downlink portion of a special subframe in the narrowband TDD frame structure determined for narrowband communications. In one aspect, symbols used to transmit the NRS in the downlink portion of the special subframe may be the same as symbols used to transmit the NRS in downlink subframes in the narrowband TDD frame structure. In another aspect, any NRS symbols present in the uplink portion of the special subframe may be punctured. In a further aspect, symbols used to transmit the NRS in the downlink portion of the special subframe may be different than symbols used to transmit the NRS in downlink subframes in the narrowband TDD frame structure. In certain aspects, the NRS may be transmitted on a carrier containing a SIB or a BCH. In certain other configurations, the minimum set of subframes includes subframes used to transmit the SIB and the BCH. In certain other aspects, the minimum set of subframes used to transmit the NRS may not be a function of the narrowband TDD frame structure determined for the narrowband communications. In certain other configurations, the minimum set of subframes may be restricted to subframes which are downlink subframes or special subframes in all supported TDD frame structures for the narrowband communications. In certain aspects, the minimum set of subframes used to transmit the NRS may be a function of the narrowband TDD frame structure determined for the narrowband communications. In certain other aspects, the NRS may be transmitted in symbols and resource elements used to transmit a CRS. In certain other aspects, symbols used to transmit the NRS may be determined based on a number of downlink symbols in a special subframe configuration. The aforementioned means may be one or more of the aforementioned components of the apparatus 1902 and/or the processing system 2014 of the apparatus 1902' configured to perform the functions recited by the aforementioned means. As described above, the processing system 2014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 21:
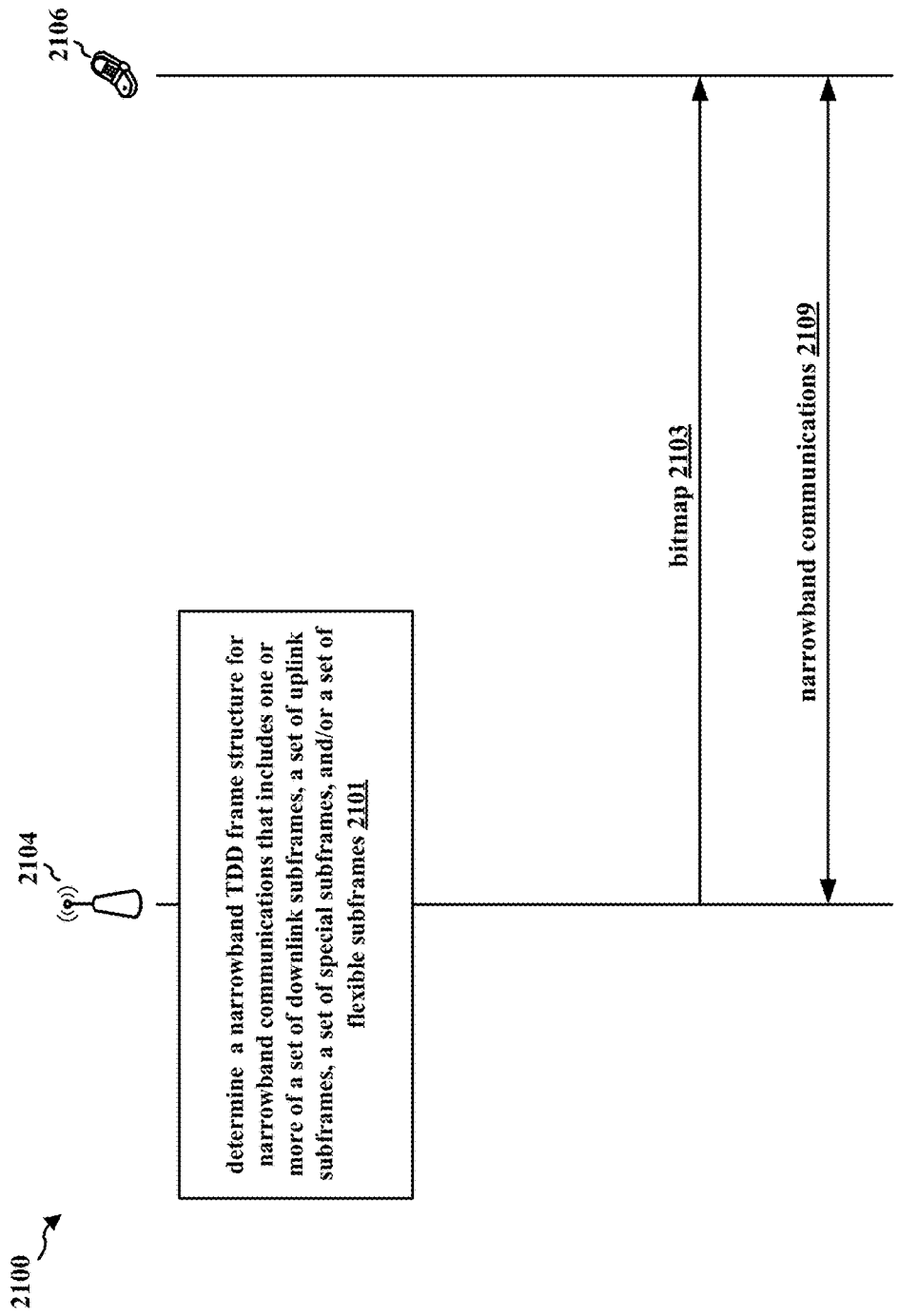
FIG. 21 is a diagram of a dataflow for narrowband communications using narrowband TDD frame structures in accordance with certain aspects of the disclosure.

FIG. 21 is a diagram illustrating a data flow 2100 that may be used for narrowband communications in accordance with certain aspects of the disclosure. For example, the data flow 2100 may be performed by a base station 2104 and/or UE 2106. Base station 2104 may correspond to, e.g., base station 102, 180, 504, eNB 310, apparatus 1102/1102', 1302/1302', 1502/1502', 1702/1702', 1902/1902', 2302/2302'. UE 2106 may correspond to, e.g., UE 104, 350, 506, 1150, 1350, 1550, 1750, 1950, 2350. In addition, the base station 2104 and the UE 2106 may be configured to communicate using narrowband communications 2109 (e.g., NB-IoT and/or eMTC). For example, the UE 2106 may be an NB-IoT device and/or an eMTC device.

In one aspect, base station 2104 may determine 2101 a narrowband TDD frame structure for narrowband communications. The narrowband TDD frame structure may include one or more of a set of downlink subframes, a set of uplink subframes, a set of special subframes, and/or a set of flexible subframes. For example, base station 2104 may determine 2101 that the narrowband TDD frame structure is one of configuration 0, 1, 2, 3, 4, 5, 6, 1, or o from table 410 in FIG. 4.

In another aspect, base station 2104 may transmit a bitmap 2103 associated with the narrowband TDD frame structure to UE 2106. Bitmap 2103 may indicate the set of downlink subframes, the set of uplink subframes, the set of special subframes, and/or the set of flexible subframes in the determined narrowband TDD frame structure.

In one aspect, when base station 2104 is operating in in-band mode, a single bitmap 2103 indicating the set of downlink subframes, the set of uplink subframes, the set of special subframes, and/or the set of flexible subframes may be transmitted to UE 2106. Alternatively, when base station 2104 is operating in standalone mode, a first bitmap 2103 that indicates the set of downlink subframes, a second bitmap 2103 that indicates the set of uplink subframes, a third bitmap 2103 that indicates the set of special subframes, and/or a fourth bitmap 2103 that indicates the set of flexible subframes may be separately transmitted to UE 2106.

In certain aspects, a first length of the bitmap 2103 associated with the determined narrowband TDD frame structure may be longer than a second length of a different bitmap associated with a narrowband FDD frame structure. For example, a single bitmap of length N (e.g., N=60) be used to indicate or more of downlink subframes and/or uplink subframes in a narrowband FDD frame structure. In certain aspects, the length N of bitmap 2103 used to indicate the available downlink subframes, uplink subframes, special subframes, and/or flexible subframes in the narrowband TDD frame structure may be larger (e.g., N=80) than the bitmap used to indicate the narrowband FDD frame structure. The length of the narrowband TDD frame structure bitmap may be larger than the narrowband FDD frame structure bitmap because there may be more types of subframes (e.g., uplink subframes, downlink subframes, special subframes, and/or flexible subframes) available for allocation using a narrowband TDD frame structure as compared to a narrowband FDD frame structure (e.g., uplink subframes and/or downlink subframes).

When base station 2104 allocates one or more flexible subframes for the NPDCCH and/or the NPDSCH, UE 2106 may decode NRS and the NPDCCH and/or NPDSCH transmitted on the allocated flexible subframe(s). When base station 2104 allocates one or more flexible subframes for the NPUCCH and/or the NPUSCH, UE 2106 may use the allocated flexible subframes to transmit the NPUCCH and/or the NPUSCH. When flexible subframes are not allocated for the NPDCCH, NPDSCH, NPUCCH, or NPUSCH, UE 2106 may ignore the flexible subframes. For example, the UE 2106 may not perform NRS detection on the flexible subframes when flexible subframes are not allocated for the NPDCCH, NPDSCH, NPUCCH, or NPUSCH.

Figure 22:
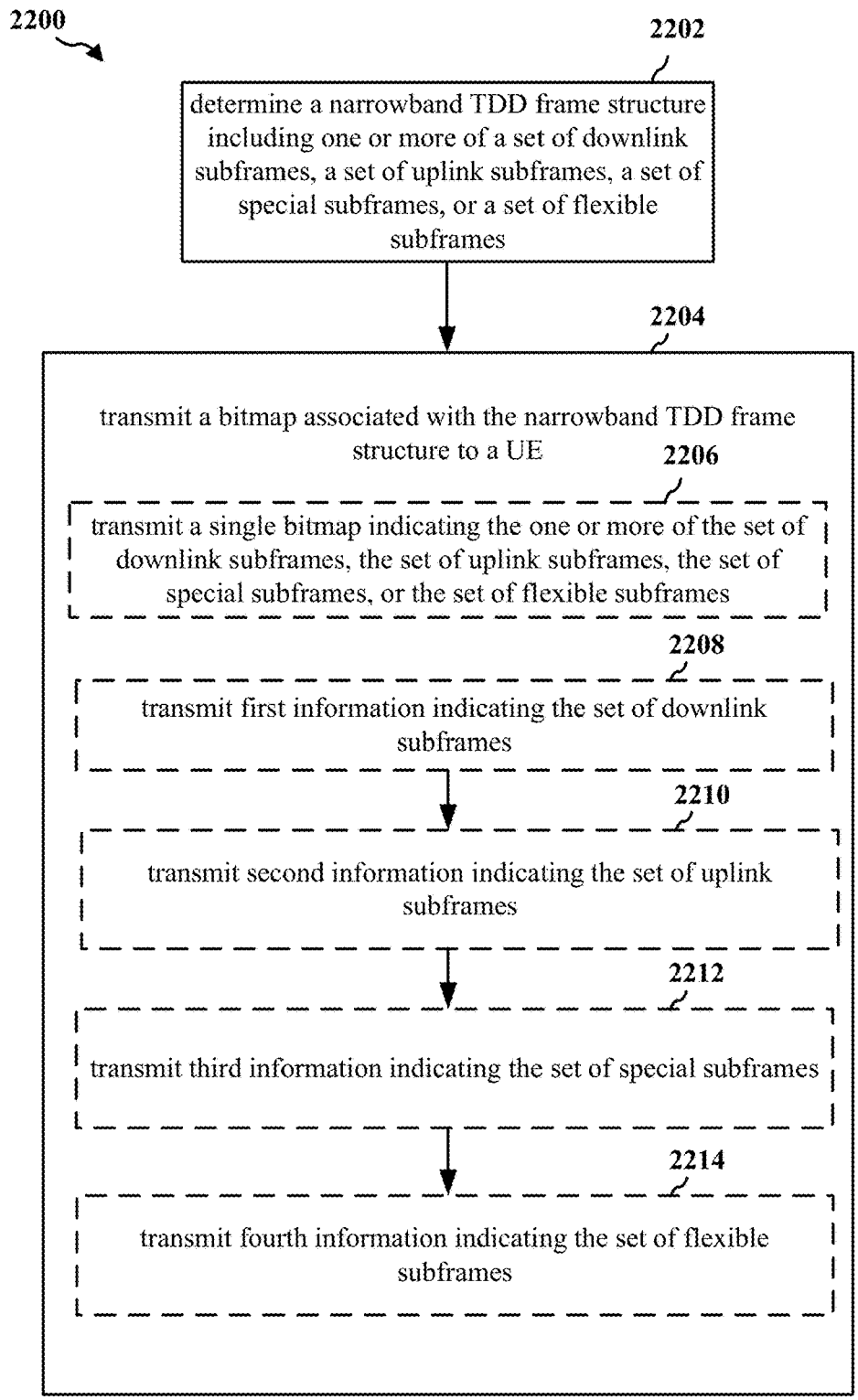
FIG. 22 is a flowchart of a method of wireless communication.

FIG. 22 is a flowchart 2200 of a method of wireless communication. The method may be performed by a base station (e.g., the base station 102, 180, 504, 2104, eNB 310, the apparatus 1102/1102', 1302/1302', 1502/1502', 1702/1702', 1902/1902', 2302/2302'). In FIG. 22, optional operations are indicated with dashed lines.

At 2202, the base station may determine a narrowband TDD frame structure for narrowband communications. In one aspect, the narrowband TDD frame structure may include one or more of a set of downlink subframes, a set of uplink subframes, a set of special subframes, or a set of flexible subframes. In one aspect, a flexible subframe may be configurable by the base station as either a downlink subframe or an uplink subframe. For example, referring to FIG. 21, base station 2104 may determine 2101 a narrowband TDD frame structure for narrowband communications that includes one or more of a set of downlink subframes, a set of uplink subframes, a set of special subframes, and/or a set of flexible subframes. For example, base station 2104 may determine 2101 that the narrowband TDD frame structure is one of configuration 0, 1, 2, 3, 4, 5, 6, 1, or o from table 410 in FIG. 4.

At 2204, the base station may transmit a bitmap associated with the narrowband TDD frame structure to a UE. In one aspect, the bitmap may indicate the one or more of the set of downlink subframes, the set of uplink subframes, the set of special subframes, or the set of flexible subframes. In another aspect, a first length of the bitmap associated with the narrowband TDD frame structure may be longer than a second length of a different bitmap associated with a narrowband FDD frame structure. For example, referring to FIG. 21, base station 2104 may transmit a bitmap 2103 associated with the narrowband TDD frame structure to UE 2106. Bitmap 2103 may indicate the set of downlink subframes, the set of uplink subframes, the set of special subframes, and/or the set of flexible subframes in the determined narrowband TDD frame structure.

At 2206, the base station may transmit the bitmap associated with the narrowband TDD frame structure to the UE by transmitting a single bitmap indicating the one or more of the set of downlink subframes, the set of uplink subframes, the set of special subframes, or the set of flexible subframes. For example, referring to FIG. 21, when base station 2104 is operating in in-band mode, a single bitmap 2103 indicating the set of downlink subframes, the set of uplink subframes, the set of special subframes, and/or the set of flexible subframes may be transmitted to UE 2106.

At 2208, the base station may transmit the bitmap associated with the narrowband TDD frame structure to the UE by transmitting first information indicating the set of downlink subframes. For example, referring to FIG. 21, when base station 2104 is operating in standalone mode, a first bitmap 2103 that indicates the set of downlink subframes may be separately transmitted to UE 2106.

At 2210, the base station may transmit the bitmap associated with the narrowband TDD frame structure to the UE by transmitting second information indicating the set of uplink subframes. For example, referring to FIG. 21, when base station 2104 is operating in standalone mode, a second bitmap 2103 that indicates the set of uplink subframes may be separately transmitted to UE 2106.

At 2212, the base station may transmit the bitmap associated with the narrowband TDD frame structure to the UE by transmitting third information indicating the set of special subframes. For example, referring to FIG. 21, when base station 2104 is operating in standalone mode, a third bitmap 2103 that indicates the set of special subframes may be separately transmitted to UE 2106.

At 2214, the base station may transmit the bitmap associated with the narrowband TDD frame structure to the UE by transmitting fourth information indicating the set of flexible subframes. For example, referring to FIG. 21, when base station 2104 is operating in standalone mode, a fourth bitmap 2103 that indicates the set of flexible subframes may be separately transmitted to UE 2106.

Figure 23:
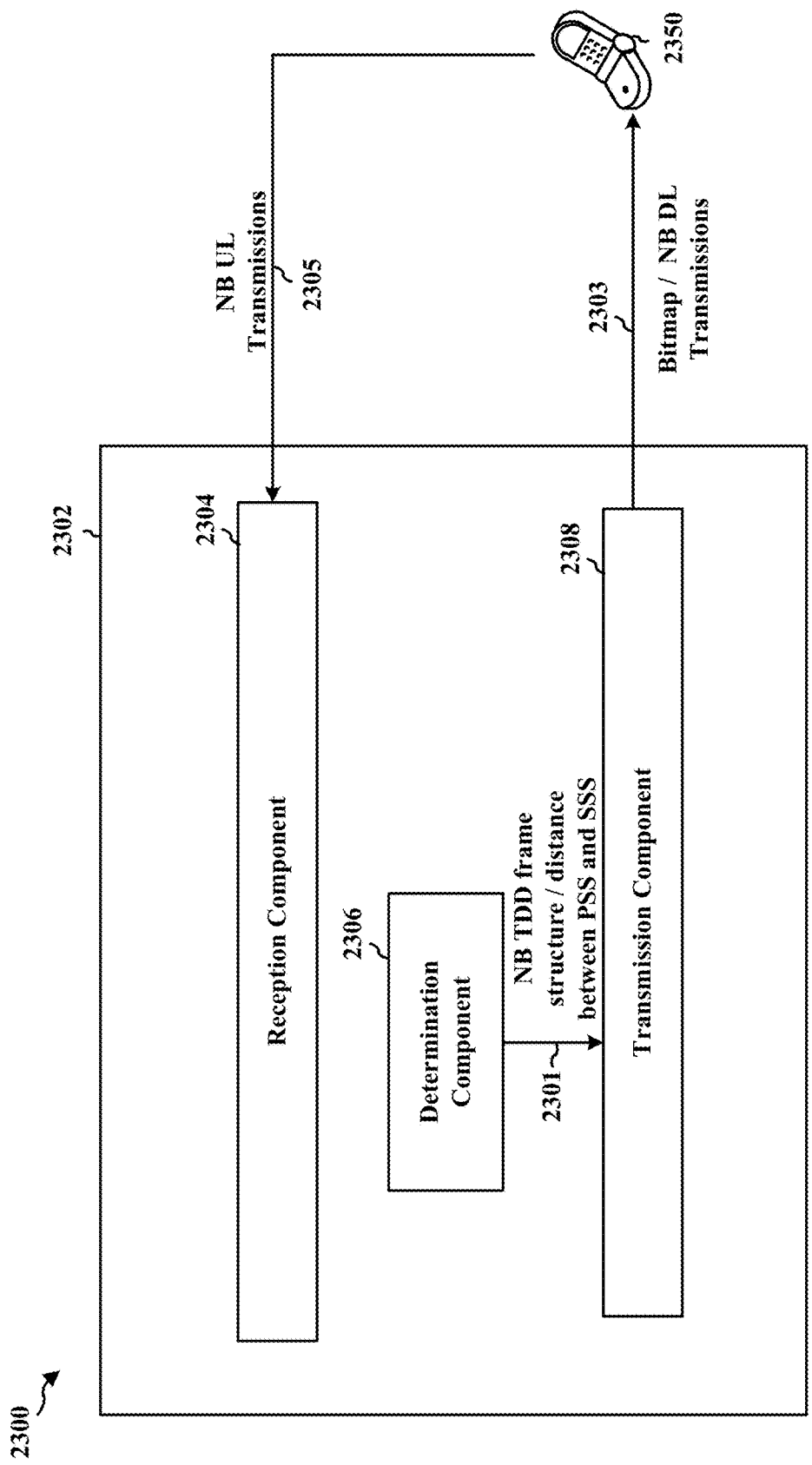
FIG. 23 is a conceptual data flow diagram illustrating the data flow between different means/components in an exemplary apparatus.

FIG. 23 is a conceptual data flow diagram 2300 illustrating the data flow between different means/components in an exemplary apparatus 2302. The apparatus may be a base station (e.g., the base station 102, 180, 310, 504, 2104, the apparatus 1102/1102', 1302/1302', 1502/1502', 1702/1702', 1902/1902', 2302') in narrowband communication (e.g., NB-IoT communication or eMTC) with UE 2350 (e.g., UE 104, 350, 506, 1150, 1350, 1550, 1950, 2104). The apparatus may include a reception component 2304, a determination component 2306, and a transmission component 2308.

The determination component 2306 may be configured to determine a narrowband TDD frame structure for narrowband communications. In one aspect, the narrowband TDD frame structure may include one or more of a set of downlink subframes, a set of uplink subframes, a set of special subframes, or a set of flexible subframes. In one aspect, a flexible subframe may be configurable by the base station as either a downlink subframe or an uplink subframe. The determination component 2306 may send a signal 2301 including information associated with the narrowband TDD frame structure with one or more of a set of downlink subframes, a set of uplink subframes, a set of special subframes, or a set of flexible subframes to the transmission component 2308.

The transmission component 2308 may transmit a bitmap 2303 associated with the narrowband TDD frame structure to the UE 2350. In one aspect, the bitmap may indicate the one or more of the set of downlink subframes, the set of uplink subframes, the set of special subframes, or the set of flexible subframes. In another aspect, a first length of the bitmap associated with the narrowband TDD frame structure may be longer than a second length of a different bitmap associated with a narrowband FDD frame structure. In certain aspects, the transmission component 2308 may be configured to transmit the bitmap 2303 associated with the narrowband TDD frame structure to the UE 2350 by transmitting first information indicating the set of downlink subframes. In certain other aspects, the transmission component 2308 may be configured to transmit the bitmap 2303 associated with the narrowband TDD frame structure to the UE 2350 by transmitting second information indicating the set of uplink subframes. In certain other aspects, the transmission component 2308 may be configured to transmit the bitmap 2303 associated with the narrowband TDD frame structure to the UE 2350 by transmitting third information indicating the set of special subframes. In certain other aspects, the transmission component 2308 may be configured to transmit the bitmap 2303 associated with the narrowband TDD frame structure to the UE 2350 by transmitting fourth information indicating the set of flexible subframes.

The reception component 2304 and/or the transmission component 2308 may be configured to communicate 2303, 2305 with the UE 1750 using the narrowband TDD frame structure determined for narrowband communications. For example, the reception component 2304 may be configured to receive narrowband uplink transmissions 2305 from the UE 2350. The transmission component 2308 may be configured to transmit one or more narrowband downlink transmissions 2303 to the UE 2350.

The apparatus may include additional components that perform each of the blocks of the algorithm in the aforementioned flowchart of FIG. 22. As such, each block in the aforementioned flowcharts of FIG. 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 24:
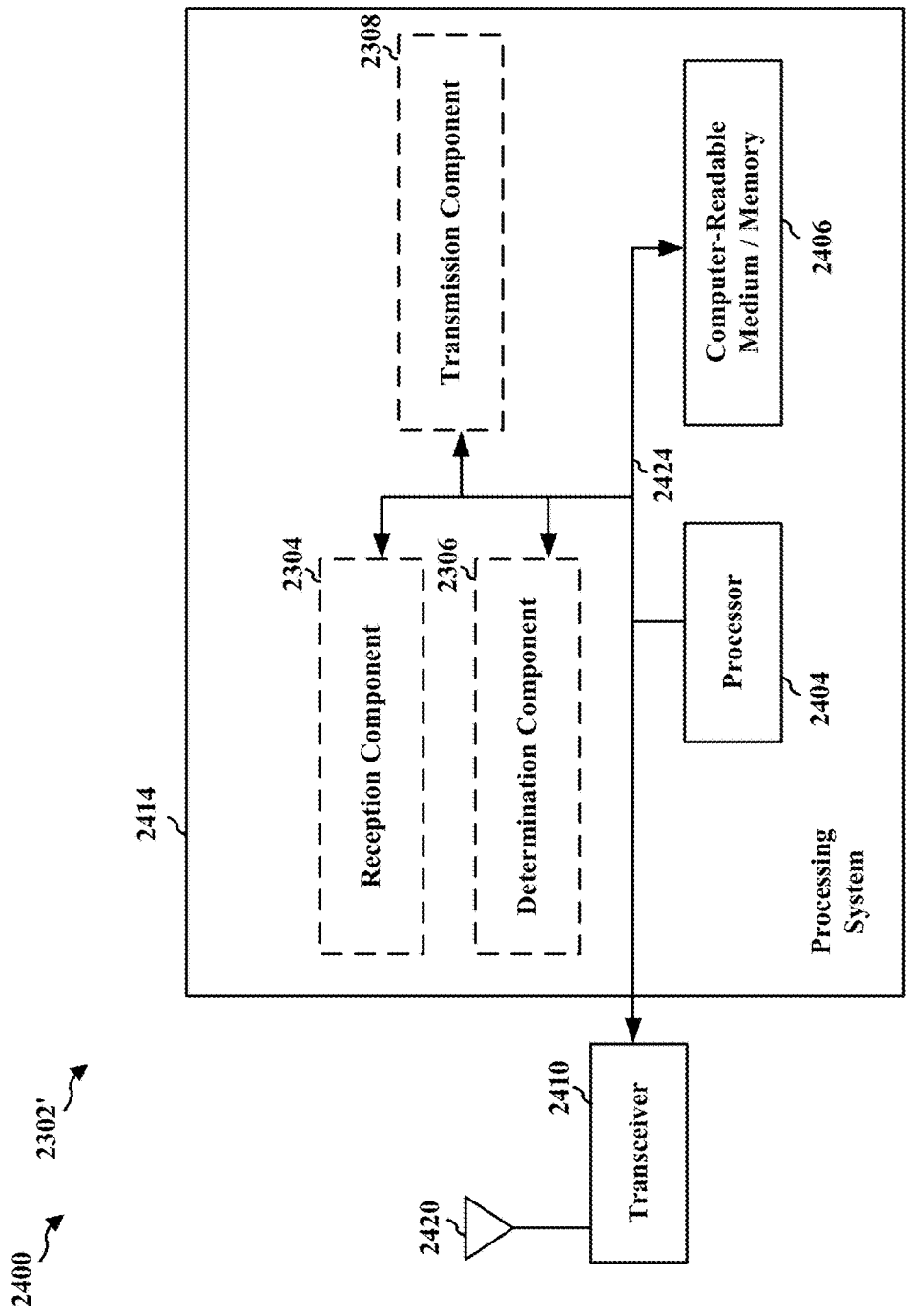
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware components, represented by the processor 2404, the components 2304, 2306, 2308, and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception component 2304. In addition, the transceiver 2410 receives information from the processing system 2414, specifically the transmission component 2308, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described supra for any particular apparatus. The computer-readable medium/memory 2406 may also be used for storing data that is manipulated by the processor 2404 when executing software. The processing system 2414 further includes at least one of the components 2304, 2306, 2308. The components may be software components running in the processor 2404, resident/stored in the computer readable medium/memory 2406, one or more hardware components coupled to the processor 2404, or some combination thereof. The processing system 2414 may be a component of the base station 310 and may include the memory 376 and/or at least one of the TX processor 316, the RX processor 370, and the controller/processor 375.

In certain aspects, the apparatus 2302/2302' for wireless communication may include means for determining a narrowband TDD frame structure for narrowband communications. In one aspect, the narrowband TDD frame structure may include one or more of a set of downlink subframes, a set of uplink subframes, a set of special subframes, or a set of flexible subframes. In one aspect, a flexible subframe may be configurable by the base station as either a downlink subframe or an uplink subframe. In certain other aspects, the apparatus 2302/2302' for wireless communication may include means for transmitting a bitmap associated with the narrowband TDD frame structure to a UE. In one aspect, the bitmap may indicate the one or more of the set of downlink subframes, the set of uplink subframes, the set of special subframes, or the set of flexible subframes. In another aspect, a first length of the bitmap associated with the narrowband TDD frame structure may be longer than a second length of a different bitmap associated with a narrowband FDD frame structure. In certain aspects, the means for transmitting the bitmap associated with the narrowband TDD frame structure to a UE may be configured to transmit a single bitmap indicating the one or more of the set of downlink subframes, the set of uplink subframes, the set of special subframes, or the set of flexible subframes. In certain aspects, the means for transmitting the bitmap associated with the narrowband TDD frame structure to a UE may be configured to transmit first information indicating the set of downlink subframes. In certain aspects, the means for transmitting the bitmap associated with the narrowband TDD frame structure to a UE may be configured to transmit second information indicating the set of uplink subframes. In certain aspects, the means for transmitting the bitmap associated with the narrowband TDD frame structure to a UE may be configured to transmit third information indicating the set of special subframes. In certain aspects, the means for transmitting the bitmap associated with the narrowband TDD frame structure to a UE may be configured to transmit fourth information indicating the set of flexible subframes. The aforementioned means may be one or more of the aforementioned components of the apparatus 2302 and/or the processing system 2414 of the apparatus 2302' configured to perform the functions recited by the aforementioned means. As described supra, the processing system 2414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

FIG. 25 is a flowchart 2500 of a method of wireless communication. The method may be performed by a base station (e.g., the base station 102, 180, 504, eNB 310, the apparatus 1102/1102', 1302/1302', 1502/1502', 1702/1702', 1902/1902', 2302/2302'). In FIG. 25, optional operations are indicated with dashed lines.

At 2502, the base station may determine a narrowband TDD frame structure for narrowband communications from a group of narrowband TDD frame structures. For example, referring to FIGS. 5B-5D, base station 504 may determine 515 a narrowband TDD frame structure for the narrowband communications 509 from a group of narrowband TDD frame structures (e.g., the configurations listed in table 410 in FIG. 4).

At 2504, the base station may determine a set of narrowband carriers and a minimum set of subframes on the set of narrowband carriers based at least in part on the set of downlink subframes and more than one special subframe on which a NRS should be transmitted. In certain aspects, the minimum set of subframes used to transmit the NRS may not be a function of the narrowband TDD frame structure determined for the narrowband communications. In certain other aspects, the minimum set of subframes may be restricted to subframes which are downlink subframes or special subframes in all supported TDD frame structures for the narrowband communications. In certain other aspects, the minimum set of subframes used to transmit the NRS may be a function of the narrowband TDD frame structure determined for the narrowband communications. For example, referring to FIGS. 5B-5D, base station 504 may determine a set of narrowband carriers and a minimum set of subframes (e.g., the common subframes described above) on which the NRS 541 should be transmitted. For example, when the narrowband TDD frame structure is determined from one of configurations 0, 1, 2, 3, 4, 5, 6, and m, the NRS 541 may be sent on one of subframe 0 or subframe 5 because subframes 0 and 5 are common downlink subframes in each configuration in the group. Further, the NRS 541 may be sent on subframe 1 or subframe 6 because subframes 1 and 6 are special subframes (e.g., that include downlink resources) or downlink subframes in each of configuration 0, 1, 2, 3, 4, 5, 6, and m. In another example, when the narrowband TDD frame structure is determined from one of configurations 1, 2, 3, 4, 5, and 6, the NRS 541 may be sent on one of subframe 0, subframe 5, or subframe 9 because subframes 0, 5, and 9 are common downlink subframes in each configuration in the group. Alternatively, base station 504 may transmit the NRS 541 in a downlink subframe that is not a function of the determined narrowband TDD frame structure. For example, a NPBCH 535 transmitted by base station 504 may be used to indicate the downlink subframes that include the NRS 541 to UE 506 when the downlink subframe used to transmit the NRS 541 is not a function of the determined narrowband TDD frame structure. In certain aspects, a bitmap 539 may be included in NPBCH 535.

At 2506, the base station may transmit information indicating additional subframes used to transmit the NRS. In one aspect, the information may include broadcast signaling. For example, referring to FIGS. 5B-5D, base station 504 may transmit the NRS 541 in a downlink subframe that is not a function of the determined narrowband TDD frame structure. For example, a NPBCH 535 (e.g., broadcast signaling) transmitted by base station 504 may be used to indicate the downlink subframes that include the NRS 541 to UE 506 when the downlink subframe used to transmit the NRS 541 is not a function of the determined narrowband TDD frame structure.

At 2508, the base station may transmit a NRS using the narrowband TDD frame structure determined for the narrowband communications. In one aspect, the NRS may be transmitted using a subframe that is also used to transmit the SIB and BCH. In another aspect, the NRS may be transmitted using a resource block that is different than a resource block used to transmit at least one of the PSS or the SSS. In another aspect, the same subframe used to transmit the NRS, SIB, and BCH may be not a function of the narrowband TDD frame structure determined for the narrowband communications. In a further aspect, the same subframe used to transmit the NRS, SIB, and BCH may be a function of the narrowband TDD frame structure determined for the narrowband communications. In another aspect, a density of the NRS transmitted using the narrowband TDD frame structure may be increased as compared to a density of an NRS transmitted using a narrowband FDD frame structure. In still another aspect, the NRS is transmitted in symbols and resource elements used to transmit a CRS. In yet a further aspect, the NRS may be transmitted in a downlink portion of a special subframe in the narrowband TDD frame structure determined for narrowband communications. In one aspect, symbols used to transmit the NRS in the downlink portion of the special subframe may be the same as symbols used to transmit the NRS in downlink subframes in the narrowband TDD frame structure. In another aspect, any NRS symbols present in an uplink portion of the special subframe may be punctured. In a further aspect, symbols used to transmit the NRS in the downlink portion of the special subframe may be different than symbols used to transmit the NRS in downlink subframes in the narrowband TDD frame structure. In certain aspects, the symbols used to transmit the NRS are determined based on a number of downlink symbols in a special subframe configuration. For example, referring to FIGS. 5B-5D, base station 504 may transmit a NRS 541 using the narrowband TDD frame structure determined for the narrowband communications 509. For example, base station 504 may transmit the NRS using a subframe that is also used to transmit the SIB 537 and/or NPBCH 535. Additionally, the NRS 541 may be transmitted using a different RB than the RB used to transmit the NPSS 521 and/or the NSSS 529. In certain aspects, base station 504 may transmit the NRS 541 using one of the common subframes described above. For example, when the narrowband TDD frame structure is determined from one of configurations 0, 1, 2, 3, 4, 5, 6, and m, the NRS 541 may be sent on one of subframe 0 or subframe 5 because subframes 0 and 5 are common downlink subframes in each configuration in the group. Further, the NRS 541 may be sent on subframe 1 or subframe 6 because subframes 1 and 6 are special subframes (e.g., that include downlink resources) or downlink subframes in each configuration in the group. In another example, when the narrowband TDD frame structure is determined from one of configurations 1, 2, 3, 4, 5, and 6, the NRS 541 may be sent on one of subframe 0, subframe 5, or subframe 9 because subframes 0, 5, and 9 are common downlink subframes in each configuration in the group. The NRS 541 may be transmitted in the DwPTS portion (e.g., see FIG. 4) of a special subframe and in downlink subframes in the determined narrowband TDD frame structure. In one aspect, the same symbols in the DwPTS portion of the special subframe and the downlink subframes may be used to transmit the NRS 541. When the NRS 541 is transmitted in the DwPTS of the special subframe, the UpPTS portion of the special subframe may be punctured. In certain aspects, a density of the NRS 541 transmitted using the narrowband TDD frame structure may be greater than an NRS density transmitted using a narrowband FDD frame structure. In other configurations, the NRS 541 may be transmitted in symbols and resource elements that base station 504 uses to transmit a CRS.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications for a base station, comprising:
    determining a time-division duplex (TDD) frame structure for narrowband communications from a group of TDD frame structures, the TDD frame structure including a set of downlink subframes and more than one special subframe;
    determining a set of narrowband carriers and a minimum set of subframes on the set of narrowband carriers based at least in part on the set of downlink subframes and more than one special subframe on which a narrowband reference signal (NRS) should be transmitted, wherein the minimum set of subframes is restricted to subframes which are downlink subframes or special subframes in all supported TDD frame structures for the narrowband communications; and
    transmitting the NRS using the TDD frame structure determined for the narrowband communications.

2. The method of claim 1, wherein the NRS is transmitted on a carrier containing a system information block (SIB) or a broadcast channel, and wherein the minimum set of subframes includes subframes used to transmit the SIB and the BCH.

3. The method of claim 2, wherein the minimum set of subframes used to transmit the NRS is not a function of the TDD frame structure determined for the narrowband communications.

4. The method of claim 2, wherein the minimum set of subframes used to transmit the NRS is a function of the TDD frame structure determined for the narrowband communications.

5. The method of claim 1, further comprising:
    transmitting information indicating additional subframes used to transmit the NRS.

6. The method of claim 5, wherein the information includes broadcast signaling.

7. The method of claim 1, wherein the NRS is transmitted using a first resource block that is different than a second resource block used to transmit at least one of a primary synchronization signal (PSS) or a secondary synchronization signal (SSS).

8. The method of claim 1, wherein a density of the NRS transmitted using the TDD frame structure is increased as compared to a density of a different NRS transmitted using a frequency-division duplex (FDD) frame structure for narrowband communications.

9. The method of claim 8, wherein the NRS is transmitted in symbols and resource elements used to transmit a cell-specific reference signal (CRS).

10. The method of claim 1, wherein the NRS is transmitted in a downlink portion of a special subframe in the TDD frame structure determined for narrowband communications.

11. The method of claim 10, wherein symbols used to transmit the NRS in the downlink portion of the special subframe are also the symbols used to transmit the NRS in downlink subframes in the TDD frame structure.

12. The method of claim 10, wherein any NRS symbols present in an uplink portion of the special subframe are punctured.

13. The method of claim 10, wherein first symbols used to transmit the NRS in the downlink portion of the special subframe are different than second symbols used to transmit the NRS in downlink subframes in the TDD frame structure.

14. The method of claim 10, wherein symbols used to transmit the NRS are determined based on a number of downlink symbols in a special subframe configuration.

15. An apparatus for wireless communications for a base station, comprising:
    means for determining a time-division duplex (TDD) frame structure for narrowband communications from a group of TDD frame structures, the TDD frame structure including a set of downlink subframes and more than one special subframe;

means for determining a set of narrowband carriers and a minimum set of subframes on the set of narrowband carriers based at least in part on the set of downlink subframes and more than one special subframe on which a narrowband reference signal (NRS) should be transmitted, wherein the minimum set of subframes is restricted to subframes which are downlink subframes or special subframes in all supported TDD frame structures for the narrowband communications; and means for transmitting the NRS using the TDD frame structure determined for the narrowband communications.

16. The apparatus of claim 15, wherein the NRS is transmitted on a carrier containing a system information block (SIB) or a broadcast channel, and wherein the minimum set of subframes includes subframes used to transmit the SIB and the BCH.

17. The apparatus of claim 16, wherein the minimum set of subframes used to transmit the NRS is not a function of the TDD frame structure determined for the narrowband communications.

18. The apparatus of claim 16, wherein the minimum set of subframes used to transmit the NRS is a function of the TDD frame structure determined for the narrowband communications.

19. The apparatus of claim 15, further comprising:
means for transmitting information indicating additional subframes used to transmit the NRS.

20. The apparatus of claim 19, wherein the information includes broadcast signaling.

21. The apparatus of claim 16, wherein the NRS is transmitted using a first resource block that is different than a second resource block used to transmit at least one of a primary synchronization signal (PSS) or a secondary synchronization signal (SSS).

22. The apparatus of claim 16, wherein a density of the NRS transmitted using the TDD frame structure is increased as compared to a density of a different NRS transmitted using a frequency-division duplex (FDD) frame structure for narrowband communications.

23. The apparatus of claim 22, wherein the NRS is transmitted in symbols and resource elements used to transmit a cell-specific reference signal (CRS).

24. The apparatus of claim 16, wherein the NRS is transmitted in a downlink portion of a special subframe in the TDD frame structure determined for narrowband communications.

25. The apparatus of claim 24, wherein symbols used to transmit the NRS in the downlink portion of the special subframe are also the symbols used to transmit the NRS in downlink subframes in the TDD frame structure.

26. The apparatus of claim 24, wherein any NRS symbols present in an uplink portion of the special subframe are punctured.

27. The apparatus of claim 24, wherein first symbols used to transmit the NRS in the downlink portion of the special subframe are different than second symbols used to transmit the NRS in downlink subframes in the TDD frame structure.

28. The apparatus of claim 24, wherein symbols used to transmit the NRS are determined based on a number of downlink symbols in a special subframe configuration.

29. An apparatus wireless communications for a base station, comprising:
a memory; and
at least one processor coupled to the memory and configured to:

determine a time-division duplex (TDD) frame structure for narrowband communications from a group of TDD frame structures, the TDD frame structure including a set of downlink subframes and more than one special subframe;

determine a set of narrowband carriers and a minimum set of subframes on the set of narrowband carriers based at least in part on the set of downlink subframes and more than one special subframe on which a narrowband reference signal (NRS) should be transmitted, wherein the minimum set of subframes is restricted to subframes which are downlink subframes or special subframes in all supported TDD frame structures for the narrowband communications; and transmit the NRS using the TDD frame structure determined for the narrowband communications.

30. The apparatus of claim 29, wherein the NRS is transmitted on a carrier containing a system information block (SIB) or a broadcast channel, and wherein the minimum set of subframes includes subframes used to transmit the SIB and the BCH.

31. The apparatus of claim 30, wherein the minimum set of subframes used to transmit the NRS is not a function of the TDD frame structure determined for the narrowband communications.

32. The apparatus of claim 30, wherein the minimum set of subframes used to transmit the NRS is a function of the TDD frame structure determined for the narrowband communications.

33. The apparatus of claim 29, wherein the at least one processor is further configured to:
transmit information indicating additional subframes used to transmit the NRS.

34. The apparatus of claim 33, wherein the information includes broadcast signaling.

35. The apparatus of claim 29, wherein the NRS is transmitted using a first resource block that is different than a second resource block used to transmit at least one of a primary synchronization signal (PSS) or a secondary synchronization signal (SSS).

36. The apparatus of claim 29, wherein a density of the NRS transmitted using the TDD frame structure is increased as compared to a density of a different NRS transmitted using a frequency-division duplex (FDD) frame structure for narrowband communications.

37. The apparatus of claim 36, wherein the NRS is transmitted in symbols and resource elements used to transmit a cell-specific reference signal (CRS).

38. The apparatus of claim 29, wherein the NRS is transmitted in a downlink portion of a special subframe in the TDD frame structure determined for narrowband communications.

39. The apparatus of claim 38, wherein symbols used to transmit the NRS in the downlink portion of the special subframe are also the symbols used to transmit the NRS in downlink subframes in the TDD frame structure.

40. The apparatus of claim 38, wherein any NRS symbols present in an uplink portion of the special subframe are punctured.

41. The apparatus of claim 38, wherein first symbols used to transmit the NRS in the downlink portion of the special subframe are different than second symbols used to transmit the NRS in downlink subframes in the TDD frame structure.

42. The apparatus of claim 38, wherein symbols used to transmit the NRS are determined based on a number of downlink symbols in a special subframe configuration.

43. A non-transitory computer-readable medium storing computer executable code for a base station, comprising code to:
- determine a time-division duplex (TDD) frame structure for narrowband communications from a group of TDD frame structures, the TDD frame structure including a set of downlink subframes and more than one special subframe;
- determine a set of narrowband carriers and a minimum set of subframes on the set of narrowband carriers based at least in part on the set of downlink subframes and more than one special subframe on which a narrowband reference signal (NRS) should be transmitted, wherein the minimum set of subframes is restricted to subframes which are downlink subframes or special subframes in all supported TDD frame structures for the narrowband communications; and
- transmit the NRS using the TDD frame structure determined for the narrowband communications.

44. The non-transitory computer-readable medium of claim 43, wherein the NRS is transmitted on a carrier containing a system information block (SIB) or a broadcast channel, and wherein the minimum set of subframes includes subframes used to transmit the SIB and the BCH.

45. The non-transitory computer-readable medium of claim 44, wherein the minimum set of subframes used to transmit the NRS is not a function of the TDD frame structure determined for the narrowband communications.

46. The non-transitory computer-readable medium of claim 44, wherein the minimum set of subframes used to transmit the NRS is a function of the TDD frame structure determined for the narrowband communications.

47. The non-transitory computer-readable medium of claim 43, further comprising code to:
- transmit information indicating additional subframes used to transmit the NRS.

48. The non-transitory computer-readable medium of claim 47, wherein the information includes broadcast signaling.

49. The non-transitory computer-readable medium of claim 43, wherein the NRS is transmitted using a first resource block that is different than a second resource block used to transmit at least one of a primary synchronization signal (PSS) or a secondary synchronization signal (SSS).

50. The non-transitory computer-readable medium of claim 43, wherein a density of the NRS transmitted using the TDD frame structure is increased as compared to a density of a different NRS transmitted using a frequency-division duplex (FDD) frame structure for narrowband communications.

51. The non-transitory computer-readable medium of claim 50, wherein the NRS is transmitted in symbols and resource elements used to transmit a cell-specific reference signal (CRS).

52. The non-transitory computer-readable medium of claim 43, wherein the NRS is transmitted in a downlink portion of a special subframe in the TDD frame structure determined for narrowband communications.

53. The non-transitory computer-readable medium of claim 52, wherein symbols used to transmit the NRS in the downlink portion of the special subframe are also the symbols used to transmit the NRS in downlink subframes in the TDD frame structure.

54. The non-transitory computer-readable medium of claim 52, wherein any NRS symbols present in an uplink portion of the special subframe are punctured.

55. The non-transitory computer-readable medium of claim 52, wherein first symbols used to transmit the NRS in the downlink portion of the special subframe are different than second symbols used to transmit the NRS in downlink subframes in the TDD frame structure.

56. The non-transitory computer-readable medium of claim 52, wherein symbols used to transmit the NRS are determined based on a number of downlink symbols in a special subframe configuration.

* * * * *